(12) United States Patent
Grace

(10) Patent No.: US 11,205,408 B2
(45) Date of Patent: Dec. 21, 2021

(54) METHOD AND SYSTEM FOR MUSICAL COMMUNICATION

(71) Applicant: Muvik Labs, LLC, Newton, MA (US)

(72) Inventor: Victoria A Grace, Clarens (CH)

(73) Assignee: Muvik Labs, LLC, Locust Valley, NY (US)

( * ) Notice: Subject to any disclaimer, the term of this patent is extended or adjusted under 35 U.S.C. 154(b) by 6 days.

(21) Appl. No.: 16/634,928

(22) PCT Filed: Aug. 21, 2018

(86) PCT No.: PCT/US2018/047375
§ 371 (c)(1),
(2) Date: Jan. 29, 2020

(87) PCT Pub. No.: WO2019/040524
PCT Pub. Date: Feb. 28, 2019

(65) Prior Publication Data
US 2020/0243055 A1 Jul. 30, 2020

Related U.S. Application Data

(60) Provisional application No. 62/548,001, filed on Aug. 21, 2017.

(51) Int. Cl.
*G10H 1/00* (2006.01)
(52) U.S. Cl.
CPC ..... *G10H 1/0025* (2013.01); *G10H 2210/111* (2013.01); *G10H 2240/081* (2013.01); *G10H 2240/085* (2013.01)
(58) Field of Classification Search
CPC .......... G10H 1/0025; G10H 2210/111; G10H 2240/081; G10H 2240/085
See application file for complete search history.

(56) References Cited

U.S. PATENT DOCUMENTS 5,730,140 A * 3/1998 Fitch ..................... A61B 5/0205
600/514
5,836,302 A * 11/1998 Homuth ............... A61M 16/024
128/205.23

(Continued)

FOREIGN PATENT DOCUMENTS

WO 2019040524 A1 2/2019

OTHER PUBLICATIONS

International Search Report from PCT/US18/47375 dated Dec. 18, 2018.

(Continued)

*Primary Examiner* — Jeffrey Donels
(74) *Attorney, Agent, or Firm* — Ryan, Mason & Lewis, LLP

(57) ABSTRACT

Novel tools and techniques are provided for generating music, and, more particularly, to methods, systems, and apparatuses for generating music associated with a state contained within a communication, for a user interface for generating music associated with a state, for generated music to reflect movement between states, and for generating music to guide a user toward a desired state. In various embodiments, a computing system might analyze a communication of a user to determine at least one state contained within the communication. The communication may be a sensor communication, a biometric/health communication, a voice communication, a numerical communication, a textual communication, a picture/video communication, etc. Based on the determined at least one state, the computing system might generate music associated with the state or continuously control the generation of music to guide a user toward a desired state. A user interface for generating music may also be provided.

20 Claims, 22 Drawing Sheets

(56) References Cited

U.S. PATENT DOCUMENTS

| | | | |
|---|---|---|---|
| 6,449,501 B1* | 9/2002 | Reuss | A61B 5/14551 600/322 |
| 9,968,305 B1 | 5/2018 | Brown et al. | |
| 2004/0243016 A1* | 12/2004 | Sanderson | A61B 5/0836 600/532 |
| 2006/0111621 A1* | 5/2006 | Coppi | A61B 5/486 600/300 |
| 2007/0074619 A1 | 4/2007 | Vergo | |
| 2008/0156176 A1 | 7/2008 | Edlund | |
| 2011/0082695 A1 | 4/2011 | Bengt | |
| 2014/0074479 A1* | 3/2014 | Kassam | G10L 25/48 704/270 |
| 2015/0079562 A1 | 3/2015 | Yeh et al. | |
| 2015/0081066 A1* | 3/2015 | Yeh | A61B 5/1123 700/94 |
| 2015/0093729 A1* | 4/2015 | Plans | A61B 5/01 434/236 |
| 2015/0127818 A1 | 5/2015 | Bates | |
| 2015/0133749 A1* | 5/2015 | Janata | A61B 5/14551 600/301 |
| 2015/0150520 A1* | 6/2015 | Chafe | A61B 5/349 600/483 |
| 2015/0213789 A1 | 7/2015 | Plott | |
| 2015/0286858 A1 | 10/2015 | Shaburov | |
| 2015/0356876 A1 | 12/2015 | Wang | |
| 2017/0061950 A1* | 3/2017 | Benway | G06K 9/00892 |
| 2017/0203074 A1* | 7/2017 | Joseph | A61B 5/486 |
| 2017/0208027 A1* | 7/2017 | Goldstein | H04L 51/26 |
| 2017/0220316 A1 | 8/2017 | Garmark et al. | |
| 2017/0225035 A1 | 8/2017 | Riley et al. | |
| 2018/0216953 A1 | 8/2018 | Suenaga | |

OTHER PUBLICATIONS

L. Kennedy et al., "Biofeedback as a Stress Management Tool: A Systematic Review," Cognition, Technology & Work, May 2019, pp. 161-190, vol. 21, No. 2 (abstract only).

B. Yu et al., "Designing Auditory Display of Heart Rate Variability in Biofeedback Context," The 21st International Conference on Auditory Display (ICAD), Jul. 8-10, 2015, pp. 294-298.

A.L. Wheat et al., "Biofeedback of Heart Rate Variability and Related Physiology: A Critical Review," Applied Psychophysiology and Biofeedback, Sep. 2010, pp. 229-242, vol. 35, No. 3.

A. Parnandi et al., "Chill-Out: Relaxation Training Through Respiratory Biofeedback in a Mobile Casual Game," 5th International Conference on Mobile Computing, Applications, and Services (MobiCASE), Nov. 7-8, 2013, pp. 252-260.

D. Plans et al., "Use of a Biofeedback Breathing App to Augment Poststress Physiological Recovery: Randomized Pilot Study," JMIR Formative Research, Jan. 11, 2019, 8 pages, vol. 3, No. 1.

V. Grace, "About Muvik Labs," [Video], YouTube, https://www.youtube.com/watch?v=0ftLLkJhPUI, Sep. 6, 2019, 3 pages.

Actor, "Interactive Study of Timbre Semantics," https://www.actorproject.org/interactive-study-on-timbre-semantics, Accessed Jul. 1, 2021, 3 pages.

Orchestration Education, "IInteractive Study on Timbre Semantics—Demo of Interface—Muvik Labs," [Video], YouTube, https://www.youtube.com/watch?v=ICwvZe3kFzw&t=21s, Jul. 10, 2019, 3 pages.

V. Grace et al., "Sonic Anxiety," CCRMA Music 250A Project, [Video], YouTube, https://www.youtube.com/watch?v=vNvwmWxqIDo&t=2s, Jan. 4, 2015, 3 pages.

Stanford University, "CCRMA Music 250A Past Projects," https://ccrma.stanford.edu/courses/250a-fall-2014/past-projects/, Fall 2014, 16 pages.

* cited by examiner

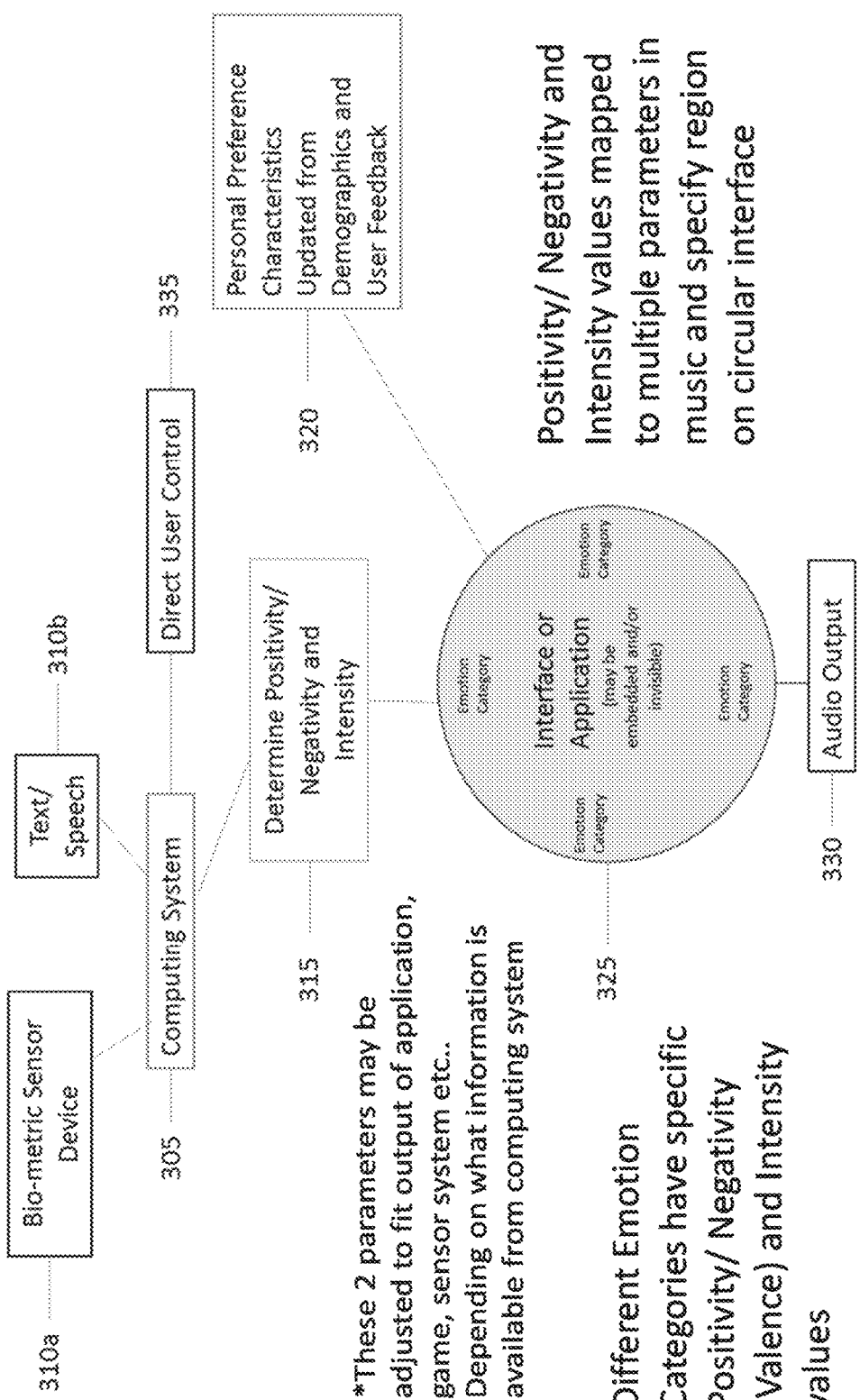

Example of Possible Musical Expression Mappings for Generative Interface:
Demonstration of mapping 2 parameters (Pos/Neg and Intensity) to region on interface determining multiple musical attributes
** NOTE: These will vary will different applications/users

| Emotion Category/ Region | Positivity (1-10) | Negativity (1-10) | Intensity (1-100) | Musical Attributes |
|---|---|---|---|---|
| Happy | ~10 | ~0 | 90-100 | Major mode, fast tempo, stoccato, quick attack (note onsets) and short decay, bright timbre |
| Playful | ~9 | ~1 | 80-95 | Major mode, crescendos, flutter curvature, medium dynamics, medium timbre and note range |
| Calm | ~2 | ~8 | 0-20 | Low dynamics, slow tempo, fewer voices, lower pitches, dark timbre, long attack, smooth pitch curvature |
| Dreamy | ~5 | ~5 | 10-30 | Medium dissonance, low dynamics, slow tempo, varying pitch envelope |
| Sad | ~0 | ~10 | 0-10 | Minor mode, slow tempo, fewer voices, long attack and decay note envelope |
| Anxious | ~1 | ~9 | 90-100 | Minor mode, lower median pitch, high dissonance, high staccato, bright timbre |
| Excited | ~9 | ~1 | 90-100 | Major mode, high highest pitch, loud dynamics, high voice density, bright timbre |

Fig. 4A

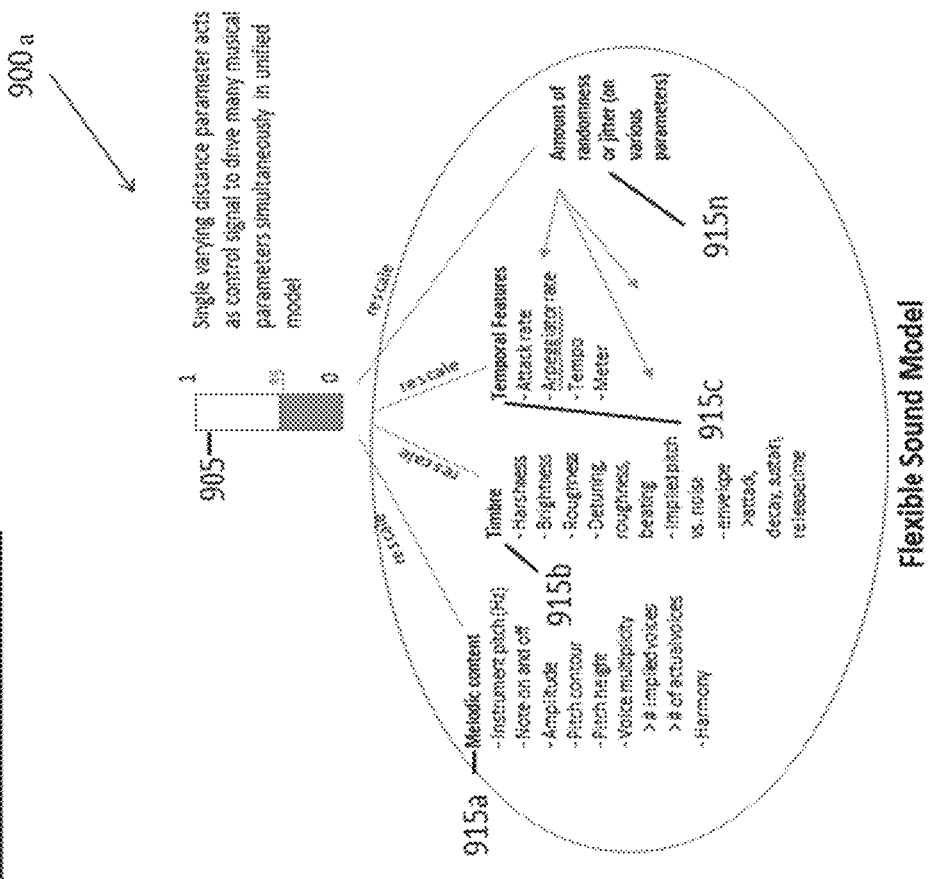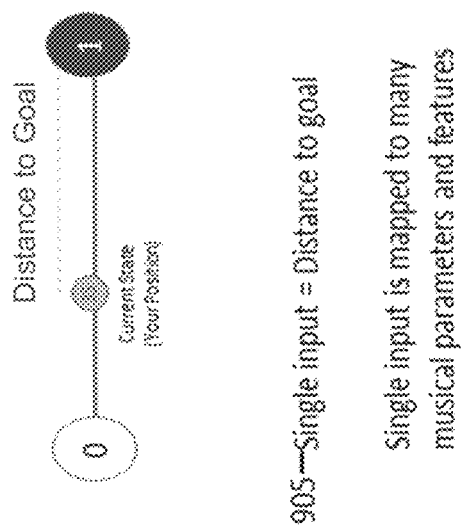
Fig. 9A

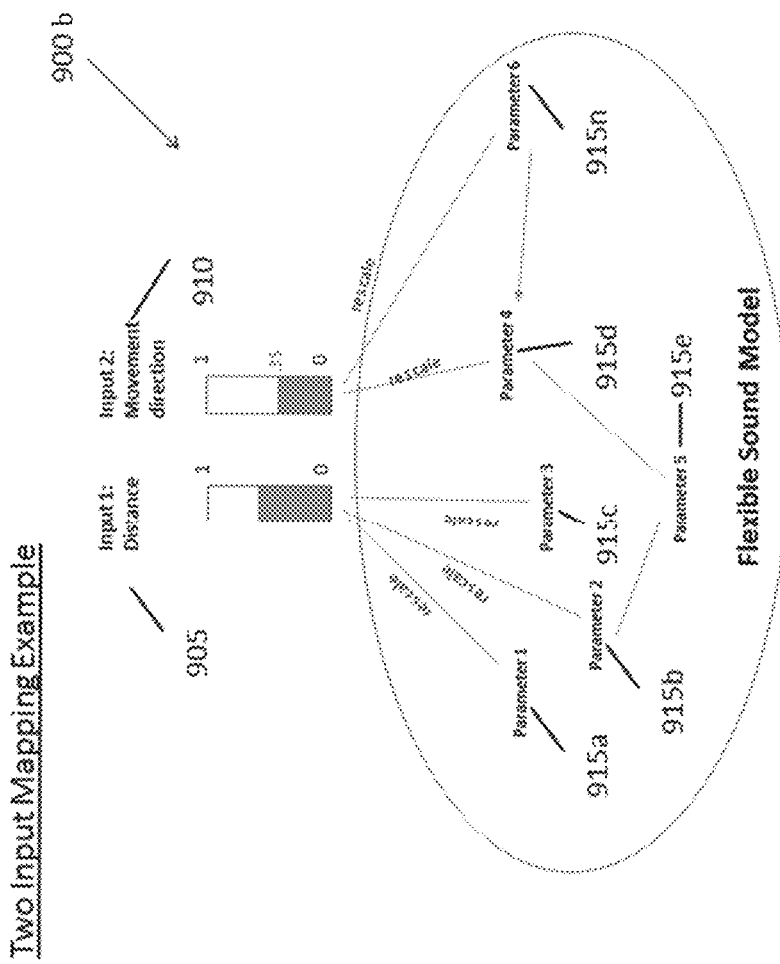
Fig. 9B

METHOD AND SYSTEM FOR MUSICAL COMMUNICATION

RELATED APPLICATIONS

This application is a 35 U.S.C. § 371 national phase application of PCT/US2018/047375 (WO 2019/040524), filed on Aug. 21, 2018, entitled "Method and System for Musical Communication", which application claims the benefit of U.S. Provisional Application Ser. No. 62/548,001, filed Aug. 21, 2017, which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing procedural, generative, interactive, and reactive music and audio, and, more particularly, to methods, systems, and apparatuses for generating music and audio associated with a state or an emotion contained within a communication, for a user interface for generating and controlling music and audio characteristics associated with a state or an emotion, for generating audio to inform the user of a current state, for generating audio to give the user awareness of movement between states, and for generating audio to guide a user toward a desired state or goal.

BACKGROUND

While there are several services that generate music on a computer, none of these services tailor the music and audio generated in real-time or near real-time to an emotion or a current state of a particular user/person or environment. Further, none of these services are driven by an emotion or state of a user/person contained within a communication or have an intuitive interface for a user/person to influence the audio that allows for smooth transformations between different musical states. Additionally, none of these services seek to direct and/or guide a user toward a desired state or goal.

Hence, there is a need for a more robust, and portable solution for generating music/audio, and, more particularly, for generating music/audio associated with an emotion/state contained within a communication, for a user interface for generating music/audio associated with a state, and for generating music to guide a user toward a desired state or goal.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 3 is a schematic diagram illustrating a system for implementing the generation of music and interactive audio, in accordance with various embodiments.

FIGS. 4A-4C are schematic diagrams illustrating systems for mapping music/audio to emotions/states, in accordance with various embodiments.

FIGS. 9A-9E are schematic diagrams illustrating systems for mapping states to music, in accordance with various embodiments.

DETAILED DESCRIPTION OF CERTAIN EMBODIMENTS

Overview

Figure 1:
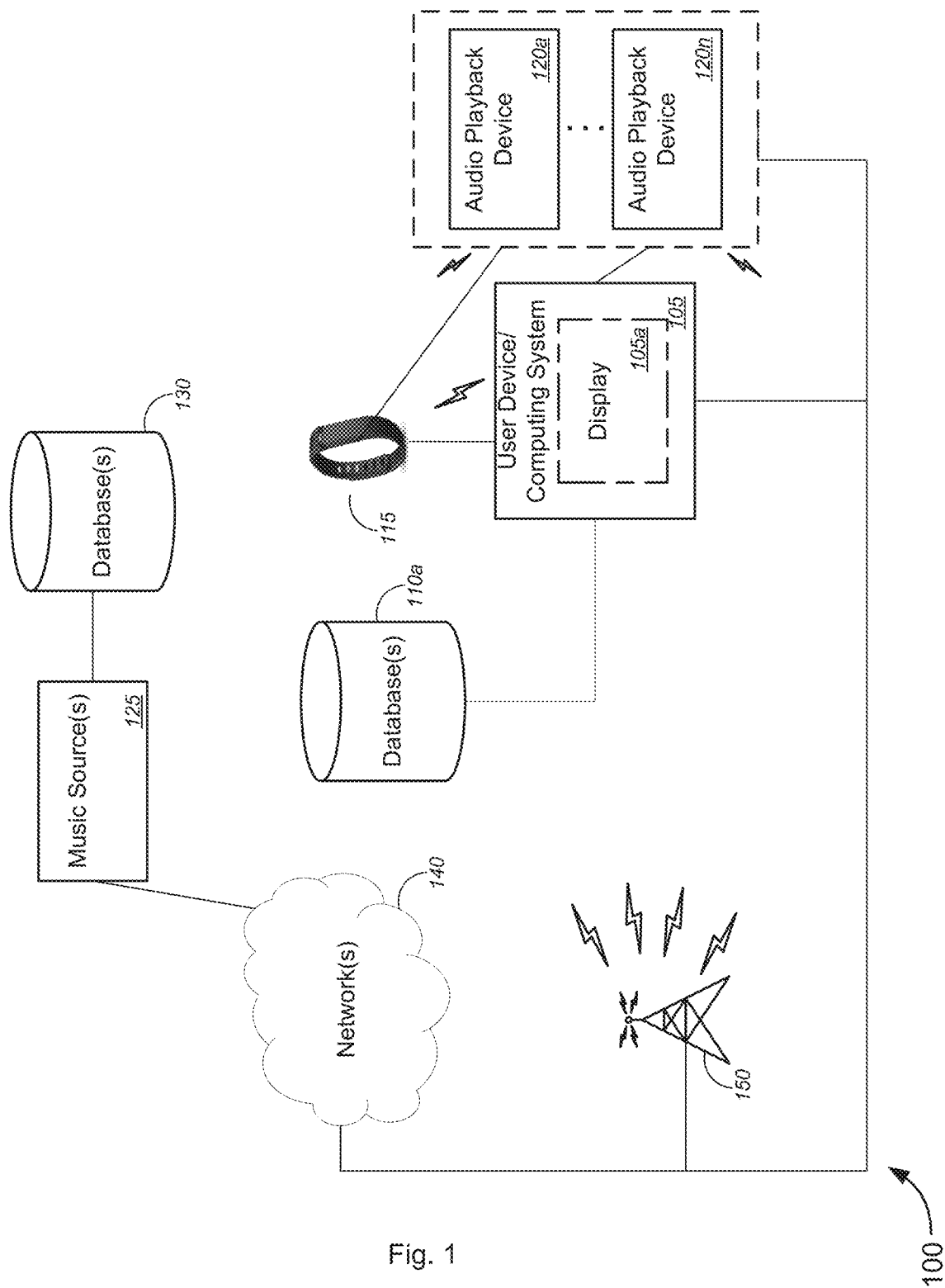
FIG. 1 is a schematic diagram illustrating a system for implementing the generation of music and audio, in accordance with various embodiments.

Various embodiments provide tools and techniques for generating interactive music/audio, and, more particularly, methods, systems, and apparatuses for generating music associated with an emotion/state contained within a communication, for a user interface for generating music/audio associated with an emotion, and for generating music to guide a user toward a desired state or goal or more optimally performing in an environment.

The methods, systems, and apparatuses disclosed in provide means for musical/audio communication. In an age of digital communication dominated by screens, text, and interactive mediums composed of static sound files (e.g., mp4 and .wav), there is a need to express information through a flexible audio feedback system. Understanding of communication through real-time adaptive music and audio can be achieved by transforming musical states which feature characteristic emotional nuance. These emotional sound qualities and changing states may be expressed through music/audio feature parameters associated with particular states and interpolating between different state parameters.

The methods, systems, and apparatuses described herein provide an audio engine with generative audio/music models and interfaces that generate or synthesize music or interactive sound in real-time based on feedback from one or more sensors and/or user interaction. These models can produce procedurally generated audio featuring infinite variation and influence from one or more sensors and/or user interactions. This approach consists of mapping detailed music content, performance and expressive features and components to input data streams and probabilistic structures.

Further, the methods, systems, and apparatuses described herein provide personalized, interactive, generative music and/or interactive audio that adapt to and convey a user's current physiological state (emotional, physical, or the like), the state of a person that the user is interacting with via text, video, voice communication, and/or the like, the state of a technology communicating to a user, and/or the state of an environment surrounding a user or a device. For example, instead of sending text/photographic emojis, users of these methods, systems, and apparatuses may send musical emojis to express how they are feeling. Additionally and/or alternatively, the music/sound that is generated may reflect a state of a technology (e.g., an amount of power, types of applications that are open, a typing speed of the user, and/or the like). In some cases, the music/audio may reflect a state of the environment (e.g., a type of weather, temperature of a room, and/or the like).

The methods, systems, and apparatuses described herein may be used to provide a soundtrack to user activities including goal-oriented tasks, communications (e.g., text, voice, video, and/or the like), user applications (e.g., games, social media applications, and/or the like), video games, a user's environment, and/or the like. Real-time data streams input into the generative music model may come from one or more sensors, user interaction with a user interface, computer software, a computer program, a virtual world, and/or the like. Additionally and/or alternatively, by interpreting the body language, tone of voice, brain waves, pulse of a user and/or person a user is interacting with and/or by detecting an environment within a room, a surrounding area, and/or the like, the methods, systems, and apparatuses described herein may generate instant audio feedback on psychological state of the user and/or a person interacting with the user, and/or an environment of a user or a person interacting with the user in the form of complex, sounds abstracting natural human expression. Thus, through the methods, systems, and apparatuses described herein, a user's mind, voice, body, environment, and/or the like may be used as input data driving the musical instrument.

Physiological states and/or environmental states are temporal in nature, therefore they can most be conveyed highly accurately through evolving music or sound. Thus, the music and audio that is generated, by methods, systems, and apparatuses described herein, is not static and may transition, transform or diverge over time as the user's state or environment changes.

These methods, systems, and apparatuses could also be embraced as an accessibility tool, facilitating blind and autistic communication. Further, these methods, systems, and apparatuses could be used in situations where text/photograph emojis fail, such as in accessibility devices for the blind or with individuals with autism. Additionally, these methods, systems, and apparatuses could be used for therapy sessions to make a patient feel at ease and to provide feedback to the therapist about the emotional state of the patient or be used for sound therapy for the patient.

Additionally and/or alternatively, the methods, systems, and apparatuses disclosed determine different emotions contained within a communication (e.g., a biometric/health communication, a voice communication, a textual communication, a picture communication, a video communication, a haptic communication and/or the like). Based on the determined emotions, the methods, systems, and apparatuses may generate and play music and/or other audio content associated with at least one determined emotion. The generated music and/or other audio content would provide a soundtrack to the communication and add emotional nuance to the communication through music to more effectively express how a person is feeling.

In other embodiments disclosed, an intuitive user interface is provided to a user such that a user may generate music associated with different emotions and smoothly transition between generating music associated with different emotions. The user interface provides for smoother and less audible jarring of music when transitioning between music associated with different emotions, and/or the like. The unique input of each user will cause the music that is generated to uniquely vary in sound and expression.

Additionally and/or alternatively, these methods, systems, and apparatuses may be used as assistive sound guides for goal-based activities. Continuous control over musical content and expression can allow for morphing between different musical states to convey to the user the direction they are moving in from their initial state. The changing characteristics in the audio can indicate to the user the direction moved in from the initial state, if they are closer or father away from their goal, how quickly they are moving in either direction. These methods, systems, and apparatus may be used to generate continuously evolving and/or changing sound characteristics over time to direct a user toward a desired state or goal. In a non-limiting example, various embodiments may be configured to exercise continuous control over musical/sound characteristics based on input from one or more sensors (e.g., one or more biometric/health sensors, motion sensors, distance sensors, GPS sensors, touch screen position, pressure sensor and/or the like). In some embodiments, the musical characteristics may also evolve or change to act as a guide to guide a user to a desired location (e.g., conveying a person's current position and/or the direction he or she is moving).

In several non-limiting examples, the musical/sound characteristics may act to guide a user from a negative state to a positive state, from a stressed state to a relaxed state, from a non-meditative state to a meditative state, from an unfocused state to a focused state, from a restful state to an exercise state, from an exercise state to a restful state, from a first location to a second location, and/or the like. Additionally and/or alternatively, the music may guide a user through increasing/decreasing an intensity of a workout, increasing/decreasing a breathing pattern, increasing/decreasing a heartrate, increasing/decreasing a number of steps per minute, and/or the like. In other embodiments, the music may act as a musical guide/navigator for the visually impaired or to enhance the experience of a visual task such as navigation in the real or virtual environment. In yet other embodiments, the evolving music may guide a user to better posture and/or balance.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, user communication technology, music content generation technology, music content navigation or selection technology, user interface technology, audio playback technology, and/or the like. In other aspects, certain embodiments, can improve the functioning of user equipment or systems themselves (e.g., music players, music streaming or downloading systems, audio playback devices, etc.), for example, by, analyzing, with a computing system, a communication to determine at least one emotion or state contained within the communication, embodiments can determine a particular state that a user/person or technology is experiencing and generate music associated with the at least one state contained within the communication. Additionally and/or alternatively, a user interface may be provided that facilitates the generation of music and transitions between music associated with different states to convey to the user the current state musically. In particular, to the extent any abstract concepts are present in the various embodiments, those concepts can be implemented as described herein by devices, software, systems, and methods that involve specific novel functionality (e.g., steps or operations), such as, analyzing a communication to determine at least one emotion or state contained within the communication and generating music associated with the at least one emotion contained within the communication and utilizing a user interface to generate music associated with a particular emotion and to smoothly transition between music associated with different states, and/or the like, to name a few examples, that extend beyond mere conventional computer processing operations. These functionalities can produce tangible results outside of the implementation of a computer system, including, merely by way of example, optimized presentation of audio content (e.g. music associated with an emotion) to a user, generation of audio content (e.g. music associated with an emotion or state), and transitioning of audio content (e.g. music associated with an emotion or state). The presentation of audio content allows users to provide a soundtrack to their communications or function as the communication itself. The generation/transitioning of audio content provides for smoother and less audibly jarring changing of audio content, and/or the like, at least some of which may be observed or measured by customers.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-12 illustrate some of the features of the method, system, and apparatus for generating music (and/or other audio/sound content), and, more particularly, to methods, systems, and apparatuses for generating music (and/or other audio/sound content) associated with an emotion contained within a communication and for a user interface for generating music associated with an emotion or state, as referred to above. Although the specification generally refers to generating music, it should be noted that other interactive audio/sound content (e.g., reactive sound, reactive audio, and/or the like) may be generated using the methods, systems, and apparatuses described below. The methods, systems, and apparatuses illustrated by FIGS. 1-12 refer to examples of different embodiments that include various components and steps, which can be considered alternatives or which can be used in conjunction with one another in the various embodiments. The description of the illustrated methods, systems, and apparatuses shown in FIGS. 1-12 is provided for purposes of illustration and should not be considered to limit the scope of the different embodiments.

With reference to the figures, FIG. 1 is a schematic diagram illustrating a system 100 for generating music, in accordance with various embodiments. Although the generation of music is often referred to throughout the specification, a person of ordinary skill in the art can understand that similar methods that generate music may be used to generate sound and/or audio.

In the non-limiting embodiment of FIG. 1, system 100 might comprise one or more user devices 105 (also referred to as "computing system 105") and a data store or database 110a that is local to the one or more user devices 105. In some cases, the database 110a might be external, yet communicatively coupled, to the one or more user devices 105. In other cases, the database 110 might be integrated within a user device 105. User device 105 might comprise a display 105a. The display 105a may be a touchscreen display that is configured to receive tactile input from a user or a display that is configured to receive input from a mouse. The database system may apply some preprocessing to the data before it is fed into the music system as an input. Additionally and/or alternatively, system 100 may further comprise one or more input devices 115 and one or more audio playback devices 120a-120n (collectively, "audio playback devices 120" or "speakers 120" or the like), and/or the like.

Each of the one or more user devices 105, the one or more input devices 115, and/or the one or more audio playback devices 120, might be communicatively coupled to each other, either via wireless connection and/or via wired connection. Additionally and/or alternatively, each of the one or more input devices 115, and/or the one or more audio playback devices 120 might be integrated within user device 105.

The one or more user devices 105 might each be configured to receive user input from a user. The user input may be received through touch input from the user, through the use of a mouse, and/or the like. The one or more user devices may further be configured to receive communications from data streams (e.g., text communications, voice communications, Internet of Things ("IoT" e.g., smart home appliance) communications, video communications, biometric/health or physiological sensor communications, and/or the like), according to some embodiments. In some cases, the user devices 105 might include, without limitation, a desktop computer, a television, a tablet computer, a laptop computer, a video game console, a smart phone, an e-reader, a smart watch, a portable fitness tracker, an electroencephalography ("EEG") device, medical equipment, fitness gym equipment, a virtual reality ("VR") device, an augmented reality ("AR") device, and/or the like. The one or more user devices 105 may further be configured to receive communications from one or more input devices 115. The one or more input devices 115 may include, without limitation, a tablet computer that has been paired, synced, or synchronized with the user device 105, a laptop computer that has been paired, synced, or synchronized with the user device 105, a smart phone that has been paired, synced, or synchronized with the user device 105, a sensor that has been paired, synced, or synchronized with the user device 105, a biometric/health or physiological sensor that has been paired, synced, or synchronized with the user device 105, a fitness tracker that has been paired, synced, or synchronized with the user device 105, an EEG device that has been paired, synced, or synchronized with the user device 105, a virtual reality ("VR") device that has been paired, synced, or synchronized with the user device 105, an augmented reality ("AR") device that has been paired, synced, or synchronized with the user device 105, a camera that has been paired, synced, or synchronized with the user device 105, a facial recognition sensor that has been paired, synced, or synchronized with the user device 105, a distance sensor that has been paired, synced, or synchronized with the user device 105, a motion sensor that has been paired, synced, or synchronized with the user device 105, a movement sensor that has been paired, synced, or synchronized with the user device 105, a skin conductance sensor that has been paired, synced, or synchronized with the user device 105, a speed or velocity sensor that has been paired, synced, or synchronized with the user device 105, an air movement sensor that has been paired, synced, or synchronized with the user device 105, a pressure sensor that has been paired, synced, or synchronized with the user device 105, an accelerometer that has been paired, synced, or synchronized with the user device 105, a gyroscope sensor that has been paired, synced, or synchronized with the user device 105, an IoT sensor that has been paired, synced, or synchronized with the user device 105, a temperature sensor that has been paired, synced, or synchronized with the user device 105, a weather sensor that has been paired, synced, or synchronized with the user device 105, a humidity sensor that has been paired, synced, or synchronized with the user device 105, one or more security sensors that has been paired, synced, or synchronized with the user device 105, a smart home interface device (e.g., echo, etc.) that has been paired, synced, or synchronized with the user device 105, and/or the like and/or combinations of the like.

Each of the one or more user devices 105 and/or input devices 115 may be located with a user, at a customer premises, in a home, in a car, at a gym, at a wellness centers, in a medical center, in a physical therapy center, at a hotel, at a retail store, and/or the like.

In some embodiments, the computing system 105 might comprise one of a processor within the user device 105 running a software application ("app"), a processor within the input device 115 running an app, a processor within one of the audio playback devices, and/or the like. In some embodiments, the audio playback devices 120 might each include, without limitation, one or more speakers external to but communicatively coupled to the user device 105 and/or input device 115, one of one or more speakers integrated within the user device 105 and/or input device 115, one or more headphones, one or more earbuds, one or more sound bars, one or more wireless speakers, or one or more stereo speakers, and/or the like.

System 100 might further comprise one or more music content sources or servers 125 or music generation sources or servers 125 and corresponding databases 130 that might communicatively couple to the computing system 105 via one or more networks 140 (and in some cases, via one or more telecommunications relay systems 150, which might include, without limitation, one or more wireless network interfaces (e.g., wireless modems, wireless access points, and the like, one or more towers, one or more satellites, and/or the like). The lightning bolt symbols are used to denote wireless communications between the one or more telecommunications relay systems 150 and each of at least one of the user devices 105, between the telecommunications relay systems 150 and each of at least one of the input devices 115, between the one or more user devices 105 and each of at least one of the input devices 115, between the user devices and each of the one or more audio playback devices 120a-120n, between the input devices 115 and each of at least one of the one or more audio playback devices 120a-120n, and/or the like.

At least one of computing system 105, input device 115, or at least one audio playback device 120 might receive a communication and/or user input, the user communication and/or user input may contain and/or indicate at least one state of a user, a person other than a user, a state of an environment, a state of a digital book, a state of a video game, and/or the like. A state of the user and/or a person other than a user might correspond to at least one of an emotion of a user and/or a person other than a user, a feeling of a user and/or a person other than a user, a location of the user and/or a person other than a user, a physical position of a user and/or a person other than a user, a level of activity of a user and/or a person other than a user, an action of a user and/or a person other than a user, and/or the like. A state of an environment might correspond to at least one of a weather situation (e.g., sunny, rainy, etc.), a temperature of an area, an amount of humidity, an amount of light, a time of day, a time of year, and/or the like. A state of a digital book might be at least one of a state of one or more characters in a book, a scene of a book (e.g., action, suspenseful, etc.), and/or the like. A state of a video game might be at least one of a state of one or more characters in a book, a scene of a book (e.g., action, suspenseful, etc.), and/or the like. A processor of the computing system 105, input device 115, or at least one audio playback device 120 may analyze the user and/or communication to determine at least one state indicated by the user input and/or at least one state contained within the communication.

In some embodiments, the communication that is analyzed to determine at least one state of a user, a person other than a user, an environment, etc. may be at least one of a sensor communication, an IoT sensor communication, a biometric/health communication, a movement-based gesture communication, a voice communication, a textual communication, a photographic communication, a video communication, a virtual reality ("VR") communication, an augmented reality ("AR") communication, a numerical communication, a vehicular communication, and/or the like. The computing system 105, input device 115, and/or at least one audio playback device 120 may receive input from the one or more communications periodically (e.g., every second, every minute, every few seconds, every few minutes and/or the like).

A sensor communication may contain feedback from one or more sensors including, but not limited to, one or more GPS sensors, one or more distance sensors, one or more motion sensors, one or more movement sensors, one or more speed or velocity sensors, one or more accelerometer sensors, one or more gyroscope sensors, one or more biometric/health sensors, one or more facial recognition sensors, one or more cameras, one or more weather sensors, one or more temperature sensors, one or more ambient light sensors, one or more humidity sensors, one or more audio sensors, and/or the like. Based on input from the one or more sensors, the computing system 105, input device 115, and/or at least one audio playback device 120 may determine a state that a person is experiencing or a state of the environment.

An IoT sensor communication may contain feedback from one or more IoT sensors contained within a home. The IoT communication may be sent by one or more smart home devices (e.g., echo, google home, etc.). For example, the one or more IoT sensors might include one of one or more thermometers in one or more rooms, one or more infrared ("IR") thermometers aimed at one or more positions in the one or more rooms, one or more air flow sensors in the one or more rooms, one or more air flow sensors in air ducts directed toward the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms or outside the customer premises, one or more humidity sensors in the one or more rooms, one or more smoke detectors detecting smoke in the one or more rooms, one or more gas detection sensors detecting gas in the one or more rooms, one or more biometric sensors identifying at least one person, or one or more health device with sensors detecting health information for at least one person, and/or the like. Based on input from the one or more sensors, the computing system 105, input device 115, and/or at least one audio playback device 120 may determine a state that a person is experiencing or a state of the environment. The music may be adapted to change in real-time as the state of the user, other person, or environment changes based on feedback from the one or more sensors contained in the IoT communications.

A biometric/health communication may contain biometric/health feedback from at least one of a medical device, smart phone, a smart watch, a fitness tracker, an EEG device, and/or the like. The biometric/health feedback may include at least one of a heart rate, a HRV, a breathing rate, a blood pressure, a stress level, a measure of electrical activity within a brain, pupil dilation, skin conductivity, and/or the like. Based on the at least one of a heart rate, a blood pressure, a stress level, a measure of electrical activity within a brain, and/or the like, the computing system 105, input device 115, and/or at least one audio playback device 120 may determine a state that a person or an environment is experiencing.

In a non-limiting example, if a heart rate is elevated, then the computing system 105, input device 115, and/or at least one audio playback device 120 may determine that a person is stressed. The music that the computing system 105, input device 115, and/or at least one audio playback device 120 generates may be louder and have a faster rhythm to reflect that a person is feeling stressed. Alternatively, the system may play music to compliment a person's state and play calming music when the person is stressed to guide a user from a negative state into a more positive state. Additionally and/or alternatively, in a non-limiting example, if a heart rate is low and/or skin conductivity or pupil dilation is low then the computing system 105, input device 115, and/or at least one audio playback device 120 may determine that a person is calm. The music that the computing system 105, input device 115, and/or at least one audio playback device 120 generates may reflect the person's calm state and/or the music that is generated may be designed to cause a person to become excited. The music may be adapted to change in real-time as the state of the user and/or other person changes in the biometric/health communication. Preset parameters within the music system define different states. Interpolation of the parameters defining each state allows for continuous morphing of the music between states.

Additionally and/or alternatively, multiple biometric communications may be received from multiple users. The music generated from the communications may be used to reflect how one or more users are doing in a competitive activity (e.g., a swim race, a track race, virtual race etc.). Additionally and/or alternatively, the music that is generated may be used to reflect the compatibility/connectiveness of a team.

A voice communication may be obtained from at least one of a phone call, voice input, microphone input, and/or the like. The computing system 105, input device 115, and/or at least one audio playback device 120 may parse the words contained within the voice communication to determine one or more particular states that at least one person is experiencing. Additionally and/or alternatively, the computing system 105, input device 115, and/or at least one audio playback device 120 may determine a tone of voice used in the voice communication to determine at least one state that a person is experiencing. For example, a higher, louder tone of voice might indicate happiness while a lower, quieter tone of voice might indicate sadness. The music may be adapted to change in real-time as the state of the user and/or other person changes in the voice communication.

A textual communication may be obtained from at least one of a text message, an email message, an instant message, a webpage, an e-book, and/or the like. The computing system 105, input device 115, and/or at least one audio playback device 120 may parse the words contained within the textual communication to determine one or more particular states that at least one person and/or character is experiencing. Computing system 105, input device 115, and/or at least one audio playback device 120 may perform machine translation on the text. The computing system 105, input device 115, and/or at least one audio playback device 120 may further determine whether one or more emojis are contained within the textual communication and determine one or more states associated with the one or more emojis contained within the textual communication. The music may be adapted to change in real-time as the state of the user and/or other person changes in the textual communication.

A photographic communication may be obtained from at least one of a photograph, video, and/or the like. The computing system 105, input device 115, and/or at least one audio playback device 120 may analyze the facial expression, body language, and/or the like of one or more persons in the photograph to determine one or more particular states that the at least one person or character is experiencing. The computing system 105, input device 115, and/or at least one audio playback device 120 may analyze the facial expression, body language, and/or the like of one or more persons and/or characters in the video to determine one or more particular states that the at least one person/character is experiencing. The computing system 105, input device 115, and/or at least one audio playback device 120 may also parse the dialogue of the at least one person in the video or determine a tone of voice of the at least one person in the video to determine one or more particular states that the at least one person/character is experiencing. The music may be adapted to change over time as the state of the user and/or other person changes in the photographic communication.

A VR communication and/or AR communication may be obtained from VR/AR devices (e.g., cell phones, tablets, headsets, glasses, goggles, lenses, and/or the like) or be a parameter built into the game determined by the context within the game. The computing system 105, input device 115, and/or at least one audio playback device 120 may analyze the facial expression, body language, and/or the like of the user of the AR/VR device, one or more persons interacting/communicating with the user of the AR/VR device, and/or one or more characters displayed by the AR/VR device. The computing system 105, input device 115, and/or at least one audio playback device 120 may also parse the dialogue or determine a tone of voice of the user, one or more persons interacting with the user of the AR/VR device, and/or one or more characters displayed by the AR/VR device. Additionally and/or alternatively, the computing system 105, input device 115, and/or at least one audio playback device 120 may detect how a person is performing in a game and generate music based on the person's performance. In non-limiting examples, if the user is doing well, then the music that is generated may be more upbeat, if the user is in an action scene, the music that may be generated may be more intense, if the character is performing poorly, then the music generated may become more tense, if the user's character dies in the game, then the music that is generated may contain lower tones, and/or the like. The music may be adapted to change continuously in real-time as the state of the user and/or other person changes in the VR/AR communication.

A numerical communication may be obtained from one or more trading applications, option prices, profit/loss calculations, risk calculations, etc. The audio may change continuously to convey real-time price changes, risk changes, etc.

A vehicular communication may be obtained from one or more vehicular components (e.g., one or more location sensors, one or more motion sensors, one or more speed sensors, or more velocity sensors, one or more GPS, one or more acceleration sensors, one or more pressure sensors, one or more force/impact sensors, one or more steering sensors, one or more autonomous vehicle controls, one or more self-driving controls, one or more position sensors, one or more other vehicular sensors, a horn, and/or the like). The music or audio may be adapted to change continuously in real-time as the state/action of the user, other person, environment of surrounding a vehicle, and/or the vehicle changes in the vehicular communication. For example, based on the input from the vehicular component, the system may determine the driver or passenger is distracted or stressed. Music or audio may then be generated to help the driver or passenger focus or relax. Additionally, the audio generated can be used to enhance the communication of a horn, where different states can convey information to another vehicle about why the horn signal was pressed by the driver or passenger.

Additionally and/or alternatively, the computing system 105, input device 115, and/or at least one audio playback device 120 may receive an indication from a user on a display of the computing system 105, the input device 115, and/or the at least one audio playback device 120. The indication may be received via tactile input or input via a mouse. Each state may be mapped to a position in a circular pattern (shown in FIG. 2), an XY coordinate system (shown in FIG. 9D), an XYZ coordinate system, and/or the like.

In some embodiments, the music/audio that is generated may be based on a combination of two or more of one or more sensor inputs, one or more communications, and/or one or more user indications.

Based on the at least one determined state indicated by one or more sensor inputs, contained within the communication, and/or indicated by the user input, the processor of the computing system 105, input device 115, and/or at least one audio playback device 120 may autonomously determine one or more first characteristics of a plurality of characteristics of music/audio associated with the determined at least one state indicated by one or more sensor inputs, contained within the communication, and/or indicated by the user. Additionally and/or alternatively, the computing system 105, input device 115, and/or at least one audio playback device 120 may access database 110*a* and/or music source 125 to determine one or more first characteristics of a plurality of characteristics of music associated with the determined at least one state contained within the communication and/or indicated by the user. The one or more first characteristics of the plurality of characteristics of music may include at least one of a note selection, a note pattern, an envelope, a harmony or combination of notes, an orchestration, a timbre quality, a filter, a speed, a rhythm, and/or a volume associated with the first state indicated by the communication.

The communication and/or indication may further indicate an age and/or sex of a user. The one or more first characteristics of a plurality of characteristics of music may further be associated with the at least one of the age or the sex contained within the communication and/or indicated by the user input. The music that is generated may further have one or more characteristics of the plurality of characteristics associated with the at least one of the age or the sex indicated by the communication and/or user input. In a non-limiting example, people associated with an older age demographic may prefer classical music rhythms and orchestrations while people associated with a younger age demographic may prefer hip-hop music rhythms and orchestrations. The demographics may determine initial position of the music system and shape the directions, (states or presets) that the system will move to.

Additionally and/or alternatively, a user may be able to indicate characteristics of music that the user prefers to have. For example, a user may prefer to listen to hip hop music. Computing system 105, input devices 115, and/or playback devices 120 may receive this input (indicating that a user prefers hip hop music) and generate music having hip hop characteristics (e.g., featuring sub bass, louder low frequencies, characteristic rhythmic attributes, and/or the like).

A user may explicitly indicate a particular preference for certain types of music and/or computing system 105 may determine types of music a user prefers. For example, computing system 105 may monitor the type of music a user buys or listens to on an application (e.g., a music application). Based on the determined music a user buys and/or listens to on the application, the computing system 105 may generate music that has similar characteristics. For example, a user may buy and listen to mostly classical music, the computing system 105 may then generate music having classical characteristics such as orchestra sounding instruments so that the music that is generated in appealing to the user.

Additionally and/or alternatively, instead of detecting states, computing system 105 may detect different types of elements and/or concepts. In a non-limiting example, computing system 105 may detect different types of scenes (e.g., action scene, adventure scene, landscape scenes, traffic scenes, and/or the like) of a book, video game, movie, and/or the like. The music that is generated may further have one or more characteristics of the plurality of characteristics associated with the at least one of the type of scene indicated by the communication and/or user input. In a non-limiting example, a particular part of a book may have a sword fight and the music that is generated may have a faster rhythm and louder volume to reflect that the scene is an action scene. Additionally and/or alternatively, computing system 105 may detect a state and/or action (e.g., running, walking, biking, sitting down, swimming, driving, etc.) of the user. For example, the computing system 105 may generate faster music when it determines a person is running and generate slower music when it determines a person is sitting down. Alternatively, a car may be stuck in traffic and the music that is generated might be designed to calm a driver. Alternatively, a driver may be falling asleep and the music generated might be designed to wake up the driver.

In additional embodiments, computing system 105 may detect a type of application that is using the music generation system. The music that is generated may be adjusted to fit the application, game, sensor system, and/or the like. For example, if the music generation system is being used to supplement a voice conversation, then the music that is generated may contain lower tones/volumes. If the music generation system is being used to supplement information received from a fitness tracker, then the music that is generated may contain higher tones/volumes or stronger rhythmic attributes. If the music is functioning as background sound in a VR/AR game, it may not only portray psychological and physical state of the player but also convey player's performance in the game.

Based on the determination of the one or more first characteristics of a plurality of characteristics of music associated with the computing system 105, input device 115, and/or at least one audio playback device 120 may generate music having the one or more first characteristics of the plurality of characteristics associated with the at least one state/element/concept contained within the communication and/or indicated by the user. The music may change as the input(s) from the one or more communications change. The music may change periodically (e.g., every second, every minute, every few seconds, every few minutes). The generated music may further contain one or more first characteristics associated with the at least one of the age or the sex indicated by the communication and/or user input. Additionally and/or alternatively, the generated music may further have one or more characteristics indicated by a preference of the user.

The music may be generated using one or more of frequency modulation, additive synthesis, subtractive synthesis, wave table synthesis, granular synthesis or sample-based synthesis and/or the like. The music may be generated from input from one or more communications (e.g., a sensor communication, an IoT sensor communication, a biometric/health communication, a movement-based gesture communication, a voice communication, a textual communication, a photographic communication, a video communication, a virtual reality ("VR") communication, an augmented reality ("AR") communication, a tactile communication, and/or the like). The music generated from two or more communications may be synthesized and harmonized together.

Additionally and/or alternatively, the music that is generated may be designed to have an opposite effect on the user listening to the music, complimenting their current state. For example, if the computing system 105, input device 115, and/or at least one audio playback device 120 determines that a user is sad based on the state detected within the communication, then the music that is generated may have one or more characteristics associated with the emotion "Happy" to uplift the user's spirits.

Each emotion, age, sex, and/or preference may have a customized algorithm for generating music that reflects the determined emotion, element/concept, scene, age, sex, and/or preference of a person. These algorithms may be inspired by soundtrack clichés, like those used in Hollywood films and/or used by composers. These algorithms may be inspired by associations of musical attributes to emotion perceived in music from psychoacoustics research. These algorithms may be contained in database 110*a*, music source 125, and/or database 130.

The music that is generated may be digital instruments which sound like real instruments (e.g., violins, violas, flutes, drums, etc.). Additionally and/or alternatively, the music that is generated may not be limited to instrumental music, but rather, synthesized electronic instruments, that may compose the sound generated to convey a human emotion. The model can be, for instance, generalized to include vocal synthesis and/or imitate human or animal sounds (e.g., birds, whales, and/or the like). Synthesized vocalizations may imitate natural human expressions and responses with associated emotions.

The generated music may be configured to evolve over time and transition between different states as the user's state changes, the one or more persons' state changes, and/or the state of the environment changes. Additionally and/or alternatively, the music may be configured to guide a user toward a desired state by continuously adapting based on at least one of the one or more sensor inputs, the one or more communications, and/or one or more indications by a user.

In yet another non-limiting example, the computing system 105, input device 115, and/or at least one audio playback device 120 may exercise continuous control over one or more musical characteristics to cause the one or more musical characteristics to evolve or change over time and guide a user from one state to another state. For example, based on feedback received from the one or more communications, the computing system 105, input device 115, and/or at least one audio playback device 120 may continuously control the one or more musical characteristics to guide a user from a first state to a second desired state. This process will be described more with respect to FIGS. 9 and 10, below.

The music that is generated by computing system 105 may further have human-like embellishments. Human performers have a natural imprecision which must be explicitly accounted for in computer generated music. To do this, irregular micro-fluctuations are added to the timing of note onsets. This kind of small random signal bias is often referred to as "timing jitter." As a result, quantized notes are gently un-quantized to provide a more pleasing and human-sounding musical aesthetic. Timing jitter provides subtle rhythmic variation that add nuance to the static note patterns.

Similar to jittered timing offsets ("timing jitter"), "frequency jitter" is utilized to modulate the frequency (pitch) of the generated music. Depending on the duration and articulation of the note, frequency jitter parameters will change. For instance, long sustained notes will be subject to more evolved jitter (gradual drift), a technique to add warmth; while shorter, more percussive notes will have little to no jitter.

Jitter may also be mapped to a number of other parameters in charge of producing timbre or the sound qualities of the notes. This is referred to as "timbral jitter." These parameters exist due in part to the real-time audio synthesis engine, which allow dynamic control and modulation of a sound over time via digital signal processing.

The generated music associated with the at least one determined state may be played through one or more playback devices 120.

In a non-limiting example, if the computing system 105, input device 115, and/or at least one audio playback device 120 determines that a communication and/or indication contains the state "Happy," the music that is generated may contain higher notes and a faster rhythm. If the computing system computing system 105, input device 115, and/or at least one audio playback device 120 determines that an indication and/or communication contains the state "Sad," the music that is generated may contain lower notes and a slower rhythm. Additionally and/or alternatively, if the computing system 105, input device 115, and/or at least one audio playback device 120 determines that a communication contains an environmental state of "Sunny" the music that is generated may contain higher notes and a faster rhythm.

The computing system 105 may detect that more than one state is contained within the communication and/or indicated by a user. If the computing system 105 detects at least two states, then the computing system may simultaneously generate, play, and/or harmonize the music that is associated with the at least two states. Additionally and/or alternatively, if the computing system detects at least two states, then the computing system may determine an order to play music associated with each of the at least two states and smoothly transition between playing music associated with each of the at least two states. Depending on the number of emotions contained within each indication and/or communication, the computing system 105 may determine an order of subsets of two or more states to simultaneously generate, play, and/or harmonize and smoothly transition between playing music associated with each subset of two or more states.

If the music associated with the at least two states are played in a particular order, the music associated with each state may be played for a predetermined amount of time (e.g., the music/sound may be played until a note is finished playing, until a sequence has ended, and/or the like) before transitioning. Additionally and/or alternatively, the music associated with each state may be transitioned based on a tracked position of a user in a communication (e.g., a book or text) or based on which person is talking in a phone call. Computing system 105 may further use a fitness tracker, an EEG device, a video communication, and/or a voice communication to track how a user's state or another person's state is changing and transition to different music based on a determined change in a user's state and/or another person's state in real-time or near real-time. In order to transition the generated music in real-time or near real-time, the computing system may introduce interpolation in different areas which enables gradual and/or abrupt transition between musical parameters associated with different emotions. There may be a mixture of interpolation including smoothed continuous control (which may feature a smoothing filter) and beat quantized transitioning. Interpolated aspects of music may include harmonic, timbre, orchestration and rhythmic content in order to transition smoothly from one musical aspect or phrase to another.

In a non-limiting example, the communication may be a book, or digital medium with a narrative and computing system 105 may track where a particular user is in the narrative. Based on one or more states contained within a particular part of the narrative, the computing system may generate music associated with those states. The music associated with these states may be harmonized and/or played in the order that each state appears on the page of book. This creates a customized soundtrack associated with the book and adds an additional element beyond merely reading the text or viewing video content in digital medium.

In an additional non-limiting example, a calling party may be having a phone conversation with called party and the computing system 105 may determine a particular state associated with both the calling party and the called party. The computing system may play music associated with each state simultaneously or play music associated with the particular person when that particular person is talking. The music may be played at a lower volume so that the music adds additional elements to the conversation without drowning out the conversation between the calling party and the called party.

In an additional non-limiting example, a fitness tracker may be used to track a user as the user is transitioning through a work out. The fitness tracker may detect that a user is cooling down from a workout and transition the music that is generated from excited/vigorous to calm/soothing.

In an additional non-limited example, a fitness tracker, handheld device or exercise machine may be used to track the cyclic nature of a work out. The tempo and rhythmic pattern of the music generated will adapt to the cyclic activity in the workout.

In an additional example, a movement detector from a handheld device may detect the amount of movement during a work-out. The amount of movement may be used to increase the energy in the music generated.

Figure 2A:
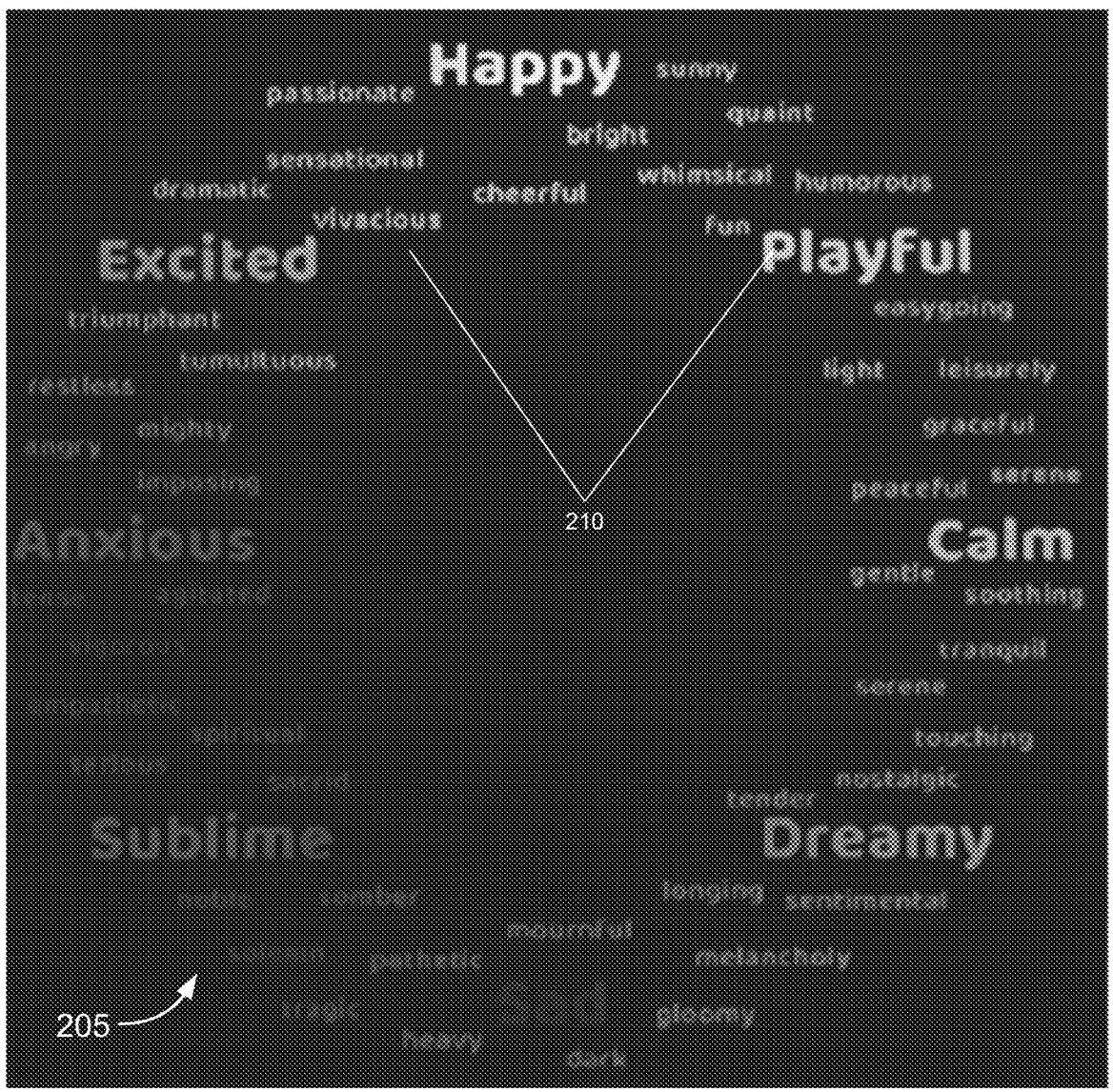
FIGS. 2A-2C illustrate user interface designs for interacting with the music/audio and music/audio generation system, in accordance with various embodiments.
Figure 2B:
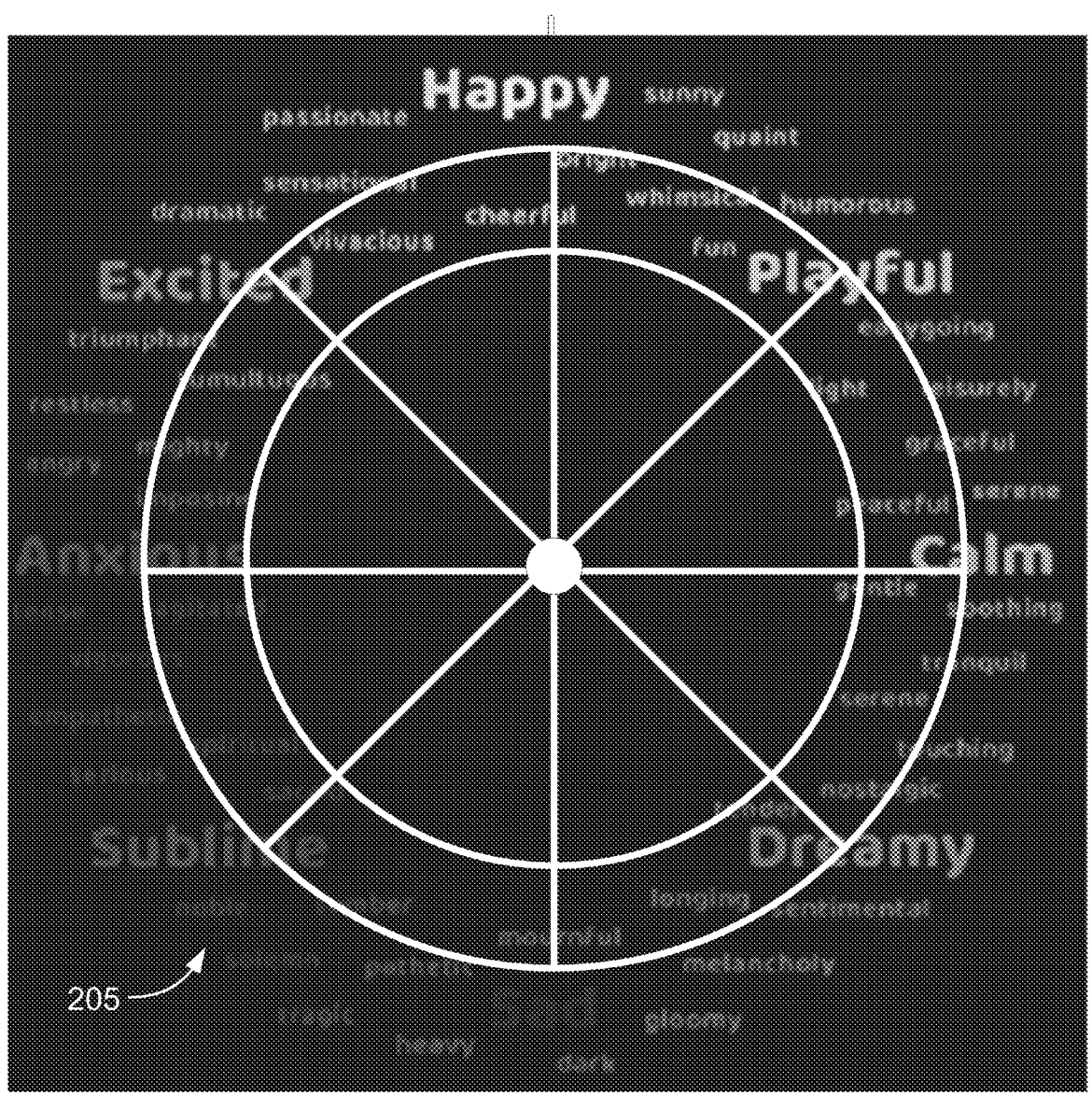
Figure 2C:
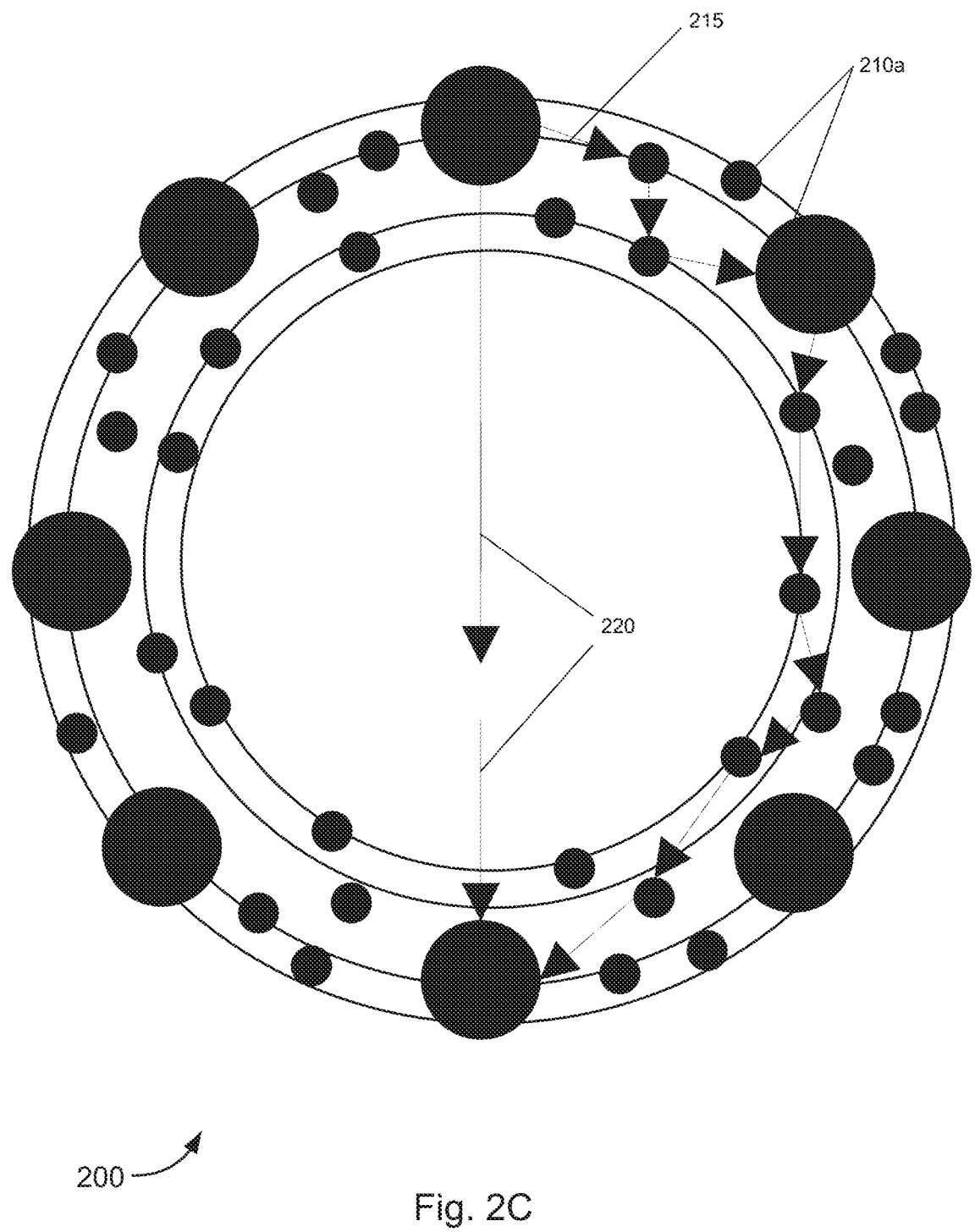

Each state may be associated with an icon (e.g., a text icon and/or emoji icon) and each icon may be mapped to a circular pattern/wheel 205, shown in FIG. 2. Additionally and/or alternatively, instead of icons, each state may be mapped to a position on a circular pattern/wheel 205. FIGS. 2A-2C (collectively, FIG. 2) illustrate user interface designs 200 (also referred to as user interface 200) for interacting with the music generation system (as described with respect to FIGS. 1 and 3-9), in accordance with various embodiments.

The circular pattern/wheel 205 is not limited to only being a circle. The circular pattern could be any pattern (e.g., an oval, triangle, square, rectangle, a two-dimensional graph (e.g., an XY graph, etc.) on a two-dimensional plane. Additionally and/or alternatively, the circular pattern/wheel 205 may be a three-dimensional shape or graph. A person of ordinary skill in the art would understand that any pattern may act in a similar manner as the circular pattern 205 described below. A two-dimensional graph is described in more detail below with respect to FIG. 9D. The two-dimensional graph 900*d* shown in FIG. 9D may be used in a similar manner as user interface 200.

According to some embodiments, the user interface 200 may display states detected from a communication. A user may then determine from the displayed states what type of music is being generated. The user interface 200 may display only those states detected in the communication. Alternatively, the user interface 200 may display, a plurality of icons 210 and/or positions associated with particular states mapped to a circular pattern 205 and the icons and/or positions associated with the states detected in the communication may be highlighted or bolded to stand out from the rest of the icons/positions on the circular pattern 205.

Additionally and/or alternatively, the circular pattern 205 may display icons associated with elements/concepts other than states. For example, the icons 210 may be associated with scenes (e.g., action scenes, horror scenes, romance scenes, and/or the like) from a movie, book, video game, and/or the like. The music that is generated may then have musical characteristics associated with the scenes (e.g., action scenes, horror scenes, romance scenes, and/or the like). Additionally and/or alternatively, the icons 210 may be associated with an action of the user. For example, different sensors and/or input devices may detect and/or a user may input whether a person is running, walking, biking, sitting down, etc. and the generated sounds may reflect the action of the user. In a non-limiting example, the music that is generated, when the user is sitting down, may be slower than the music that is generated when the user is running.

Additionally and/or alternatively, according to some embodiments (shown in FIG. 2A), a plurality of icons 210 and/or positions associated with particular states and/or other elements/concepts may be mapped to a circular pattern 205 and displayed to a user on user interface 200. The icons may be text icons and/or emojis. Each icon 210 and/or position may be color coded based on the particular state and/or other element/concept it represents. Additionally and/or alternatively, a particular state and/or other element/concept may be represented by an emoji associated with that particular state.

The circular pattern 205 may be displayed to a user on a computing system and/or communication device. The user interface 200 may be hosted on a webpage that is accessible by a user and/or stored in memory of a computing system/communication device. An icon, thumbnail, shortcut, or the like for the user interface 200 may be displayed in a text messaging application, an email application, a video communication application, an e-book, and/or the like. A user may select the icon, thumbnail, shortcut, and/or the like to enable the music generation system/method to determine states contained in communications and/or to display the full user interface 200 to a user.

Additionally and/or alternatively, the computing system and/or communication device may use the circular pattern 205 to determine a location of a particular state represented by an icon/position on the circle without displaying the wheel 205 to the user. An icon, thumbnail, shortcut, or the like for the user interface 200 may be displayed in a text messaging application, an email application, a video communication application, an e-book, and/or the like. A user may select the icon, thumbnail, shortcut, and/or the like to enable the music generation system/method to determine states contained in communications.

The wheel 205 is a circular wheel interface where a range of states and/or other elements/concepts (represented by icons 210) are mapped to different positions. The wheel 205 is the source of control for music parameters and an icon's position on the wheel determines changes in a note pattern, a harmony, a tone, an orchestration, a speed, a rhythm, a volume, and/or the like. The position of each icon on the wheel 205 is the main control over time of the generation of music. Different regions on the wheel 205 map to noticeable differences in the music that is generated by the computing system. A specific intensity and valence score may determine a state region and/or other element region on the circular or X/Y grid (shown in FIG. 9D) interface and each state region and/or other element region may correspond to particular musical parameters in the generated music.

As shown in FIG. 2B, the plurality of icons 210 and/or positions of states may be organized such that similar states and/or other elements/concepts (represented by icons 210) are grouped together in a particular region of the circular wheel 205. Similar states may have similar musical/sound characteristics to aid in smoothly transitioning between states. If a user and/or communication were to traverse around an entire circumference of the circular pattern, a beginning point and an end point would generate audio having similar characteristics because the beginning point and the end point are located in a similar region. States and/or other elements/concepts grouped together in a particular region may sound similar but have some noticeable differences. For example, a position of state on a circumference of the circular pattern or an angle of a position of a state on the circular pattern may correspond to a first subset of characteristics associated with a particular state and/or other element/concept represented by a particular position, while a distance of position of a state from a center of the circular pattern may correspond to a second set of characteristics associated with the particular state. Additionally and/or alternatively, a position of a state on a circumference of the circular pattern or an angle of a position on the circular pattern may correspond to a particular musical arrangement associated with a particular state and/or other element/concept represented by a particular position, while a distance of position of a state from a center of the circular pattern may correspond to an intensity of the particular musical arrangement.

A user may interact with user interface 200 via tactile input and/or mouse input. Additionally and/or alternatively, the user interface 200 may be used by a computing system and/or user device to determine what music to play based on an emotion contained with a communication (e.g., at least one of a sensor communication, an IoT communication, a biometric/health communication, a voice communication, a textual communication, a photographic communication, a video communication, and/or the like). A computing system may determine where a particular position associated with the determined state is on the wheel 205 and access and play the algorithm associated with the particular state based on where the state is located on the wheel 205.

Based on the user interaction with the user interface 200 and/or based on a determined state from a communication, the computing system may determine the position on a circumference of the wheel 205 of an icon 210 and/or position associated with the determined at least one particular state or an angle of the icon 210 and/or position associated with the determined at least one particular state on the circular pattern and the distance of the particular icon 210 and/or position associated with the determined at least one particular state from the center of the wheel 205. Based on the determination of the position or angle and the distance of the icon 210 associated with the determined at least one state the computing system and/or user device may generate music having the musical arrangement and the intensity associated with the determined at least one state of the communication.

Additionally and/or alternatively, the wheel 205 may facilitate transitioning between music associated with a first particular state to music associated with a second particular state. This is shown in FIG. 2C. In FIG. 2C, icons 210 and/or positions associated with a particular state are represented by circles 210a. A user may first indicate the state represented by an icon located at the top of wheel 205 via touch input, mouse input, and/or by indicating a state in a communication.

If the selection is made via touch or a mouse and after a first user indication is made, then a computing system and/or communication device may track a user's interaction with the user interface 200 and wheel 205. A user may continue to drag his or her finger or other device (e.g., mouse, stylus, and/or the like) along a path 215 on the wheel 205 indicating that the music that is generated should transition between music associated with at least two states. The music that is generated may transition in real time or near real time based on the user's interaction with the wheel 205. For example, if the user stops for a period of time on a particular icon associated with a state, then the music associated with that particular state may play for that period of time until the user stops selecting the icon and/or moves on to a different state. Additionally and/or alternatively, each icon that the user selects by dragging his or her finger or other device (e.g., mouse, stylus, and/or the like) along a path 215 may play music associated with that particular icon/state/position for a predetermined amount of time (e.g., until a note is done playing, until a sequence of notes is complete, and/or the like) before transitioning on to the music associated with the next selected icon/state/position. In some cases, the predetermined amount of time may be selected by a user of user interface 200.

The computing system and/or user device may also introduce some lag so that music that is generated by user interaction is not generated in real time. For example, if the user drags his or her finger or device over user interface 200 quickly, the computing system may not be able to transition between music associated with different states smoothly. By introducing lag, the computing system may smoothly transition between music associated with different emotions.

Additionally and/or alternatively, if a user picks up his finger and/or device (220), a computer may determine that a user would like to pause between transitioning between a first selected state and an additional selected state. The music may turn off or continue to play in static position. If the user rests on a particular state, the music can still be continuously generated.

If a selection of more than one state is made via a communication (e.g., at least one of a sensor communication, an IoT communication, a biometric/health communication, a voice communication, a textual communication, a photographic communication, a video communication, and/or the like) and the communication contains at least two states, then a computing device may determine a path 215 between a first selected state and at least one additional state. Using the states between the first selected state and at least one additional state, the computing system may smoothly transition between playing music associated with each of the at least two states contained within the communication by playing music associated with the determined additional states between music associated with the at least two particular states indicated in the communication.

Additionally and/or alternatively, the generated music may transition between music associated with the at least two states indicated in the communication by pausing music associated with a first indicated state before playing music associated with a second indicated state.

The above referenced transition methods may additionally be used to guide a user from a first state to a second desired state. The generated music may continuously guide, based on input from the one or more communications, a user from a first state to a second desired state. In a non-limiting example, a computing device may determine a path 215 between a first state and at least one additional desired state. Using the states between the first selected state and at least one additional state, the computing system may smoothly transition, based on input from the one or more communications, between playing music associated with each of the at least two states contained within the communication by playing music associated with the determined additional states between music associated with the at least two particular states indicated in the communication to guide a user towards the second desired state.

User interface 200, a computing system, and/or a communication device may give a user an option to save music that is generated by user interaction with interface 200 and/or music that is generated by analyzing the communication. A user may then playback the saved music that was previously generated. Additionally and/or alternatively, a user may be given the option to share (via social media site, text, email, phone, and/or the like) the generated music with others. The user may further be able to create a playlist of generated music and/or give the generated music a unique name.

FIG. 3 is an additional schematic diagram illustrating a system 300 for implementing the generation of music, in accordance with various embodiments. System 300 may be similar to system 100 of FIG. 1 and perform similar functions as system 100 of FIG. 1. Additionally and/or alternatively, system 300 may be used in conjunction with user interface 200 of FIG. 2.

System 300 may comprise computing system 305 (which may correspond to computing system 105 of FIG. 1). Computing system 305 may run applications such as text, voice, and/or video applications and/or receive input from input devices 310. Input devices 310 may include one or more sensor devices including one or more IoT sensors, one or more biometric/health sensor devices 310a, text/speech device 310b, VR/AR devices, fitness tracker devices, smart watches, EEG devices, one or more cameras, one or more facial recognition devices, and/or the like. Computing system 305 may also receive direct user input (control) 335 via touch, mouse, video game context and/or the like.

Computing system 305, based on the input received from input devices 310 and/or direct user input 335, may determine a state contained within the input received from input devices 310 and/or user input 335. Based on the determined state, the user interface may determine a positivity/negativity (valence) and/or intensity of music associated with the determined state (block 315). The positivity/negativity and/or intensity of the music are discussed further with respect to FIG. 4. Additionally and/or alternatively, computing system 305 may determine a position of a determined state on the circular pattern 325 or X/Y plane to determine the positivity/negativity and/or intensity of music associated with the determined state. Different combinations of positivity/negativity and/or intensity characterize different state and map to various regions around the circular pattern's circumference or position on an X/Y plane.

In addition to determining a state contained within input devices 310 and/or indicated by user input 335, the computing system may further determine user preferences, demographics, and/or the like when determining what music to generate (block 320). A user may directly enter user preferences, demographics, and/or the like. The computing system 305 may also indirectly determine user preferences, demographics, and/or the like. For example, computing system 305 may determine user habits (i.e. what types of music a user typically listens to and/or buys).

Additionally and/or alternatively, music generation parameters/characteristics may be adjusted to fit output of the application, game, sensor system, and/or the like. For example, if the music generation system is being used to supplement a voice conversation, then the music that is generated may contain lower tones/volumes. If the music generation system is being used to supplement information received from a fitness tracker, then the music that is generated may contain higher tones/volumes.

Figure 9C:
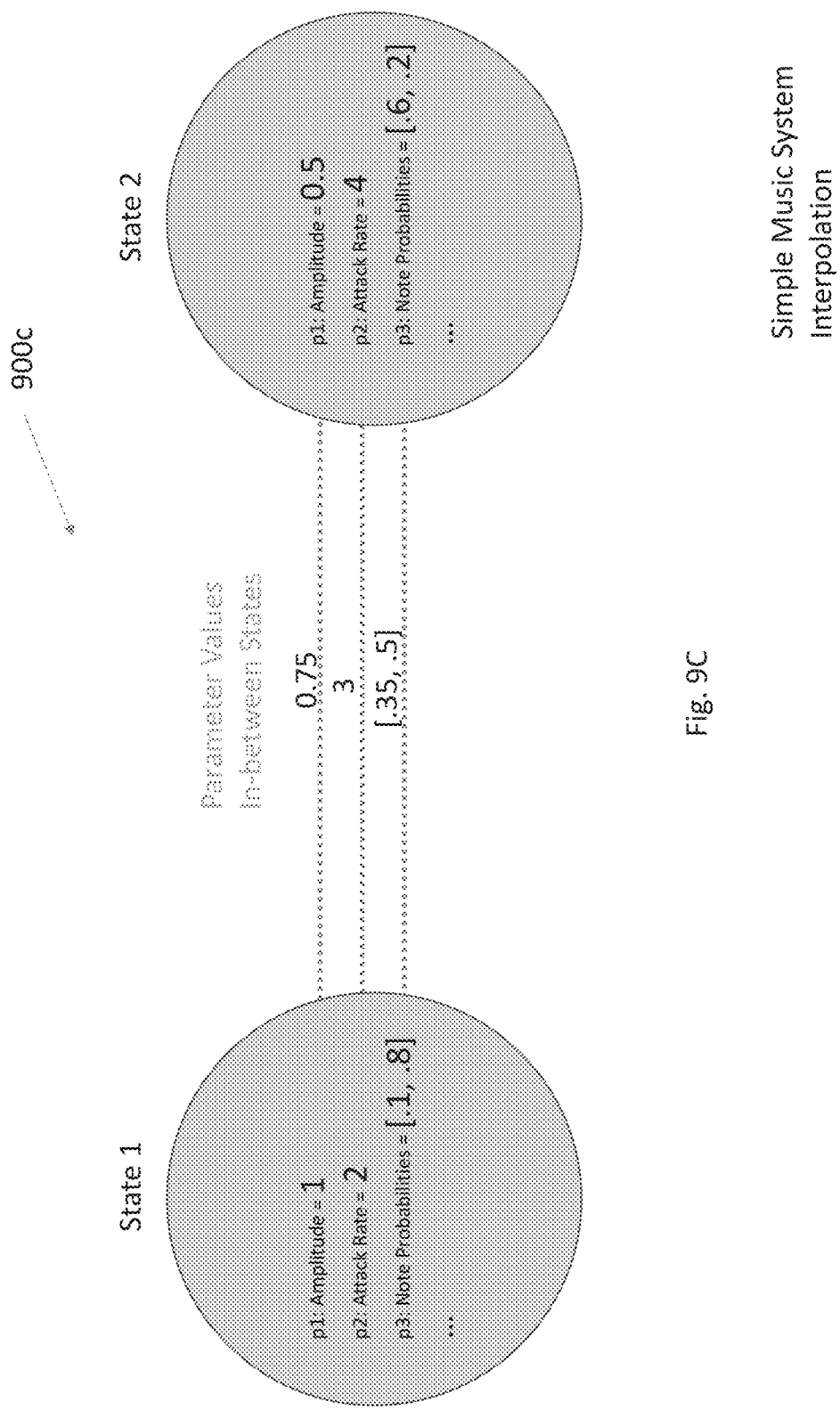
Figure 9D:
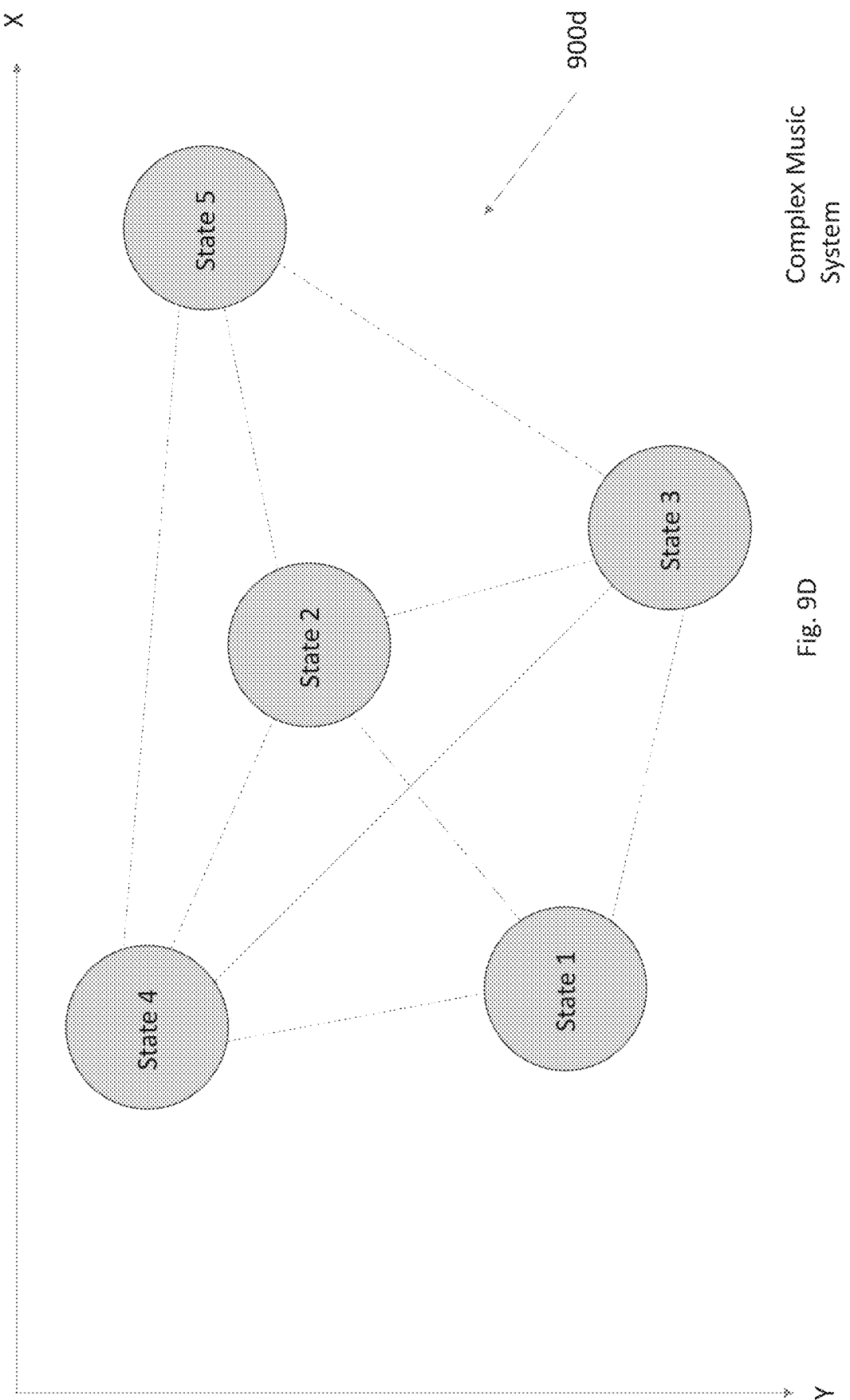

The determined positivity/negativity and/or intensity of the state may be mapped to a circular pattern 325 (which may correspond to user interface 200 of FIG. 2) and/or an XY graph (which may correspond to XY graph 900*d* of FIG. 9D). States having similar positivity/negativity and/or intensity music may be located in a similar region of the circular pattern 325 and/or graph. Additionally, different state categories may have specific positivity/negativity and/or intensity values.

User interface 325 may be displayed to a user and/or invisible to a user depending on the application of the music generation system 300. For example, if computing system 305 is analyzing text and/or voice input, then the interface 325 may be invisible. If the computing system 305 is receiving user input via touch or mouse, then the interface 325 may be displayed to a user.

After determining the positivity/negativity and/or intensity of music, the generated music may be outputted via audio output 330 (which may correspond to playback devices 120 of FIG. 1). In some embodiments, the audio output 330 might each include, without limitation, one or more speakers external to but communicatively coupled to the computing system 305 and/or input device 310, one of one or more speakers integrated within the computing system 305 and/or input device 310, one or more headphones, one or more earbuds, one or more sound bars, one or more wireless speakers, or one or more stereo speakers, and/or the like.

Figure 4B:
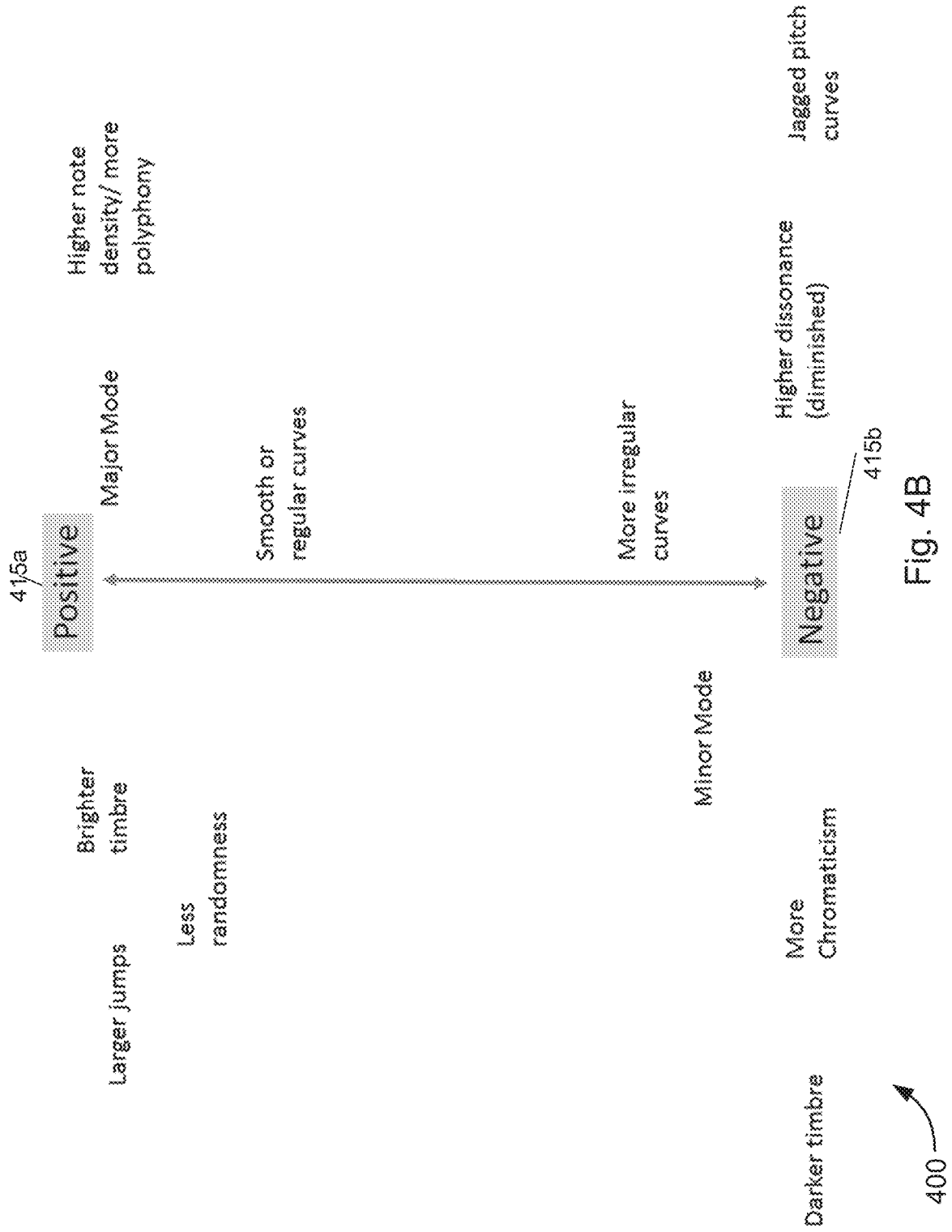
Figure 4C:
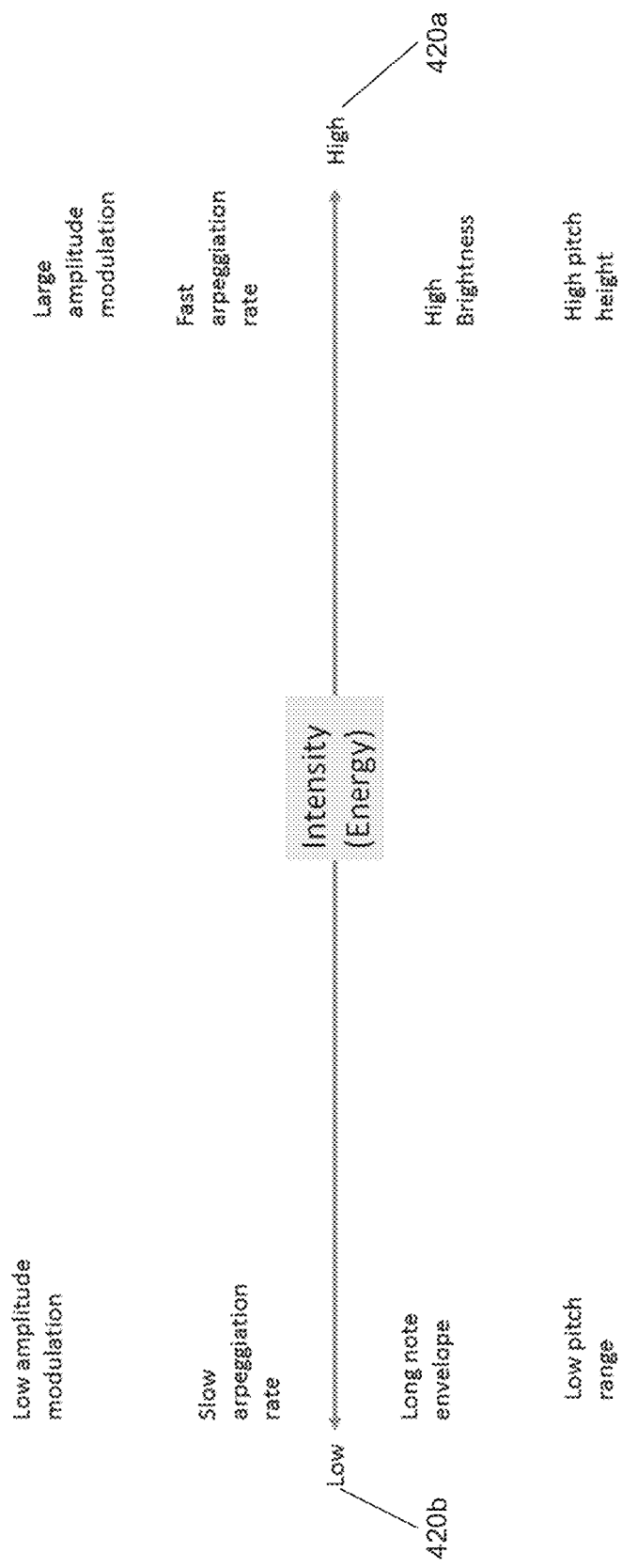

FIGS. 4A-4C (collectively, FIG. 4) represents a system 400 for mapping music to states, in accordance with various embodiments. FIG. 4A includes a table 405 for mapping music to different state categories 410. FIG. 4A has two mapping parameters positivity 415*a*/negativity 415*b* and/or intensity 420. The negativity scale 415*b* is the same as positivity scale 415*a*, except it is reversed (i.e. on the positivity scale "Happy" is given a 10 while on the negativity scale "Happy" is given a 0). The positivity/negativity parameters may be collectively referred to as positivity/negativity parameters 415. Although only two mapping parameters are shown (positivity/negativity parameters 415 and/or intensity parameter 420) in FIG. 4A, more than two parameters may be used to map music to different states. Additionally and/or alternatively, only one parameter, such as positivity 415*a*, may be used to map music to states.

Positivity/negativity parameters 415 are rated on a scale of 1-10 while intensity 420 is rated on a scale of 1-100. These values are rescaled between 0-1 then rescaled to control various musical parameters. State categories 410 having a similar positivity/negativity parameter 415 and/or a similar intensity rating 420 may be grouped together on a circular interface and/or a graph (which may correspond to circular pattern 205 of FIG. 2, circular pattern 325 of FIG. 3, graphs of FIGS. 4B and 4C, graph 900*d* of FIG. 9D, and/or the like). Thus, the state categories 410 that are grouped together will generate similar music with subtle differences.

Positivity/negativity parameters 415 may correspond to a note pattern, a note probability, an envelope, a harmony, a tone, a filter cut-off, pitch, contour, arpeggiation rate, arpeggiation step size, vocal-like inflections, elements of surprise, note envelopes, envelope control signals, randomization, consistency, an orchestration, a speed, a rhythm, a volume, and/or the like associated with a state. Intensity parameters 420 may correspond to a note pattern, a harmony, a tone, crescendo, decrescendo, vocal formant-like filtering or expressive attribute (e.g., inflection), an orchestration, a speed, a volume, and/or the like associated with a state.

Each value that is given to a particular state may be used to generate music that is unique to each particular state. The music that is generated is represented by music attributes column 425. For example, if the computing system determines that a communication contains the state "Happy" and/or a user has selected an icon associated with the state "Happy," the computing system may generate music having a major mode, fast tempo, staccato, quick attack (note onsets), short decay, and bright timbre.

Music attributes column 425 may further vary based on the type of application/communication (e.g., voice, text, speech, fitness tracker, EEG device, smart watch, AR/VR device, user input, and/or the like), the demographics (e.g., age, sex, and/or the like) of the user, the user's preferences, and/or the like.

FIGS. 4B and 4C further represent ways to map different music parameters to states using graphs. FIG. 4B represents mapping positivity/negativity parameters 415 to different musical characteristics. In a non-limiting example, states mapped to positive parameters 415*a* (e.g., "Happy") may cause the computing system to generate music that has a brighter timbre, a major mode, higher note density, more implied polyphony, steady rhythm, smooth curves, less randomness, larger jumps, and/or the like. While states mapped to negative parameters 415*b* (e.g. "Sad"), may cause the computing system to generate music that has a darker timber, a minor mode, more chromaticism, higher dissonance, more irregular curves, jagged pitch curves and/or the like.

FIG. 4C represents mapping intensity parameters 420 to different musical characteristics. In a non-limiting example, states mapped to high intensity parameters 420*a* (e.g. "Excited," "Anxious," and/or the like) may cause the computing system to generate music that has large amplitude modulation, fast arpeggiation rate, high brightness, high pitch height, and/or the like. While states mapped to low intensity parameters 420*b* (e.g., "Calm," "Dreamy," and/or the like), may cause the computing system to generate music that has low amplitude modulation, slow arpeggiation rate, long note envelope, low pitch range, and/or the like.

Users/communications may interact with graphs of FIGS. 4B and 4C in a similar manner as user interface 200 of FIG. 2 to generate music.

Each of the examples described above, with respect to FIG. 4, is intended to be non-limiting. A variety of parameters (instead of positivity/negativity and/or intensity) may be used to create music associated with each state. Further, positivity/negativity characteristics and/or intensity characteristics are not limited to those described above. Each state could have an almost unlimited number of musical characteristics associated with it and the musical characteristics associated with each emotion are not limited to those mentioned above.

Figure 5:
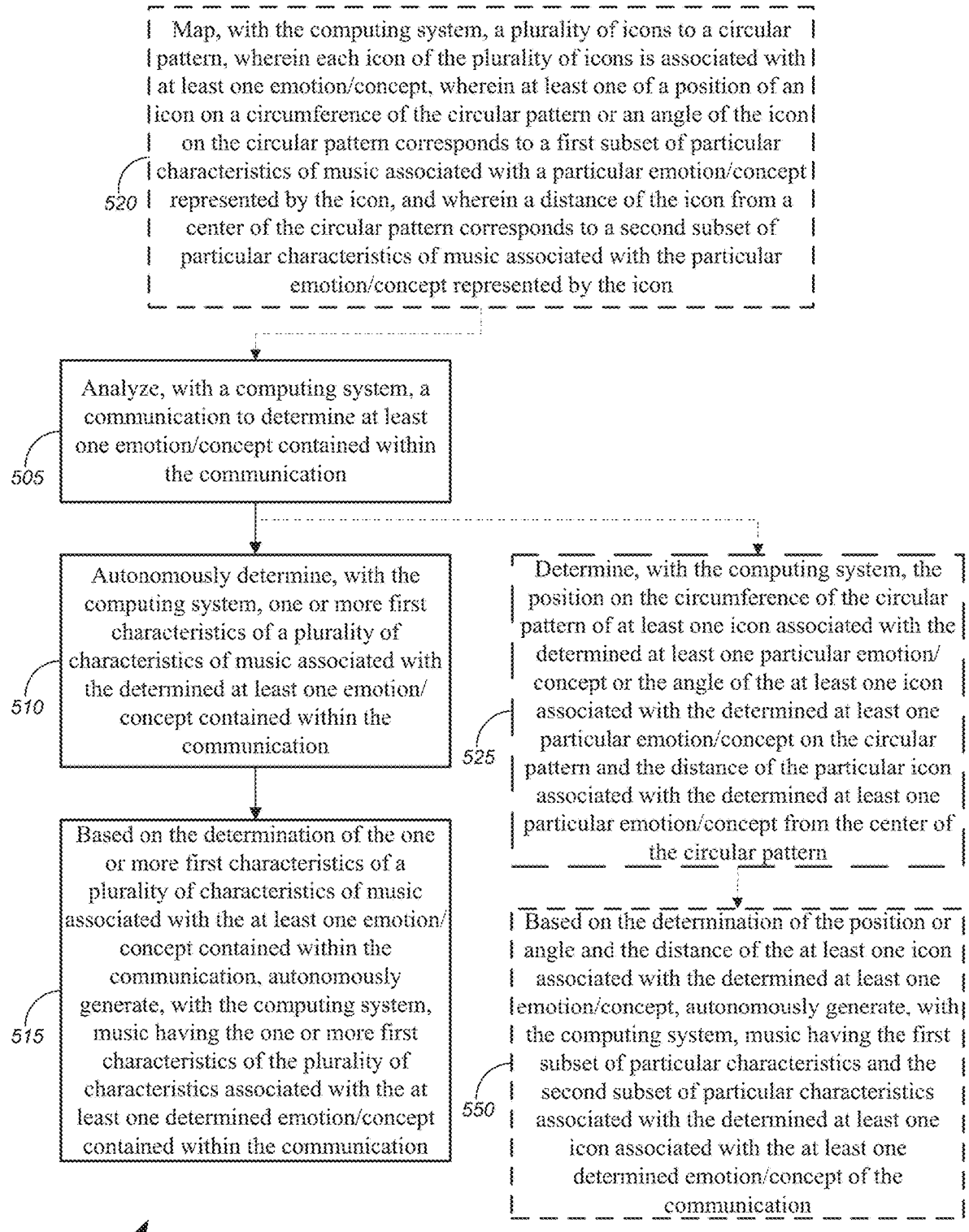
FIG. 5 is a flow diagram illustrating a method for implementing the generation of music/audio, in accordance with various embodiments.

FIG. 5 is a flow diagram illustrating a method 500 for implementing the generation of music, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the system 100 of FIG. 1 (or components thereof), the user interface 200 of FIG. 2 (or components thereof), the system 300 of FIG. 3 (or components thereof), the mapping system 400 of FIG. 4 (or components thereof), and/or the mapping system of FIG. 9 (or components thereof), such methods may also be implemented using any suitable hardware (or software) implementation. Similarly, while each of the system 100 of FIG. 1 (or components thereof) user interface 200 of FIG. 2 (or components thereof), the system 300 of FIG. 3 (or components thereof), the mapping system 400 of FIG. 4 (or components thereof), and/or the mapping system of FIG. 9 (or components thereof), can operate according to the method 500 illustrated by FIG. 5 (e.g., by executing instructions embodied on a computer readable medium), the system 100 of FIG. 1 user interface 200 of FIG. 2, the system 300 of FIG. 3, the mapping system 400 of FIG. 4, and/or the mapping system of FIG. 9 can each also operate according to other modes of operation and/or perform other suitable procedures.

Although method 500 is described with respect to emotions/concepts, a similar method may be used for different states of an environment or different states of a user which may include at least one of an emotion of a user, a feeling of a user, a location of the user a, a physical position of a user, a level of activity of a user, an action of a user, and/or the like. In the non-limiting embodiment of FIG. 5, method 500, at block 505, might comprise analyzing, with a computing system, a communication to determine at least one emotion (concept or state) contained within the communication. The computing system may be at least one of a desktop computer, a laptop computer, a tablet, a smart phone, an e-reader, and/or the like. Additionally and/or alternatively, in some embodiments, the computer system might be embedded in an exercise machine, physical therapy device, headphone, wristband or headband. Additionally and/or alternatively, in some embodiments, the computing system might include, without limitation, one of a processor of a set-top box, a processor of a digital video recording ("DVR") device, a processor of a user device running a software application ("app"), a processor of an audio playback device, a processor on an input device (e.g., fitness tracker, EEG device, or the like) running an app, a processor of a media player, a processor of a gaming console, a processor in audio equipment, and/or the like. The concept may be at least one of an emotion of a person, a state of a person, an action of a person, or a scene.

The communication may be at least one of a sensor communication, an IoT communication, a biometric/health communication, a voice communication, a textual communication, a photographic communication, a video communication, a VR/AR communication, and/or the like.

The sensor communication may contain feedback from one or more sensors including, but not limited to, one or more distance sensors, one or more motion sensors, one or more movement sensors, one or more speed or velocity sensors, one or more accelerometer sensors, one or more biometric/health sensors, one or more facial recognition sensors, one or more camera sensors, one or more IoT sensors (e.g., thermometers, humidity sensors, etc.) and/or the like. Based on input from the one or more sensors, the computing system 105, input device 115, and/or at least one audio playback device 120 may determine a mental or physical state that a person is experiencing or a state of the environment.

The IoT communication may contain feedback from one or more IoT sensors contained within a home. For example, the one or more IoT sensors might include one of one or more thermometers in one or more rooms, one or more infrared ("IR") thermometers aimed at one or more positions in the one or more rooms, one or more air flow sensors in the one or more rooms, one or more air flow sensors in air ducts directed toward the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms or outside the customer premises, one or more humidity sensors in the one or more rooms, one or more smoke detectors detecting smoke in the one or more rooms, one or more gas detection sensors detecting gas in the one or more rooms, one or more biometric sensors identifying at least one person, or one or more health sensors detecting health information for at least one person, and/or the like. Based on input from the one or more sensors, the computing system, input device, and/or at least one audio playback device may determine a state that a person is experiencing or a state of the environment.

The biometric/health communication may be received from at least one of a fitness tracker or an electroencephalography ("EEG") device and the computing system may determine the at least one emotion of a person and/or concept based on feedback from the at least one of the fitness tracker or the EEG device. In a non-limiting example, the fitness tracker and/or EEG device may provide feedback about a blood pressure of a user, a heart rate of a user, electrical brain waves of a user, and/or the like. Based on the blood pressure, the heart rate, the electrical brain waves and/or the like, the computing system may determine an emotion/concept that a user is experiencing. Merely by way of example, if the user has an elevated blood pressure and a high heart rate the computing system may determine that a user of the fitness tracker and/or EEG device is feeling stressed.

The voice communication may be received via user input or from a phone call between a calling party and a called party. In order to determine the at least one emotion/concept of a person, the computing system may parse the voice communication of the at least one person and/or determine a tone of voice of at least one person. Merely by way of example, if the communication is via phone, the computing system may parse the voice communication between the calling party and the called party to determine how each party is feeling. Additionally and/or alternatively, the computing system may analyze the tone of voice of each party to determine what emotions/state each party is experiencing.

With regard to the textual communications, the computing system may analyze text messages, instant messages, social media posts, emails, books, and/or the like to determine an emotion/concept that a user/person is experiencing. The computing system may parse the text of the textual communication to determine the emotion/concept of a person. Merely by way of example, the computing system may parse the text for key words such as "happy" or "sad" and/or the computing system may parse the textual communication for emojis to determine the mood of a person. Additionally, the computing system may parse the words of a book to determine a scene (e.g., action scene, adventure scene, romance scene, etc.) of a book or an action/state of a person in the book.

The photographic communication may be a photograph taken with a camera. The computing system may then use facial recognition tools to determine a displayed emotion/concept of at least one person in the photograph. The video communication may be taken with a video camera. The video communication may also be a video phone call between at least two parties. The computing system may then use facial recognition tools to determine a displayed emotion/concept of the at least one person in the video. The computing system may also use tools to analyze body language of the at least one person in the video communication to determine an emotion/concept that the at least one person is experiencing. The computing system may further parse the dialogue of the at least one person in the video or analyze the tone of voice of at least one person in the video communication to determine an emotion/concept that the at least one person in the video is experiencing. Additionally and/or alternatively, the computing system may use facial recognition tools, analyze body language, parse dialogue, analyze tone of voice to determine a state/action (e.g., running, walking, and/or the like) of a person and/or a scene (e.g., action scene, adventure scene, romance scene, and/or the like) of the video/picture.

A VR communication and/or AR communication may be obtained from VR/AR devices (e.g., cell phones, tablets, headsets, glasses, goggles, lenses, and/or the like). The computing system 105, input device 115, and/or at least one audio playback device 120 may analyze the facial expression, body language, and/or the like of the user of the AR/VR device and/or one or more persons interacting/communicating with the user of the AR/VR device. The computing system 105, input device 115, and/or at least one audio playback device 120 may also parse the dialogue or determine a tone of voice of the user and/or one or more persons interacting with the user of the AR/VR device. The facial expression, body language, dialogue, and/or tone of voice may then be used to determine a concept/emotion of a user and/or person. A state of a virtual concept defined within the game metrics may also be used to drive the state of the music system.

The method 500, at block 510, may further comprise autonomously determining, with the computing system, one or more first characteristics of a plurality of characteristics of music associated with the determined at least one emotion/concept/state contained within the communication. The one or more first characteristics of the plurality of characteristics of music include at least one of a note pattern, a harmony, a tone, an orchestration, a speed, a rhythm, a volume, and/or the like associated with the first emotion/concept indicated by the communication.

At block 515, method 500 may further comprise, based on the determination of the one or more first characteristics of a plurality of characteristics of music associated with the at least one emotion/concept/state contained within the communication, autonomously generating, with the computing system, music having the one or more first characteristics of the plurality of characteristics associated with the at least one determined emotion/concept contained within the communication.

Additionally and/or alternatively, the communication may further indicate at least one of an age and/or sex of a person. The one or more first characteristics of a plurality of characteristics of music may further be associated with the at least one of the age or the sex indicated by the communication. The music that is generated further has the one or more first characteristics of the plurality of characteristics associated with the at least one of the age or the sex indicated by the communication.

The generated music may further have human-like embellishments. The human-like embellishments may be created from at least one of timing jitter, frequency jitter, timbral jitter, and/or the like. These allow for the music to continuously evolve even when stuck in one state.

Human performers have a natural imprecision which must be explicitly accounted for in computer generated music. To do this, irregular micro-fluctuations may be added to the timing of note onsets. This kind of small random signal bias is often referred to as "timing jitter." As a result, quantized notes are gently un-quantized to provide a more pleasing and human-sounding musical aesthetic. Timing jitter provides subtle rhythmic variation that may add nuance to the static note patterns.

Similar to jittered timing offsets ("timing jitter"), "frequency jitter" may be utilized to modulate the frequency (pitch) of the generated music. Depending on the duration and articulation of the note, frequency jitter parameters will change. For instance, long sustained notes will be subject to more evolved jitter (gradual drift), a technique to add warmth; while shorter, more percussive notes will have little to no jitter.

Jitter may also be mapped to a number of other parameters in charge of producing timbre or the sound qualities of the notes. This is referred to as "timbral jitter." These parameters exist due in part to the real-time audio synthesis engine, which allow dynamic control of a sound over time via digital signal processing.

Additional embodiments of method 500 may further comprise an initial step of mapping, with the computing system, a plurality of icons to a circular pattern, wherein each icon of the plurality of icons is associated with at least one emotion/concept/state, wherein at least one of a position of an icon on a circumference of the circular pattern or an angle of the icon on the circular pattern corresponds to a first subset of particular characteristics of music associated with a particular emotion/concept/state represented by the icon, and wherein a distance of the icon from a center of the circular pattern corresponds to a second subset of particular characteristics of music associated with the particular emotion/concept/state represented by the icon (block 520). This map of the plurality of icons may be displayed to the user or the circular pattern may merely be used by the computer to map particular emotions/concepts to a particular musical generation algorithm.

After determining at least one emotion/concept/state contained within the communication (block 505), the method may further determine the position on the circumference of the circular pattern of at least one icon associated with the determined at least one particular emotion/concept/state or the angle of the at least one icon associated with the determined at least one particular emotion/concept/state on the circular pattern and the distance of the particular icon associated with the determined at least one particular emotion/concept/state/adjective from the center of the circular pattern (block 525). Based on the determination of the position or angle and the distance of the at least one icon associated with the determined at least one emotion/concept/state, the method, at block 550, may autonomously generate music having the first subset of particular characteristics and the second subset of particular characteristics associated with the determined at least one icon associated with the at least one determined emotion/concept/state of the communication.

Figure 6:
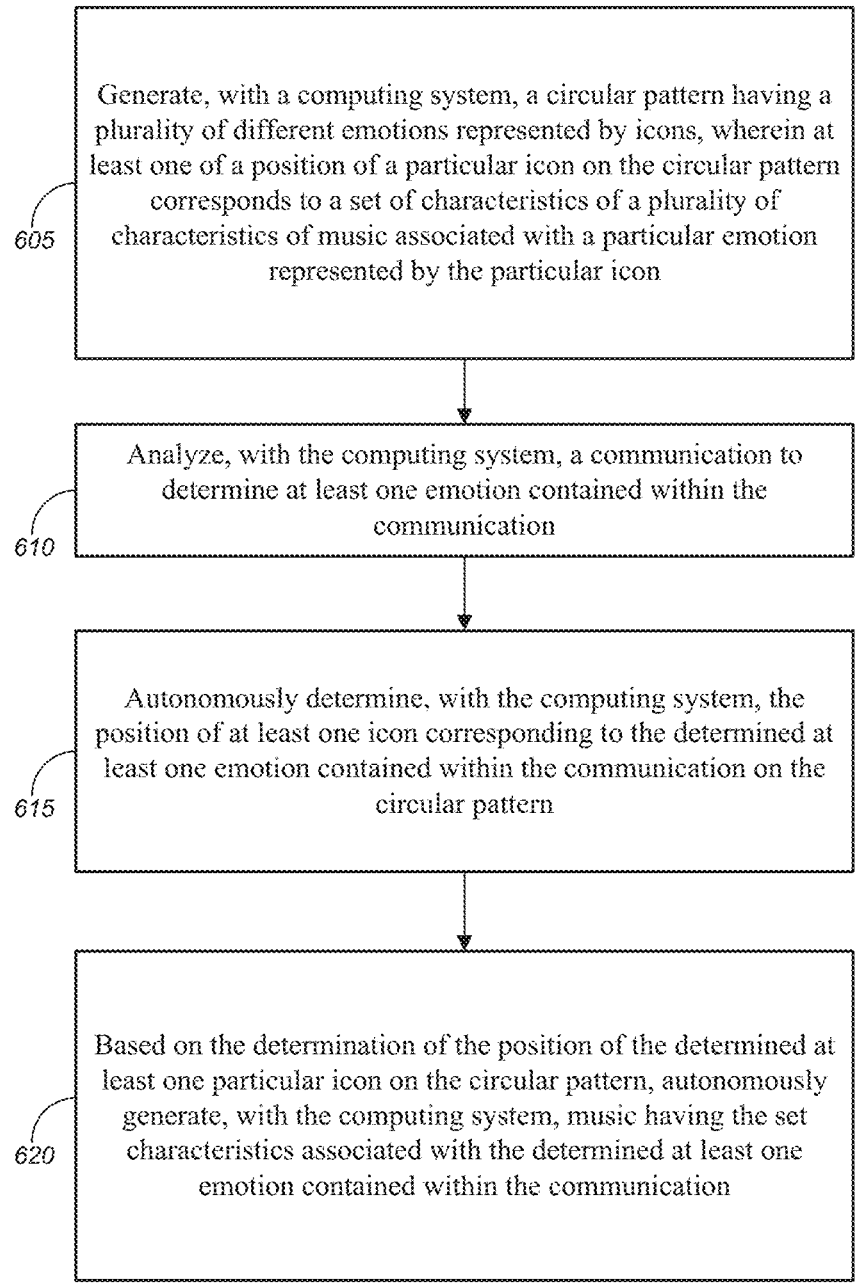
FIG. 6 is a flow diagram illustrating a method for implementing a user interface for the generation of music/audio, in accordance with various embodiments.

FIG. 6 is a flow diagram illustrating a method 600 for implementing a user interface for the generation of music, in accordance with various embodiments.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the system 100 of FIG. 1 (or components thereof), the user interface 200 of FIG. 2 (or components thereof), the system 300 of FIG. 3 (or components thereof), the mapping system 400 of FIG. 4 (or components thereof), and/or the mapping system of FIG. 9 (or components thereof), such methods may also be implemented using any suitable hardware (or software) implementation. Similarly, while each of the system 100 of FIG. 1 (or components thereof) user interface 200 of FIG. 2 (or components thereof), the system 300 of FIG. 3 (or components thereof), the mapping system 400 of FIG. 4 (or components thereof), and/or the mapping system of FIG. 9 (or components thereof), can operate according to the method 600 illustrated by FIG. 6 (e.g., by executing instructions embodied on a computer readable medium), the system 100 of FIG. 1 user interface 200 of FIG. 2, the system 300 of FIG. 3, the mapping system 400 of FIG. 4, and/or the mapping system of FIG. 9 can each also operate according to other modes of operation and/or perform other suitable procedures.

Although method 600 is described with respect to emotions/concepts, a similar method may be used for different states of an environment or different states of a user which may include at least one of an emotion of a user, a mental state of a user, a feeling of a user, a physical state of a user, a location of the user a, a physical position of a user, a level of activity of a user, an action of a user, or different states of an environment, and/or the like. In the non-limiting embodiment of FIG. 6, method 600, at block 605, might comprise generating with a computing system, a circular pattern having a plurality of different emotions represented by icons, wherein at least one of a position of a particular icon on the circular pattern corresponds to a set of characteristics of a plurality of characteristics of music associated with a particular emotion represented by the particular icon. The set of characteristics may correspond to positivity/negativity and/or intensity described with respect to FIGS. 3 and 4 and/or any other characteristics of music. At block 610, method 600 may further analyze, with a computing system, a communication to determine at least one emotion contained within the communication.

Additionally and/or alternative, the method 600, at block 615 may autonomously determine, with the computing system, the position of at least one icon corresponding to the determined at least one emotion contained within the communication on the circular pattern. The method 600 may then, based on the determination of the position of the determined at least one particular icon on the circular pattern, autonomously generate, with the computing system, music having the set characteristics associated with the determined at least one emotion contained within the communication (block 620).

Figure 7A:
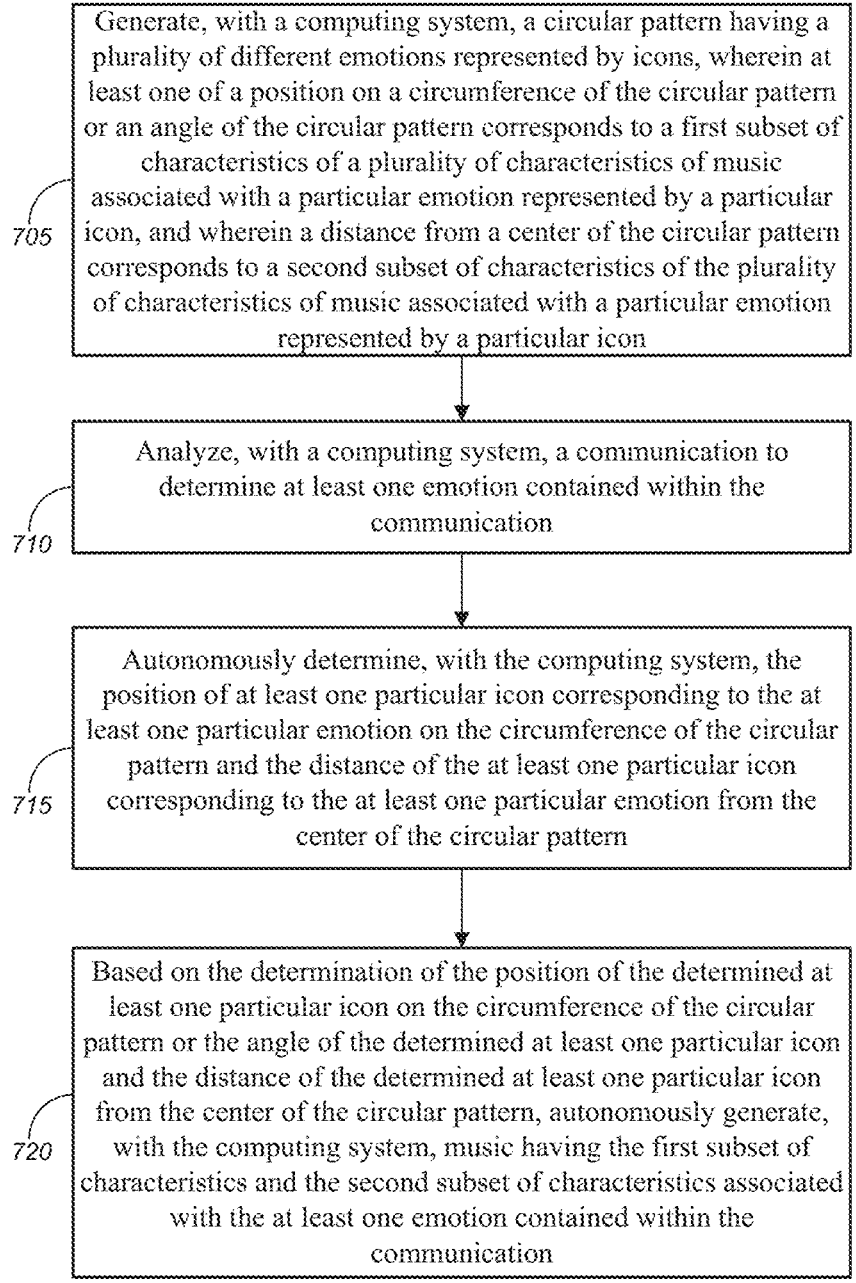
FIGS. 7A-7C are flow diagrams illustrating a method for implementing a user interface for the generation of music/audio, in accordance with various embodiments.
Figure 7B:
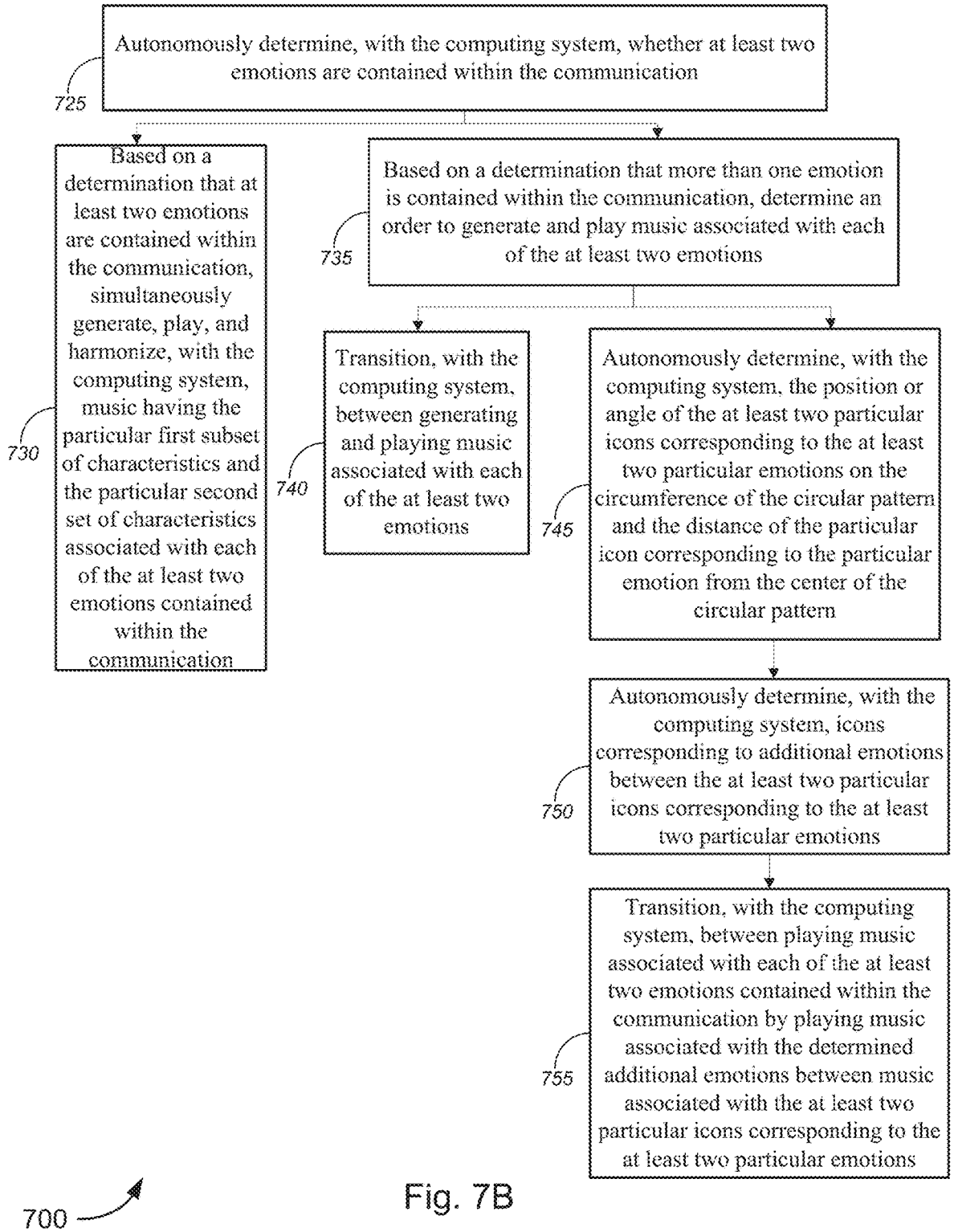
Figure 7C:
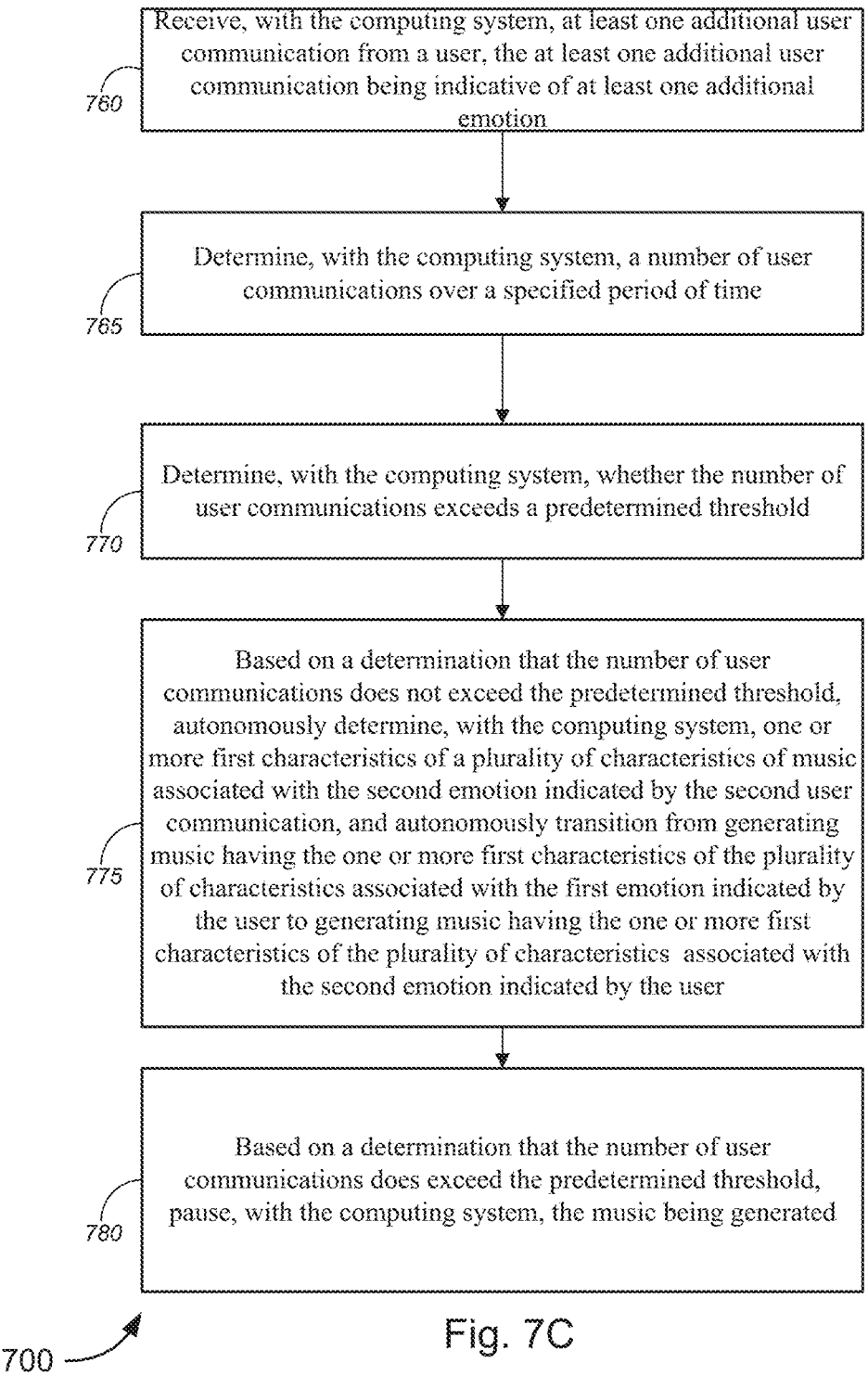

FIGS. 7A-7C (collectively, FIG. 7) are flow diagrams illustrating a method 700 for implementing a user interface for the generation of music, in accordance with various embodiments.

While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the system 100 of FIG. 1 (or components thereof) the user interface 200 of FIG. 2 (or components thereof), the system 300 of FIG. 3 (or components thereof), the mapping system 400 of FIG. 4 (or components thereof), and/or the mapping system of FIG. 9 (or components thereof), such methods may also be implemented using any suitable hardware (or software) implementation. Similarly, while each of the system 100 of FIG. 1 (or components thereof) user interface 200 of FIG. 2 (or components thereof), the system 300 of FIG. 3 (or components thereof), the mapping system 400 of FIG. 4 (or components thereof), and/or the mapping system of FIG. 9 (or components thereof), can operate according to the method 700 illustrated by FIG. 7 (e.g., by executing instructions embodied on a computer readable medium), the system 100 of FIG. 1, user interface 200 of FIG. 2, the system 300 of FIG. 3, the mapping system 400, and/or the mapping system of FIG. 9 can each also operate according to other modes of operation and/or perform other suitable procedures.

Although method 700 is described with respect to emotions/concepts, a similar method may be used for different environmental states or different states of a user which may include at least one of an emotion of a user, a feeling of a user, a location of the user a, a physical position of a user, a level of activity of a user, an action of a user, and/or the like. In the non-limiting embodiment of FIG. 7, method 700, at block 705, may comprise generating, with a computing system, a circular pattern having a plurality of different emotions represented by icons (or a position on the circular pattern), wherein at least one of a position on a circumference of the circular pattern or an angle of the circular pattern corresponds to a first subset of characteristics of a plurality of characteristics of music associated with a particular emotion represented by a particular icon (or position), and wherein a distance from a center of the circular pattern corresponds to a second subset of characteristics of the plurality of characteristics of music associated with a particular emotion represented by a particular icon.

Although icons are used in the method described below, states or emotions may also be mapped to particular regions/positions and the regions/positions may be used instead of icons to generate music.

Instead of a circular pattern, a graph may also be used. The method 700 might alternatively include generating, with a computing system, a graph having a plurality of different states mapped to different positions on the graph. An x-axis might correspond to a first subset of characteristics of a plurality of characteristics of music while a y-axis might correspond to a second subset of characteristics of the plurality of characteristics of music. In this way each axis serves as a separate input into the generative music system. Moving along the X-axis and/or Y axis might cause the first or second parameters of music to change. Based on a determination of the position of a first state, the computing system may synthesize the one or more first subset of characteristics of music together with the one or more second characteristics of music.

In a non-limiting example, the angle of an icon/position of a state and/or the position of an icon on the circumference of the circular pattern may correspond to a positivity/negativity parameter of music (described with respect to FIGS. 3 and 4) while the distance of the icon from the center of the circle may correspond to an intensity parameter of music (described with respect to FIGS. 3 and 4). Additionally and/or alternatively, the angle of an icon and/or the position of an icon on the circumference of the circular pattern may correspond to an intensity parameter of music (described with respect to FIGS. 3, 4, and 9) while the distance of the icon from the center of the circle may correspond to a positivity/negativity parameter of music (described with respect to FIGS. 3, 4, and 9).

The music associated with the emotions is not limited to only positivity/negativity and/or intensity parameters. A variety of parameters (instead of positivity/negativity and/or intensity) may be used to create music associated with each emotion. There is virtually an unlimited number of ways to position icons associated with emotions on the circular pattern and group icons associated with emotions together in a particular region on the circular pattern.

The computing system may be at least one of a desktop computer, a laptop computer, a tablet, a smart phone, an e-reader, and/or the like. Additionally and/or alternatively, in some embodiments, the computing system might include, without limitation, one of a processor of a set-top box, a processor of a digital video recording ("DVR") device, a processor of a user device running a software application ("app"), a processor of an audio playback device, a processor on an input device (e.g., fitness tracker, EEG device, or the like) running an app, a processor of a media player, a processor of a gaming console, a processor in audio equipment, and/or the like.

The icons used to represent the different emotions may be at least one of a text icon that represents the particular emotion (e.g., "HAPPY," "SAD," or the like) and/or an emoji (e.g., ☺ ) ) that represents a particular emotion. Additionally and/or alternatively, states may be mapped to particular regions of a circular pattern or graph without the use of icons and music may be generated based on the position of the state within the circular pattern or graph.

The first subset of characteristics of music may include at least one of a note pattern, a harmony, a tone, an orchestration, a speed, a volume, and/or the like associated with the first emotion indicated by the user communication. The second subset of characteristics may include at least one of a note pattern, a harmony, a tone, an orchestration, a speed, a volume, and/or the like associated with the first emotion indicated by the user communication. In a non-limiting example, the position of an icon on the circumference of the circle and/or an angle of the icon may correspond to a particular musical/note arrangement and/or musical algorithm and all emotions that are located in a position/angle may have the same or similar musical/note arrangement and/or musical algorithm. A distance from center may correspond to a particular volume or speed of the same or similar musical/note arrangement and/or musical algorithm. Thus, each icon on the circular pattern will be different (if only slightly) from every other icon on the circular pattern.

Method 700, at block 710, may further comprise analyzing, with a computing system, a communication to determine at least one emotion contained within the communication. The communication may be at least one of an IoT communication, biometric/health communication, a voice communication, a textual communication, a photographic communication, a video communication, a tactile communication, and/or the like.

The biometric/health communication may be received from at least one of a fitness tracker or an electroencephalography ("EEG") device and the computing system may determine the at least one mental state of a person based on feedback from the at least one of the fitness tracker or the EEG device. In a non-limiting example, the fitness tracker and/or EEG device may provide feedback about the attention level, relaxation level, a blood pressure of a user, a heart rate of a user, electrical brain waves of a user, and/or the like. Based on the mental state, blood pressure, the heart rate, the electrical brain waves and/or the like, the computing system may determine a mental state that a user is experiencing. Merely by way of example, if the user has an elevated blood pressure and a high heart rate the computing system may determine that a user of the fitness tracker and/or EEG device is feeling stressed.

The voice communication may be received via user input or from a phone call between a calling party and a called party. In order to determine the at least one emotion of a person, the computing system may parse the voice communication of the at least one person and/or determine a tone of voice of at least one person. Merely by way of example, if the communication is via phone, the computing system may parse the voice communication between the calling party and the called party to determine how each party is feeling. Additionally and/or alternatively, the computing system may analyze the tone of voice of each party to determine what emotions each party is experiencing.

With regard to the textual communications, the computing system may analyze text messages, instant messages, social media posts, emails, books, and/or the like to determine an emotion that a user is experiencing. The computing system may parse the text of the textual communication to determine the emotion of a person. Merely by way of example, the computing system may parse the text for key words such as "happy" or "sad" and/or the computing system may parse the textual communication for emojis to determine the mood of a person.

The photographic communication may be a photograph taken with a camera. The computing system may then use facial recognition tools to determine a displayed emotion of at least one person in the photograph. The video communication may be taken with a video camera. The video communication may also be a video phone call between at least two parties. The computing system may then use facial recognition tools to determine a displayed emotion of the at least one person in the video. The computing system may also use tools to analyze body language or gestures of the at least one person in the video communication to determine an emotion that the at least one person is experiencing. The computing system may further parse the dialogue of the at least one person in the video or analyze the tone of voice of at least one person in the video communication to determine an emotion that the at least one person in the video is experiencing.

The tactile communication may be received via user input from a touch screen and/or a mouse. The user may select one or more icons representing an emotion on a display that is displaying the circular pattern of emotions to generate music associated with that emotion. The computing system may determine whether the user selected at least two icons by tracking the tactile communication of the user with the display device. Based on a determination that at least two icons have been selected, the computing system may determine whether the tactile input, when selecting the at least two icons, was continuous input. In other words, continuous input would occur when a user remains in constant tactile contact with the display device and/or if the user holds down the left button of the mouse. Non-continuous input would occur if the user lifts his or her finger/hand from the display device and/or lets go of the left mouse button. Based on a determination that the tactile input was not continuous, the method 700 may pause the generated music between each user selection of an icon. Based on a determination that the tactile input was continuous, the method 700 may transition between playing music associated with each of the at least two emotions selected by the tactile input. Touching the interface may turn on the sound, while lifting the finger turns it off. The position of the finger, velocity, direction finger is moving may be used to control the sound that is generated. In other cases, the sound is always on and the finger input can be used to influence the sound.

If the computing system cannot keep up with the tactile communication of the user (via tactile, mouse, or the like), then the computing system may create a time lag between the selection of each icon and the generation of music associated with each icon. Additionally and/or alternatively, the computing system may play the generated music for each selected icon for a predetermined amount of time before transitioning to music associated with a subsequent selected icon.

Interpolation, both smooth and quantized, may also be used to allow for the gradual transitioning between music associated with at least two emotions. In other words, once the computing system determines that a new emotion has been included in a communication and/or selected by a user, different aspects of the music will the transition between the states associated between the at least two emotions. Unusually jumpy rapid, jumpy movements in the communication, signal noise, and/or indicated by user selection (unexpectedly rapid signals) will be handled via standard smoothing filters for control signals.

Depending on the type of communication the computing system receives, the circular pattern may be displayed to the user on a user interface and/or the circular pattern may merely be used by the computing system to create differences between music associated with a particular emotion. For example, if the computing system is receiving a tactile communication, then the tactile input may be received on a user interface that is displaying the communication. However, if the computing system is receiving a voice communication, then the computing system may determine where the emotion is on the circular pattern to determine what type of music to generate, without displaying the circular pattern to the user.

Merely by way of example, method 700, at block 715 may further comprise autonomously determining, with the computing system, the position of at least one particular icon corresponding to the at least one particular emotion on the circumference of the circular pattern and the distance of the at least one particular icon corresponding to the at least one particular emotion from the center of the circular pattern. Based on the determination of the position of the determined at least one particular icon on the circumference of the circular pattern or the angle of the determined at least one particular icon and the distance of the determined at least one particular icon from the center of the circular pattern, the computing system may autonomously generate music having the first subset of characteristics and the second subset of characteristics associated with the at least one emotion contained within the communication (block 720).

Additionally and/or alternatively, the communication may further indicate at least one of an age and/or sex of a person. The one or more first characteristics of a plurality of characteristics of music may further be associated with the at least one of the age or the sex indicated by the communication. The music that is generated further has the one or more first characteristics of the plurality of characteristics associated with the at least one of the age or the sex indicated by the communication.

The generated music may further have human-like embellishments. The human-like embellishments may be created from at least one of timing jitter, frequency jitter, timbral jitter, and/or the like.

Human performers have a natural imprecision which must be explicitly accounted for in computer generated music. To do this, irregular micro-fluctuations are added to the timing of note onsets. This kind of small random signal bias is often referred to as "timing jitter." As a result, quantized notes are gently un-quantized to provide a more pleasing and human-sounding musical aesthetic. Timing jitter provides subtle rhythmic variation that add nuance to the static note patterns.

Similar to jittered timing offsets ("timing jitter"), "frequency jitter" is utilized to modulate the frequency (pitch) of the generated music. Depending on the duration and articulation of the note, frequency jitter parameters will change. For instance, long sustained notes will be subject to more evolved jitter (gradual drift), a technique to add warmth to the timbre; while shorter, more percussive notes will have little to no jitter.

Jitter may also be mapped to a number of other parameters in charge of producing timbre or the sound qualities of the notes. This is referred to as "timbral jitter." These parameters exist due in part to the real-time audio synthesis engine, which allow dynamic control of a sound over time via digital signal processing.

Additionally and/or alternatively, a non-limiting embodiment of method 700, at block 725, may comprise autonomously determining, with the computing system, whether at least two emotions are contained within the communication. Based on a determination that at least two emotions are contained within the communication, method 700 may simultaneously generate, play, and harmonize music associated with each emotion (block 730) and/or transition between music associated with each emotion (blocks 735-760).

Merely by way of example, method 700 at block 730 may comprise, based on a determination that at least two emotions are contained within the communication, simultaneously generating, playing, and shaping music having the particular first subset of characteristics and the particular second set of characteristics associated with each of the at least two emotions contained within the communication. In other words, if more than one emotion is present in the communication, the music associated with each determined emotion may be generated and played at the same time. The music associated with each emotion may further be harmonized to ensure that the sound that is generated is pleasing to hear.

Additionally and/or alternatively, method 700, at block 735, may further comprise, based on a determination that more than one emotion is contained within the communication, determining an order to generate and play music associated with each of the at least two emotions. The order may be determined based on the order that the emotions appear in a text, video, and/or voice communication or the order may be based on who is speaking in a voice or video communication. At block 740, the method 700 may transition, with the computing system, between generating and playing music associated with each of the at least two emotions. In other words, the method 700 may play music associated with each emotion separately. Music associated with a particular emotion may be played for a predetermined period of time before transitioning to music associated with the next determined emotion.

Additionally and/or alternatively, method 700 may smoothly transition between music associated with each emotion. In order to do this, after determining an order to generate and play music (block 735), method 700, at block 745, may further comprise autonomously determining, with the computing system, the position and/or angle of the at least two particular icons corresponding to the at least two particular emotions on the circumference of the circular pattern and the distance of the particular icon corresponding to the particular emotion from the center of the circular pattern. Method 700 may further autonomously determine, with the computing system, icons corresponding to additional emotions between the at least two particular icons corresponding to the at least two particular emotions (block 750). Method 700, at block 755, may then transition, with the computing system, between playing music associated with each of the at least two emotions contained within the communication by playing music associated with the determined additional emotions between music associated with the at least two particular icons corresponding to the at least two particular emotions. By playing music associated with the determined additional emotions between music associated with the at least two particular icons corresponding to the at least two particular emotions, the transition between music may be smoother and less dissonant.

Additionally and/or alternatively, method 700 may synchronize music associated with a subset of emotions while transitioning between music associated with another subset of emotions.

Method 700 may additionally comprise steps to ensure that the user interface and music generation system can effectively transition between music associated each determined emotion. In some situations, a user may select icons associated with particular emotions or send communication containing text or emojis representing emotions quicker than the computer can generate and output the music, in order to address those situations, method 700, at block 760 may comprise receiving, with the computing system, at least one additional user communication from a user, the at least one additional user communication being indicative of at least one additional emotion. Next, the computing system may determine a number of user communications over a specified period of time (block 765) and determine whether the number of user communications exceeds a predetermined threshold (block 770).

Based on a determination that the number of user communications does not exceed the predetermined threshold, method 700, at block 775, may further comprise autonomously determining, with the computing system, one or more first characteristics of a plurality of characteristics of music associated with the second emotion indicated by the second user communication, and autonomously transitioning from generating music having the one or more first characteristics of the plurality of characteristics associated with the first emotion indicated by the user to generating music having the one or more first characteristics of the plurality of characteristics associated with the second emotion indicated by the user. Based on a determination that the number of user communications does exceed the predetermined threshold, method 700, at block 780, may comprise pausing, with the computing system, the music being generated.

Figure 8:
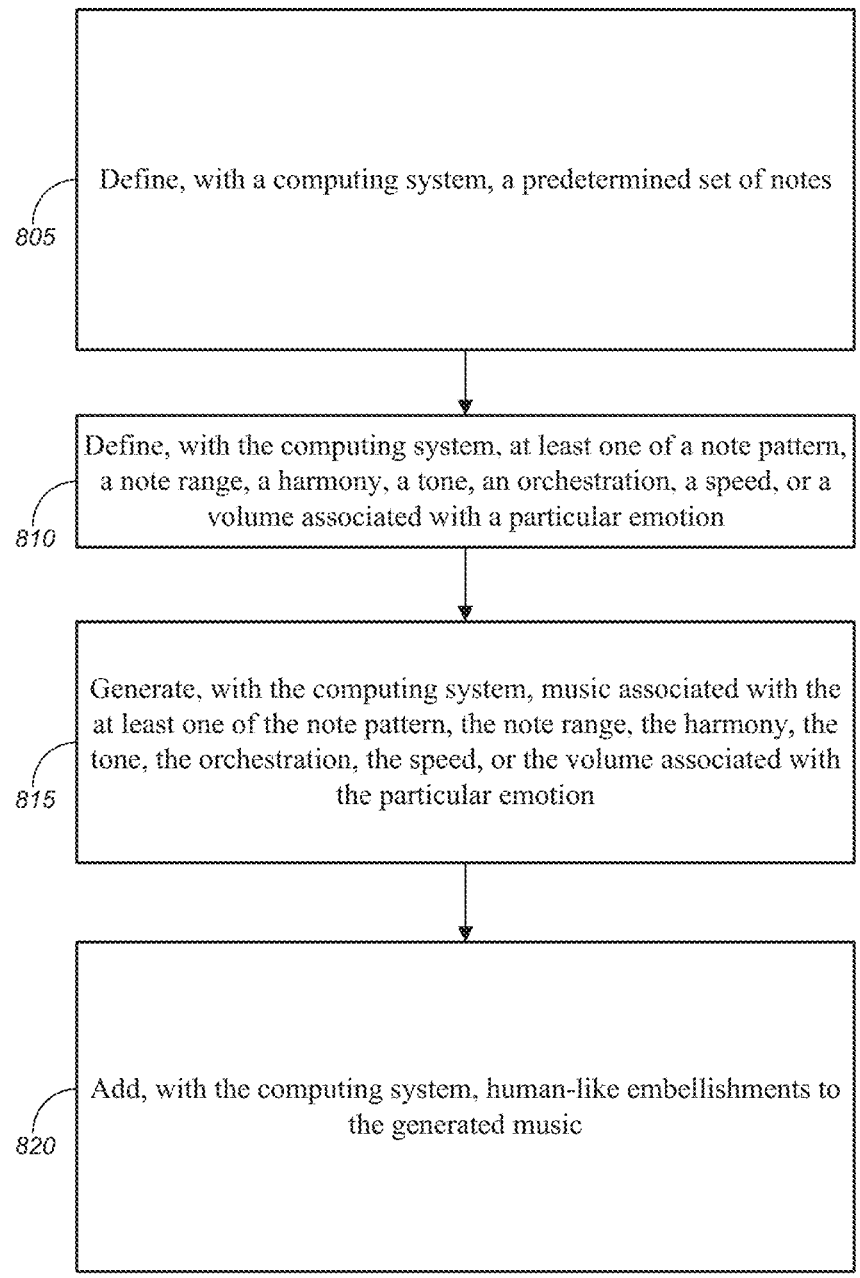
FIG. 8 is a flow diagram illustrating a method for generating music/audio, in accordance with various embodiments.

FIG. 8 is a flow diagram illustrating a method 800 for generating music associated with an emotion, in accordance with various embodiments.

While the techniques and procedures are depicted and/or described in a certain order for purposes of illustration, it should be appreciated that certain procedures may be reordered and/or omitted within the scope of various embodiments. Moreover, while the method 800 illustrated by FIG. 8 can be implemented by or with (and, in some cases, are described below with respect to) the system 100 of FIG. 1 (or components thereof) the user interface 200 of FIG. 2 (or components thereof), the system 300 of FIG. 3 (or components thereof), the mapping system 400 of FIG. 4 (or components thereof), and/or the mapping system of FIG. 9 (or components thereof), such methods may also be implemented using any suitable hardware (or software) implementation. Similarly, while each of the system 100 of FIG. 1 (or components thereof) user interface 200 of FIG. 2 (or components thereof), the system 300 of FIG. 3 (or components thereof), the mapping system 400 of FIG. 4 (or components thereof), and/or the mapping system of FIG. 9 (or components thereof), can operate according to the method 800 illustrated by FIG. 8 (e.g., by executing instructions embodied on a computer readable medium), the system 100 of FIG. 1 user interface 200 of FIG. 2, the system 300 of FIG. 3, the mapping system 400 of FIG. 4, and/or the mapping system of FIG. 9 can each also operate according to other modes of operation and/or perform other suitable procedures.

Although method 800 is described with respect to emotions/concepts, a similar method may be used for different states of a user which may include at least one of an emotion of a user, a feeling of a user, a location of the user a, a physical position of a user, a level of activity of a user, an action of a user, and/or the like. In a non-limiting embodiment, method 800, at block 805 may comprise defining, with a computing system, a predetermined set of notes. Next, method 800, at block 810 may comprise defining, with the computing system, at least one of a note pattern, a note range, a harmony, a tone, an orchestration, a speed, or a volume associated with a particular emotion. At block 815, method 800 may comprise generating, with the computing system, music associated with the at least one of the note pattern, the note range, the harmony, the frequencies, the orchestration, the speed, note amplitude envelope or the output amplitude associated with the particular emotion. At block 820, method 800, may comprise adding, with the computing system, human-like embellishments to the generated music.

Figure 9E:
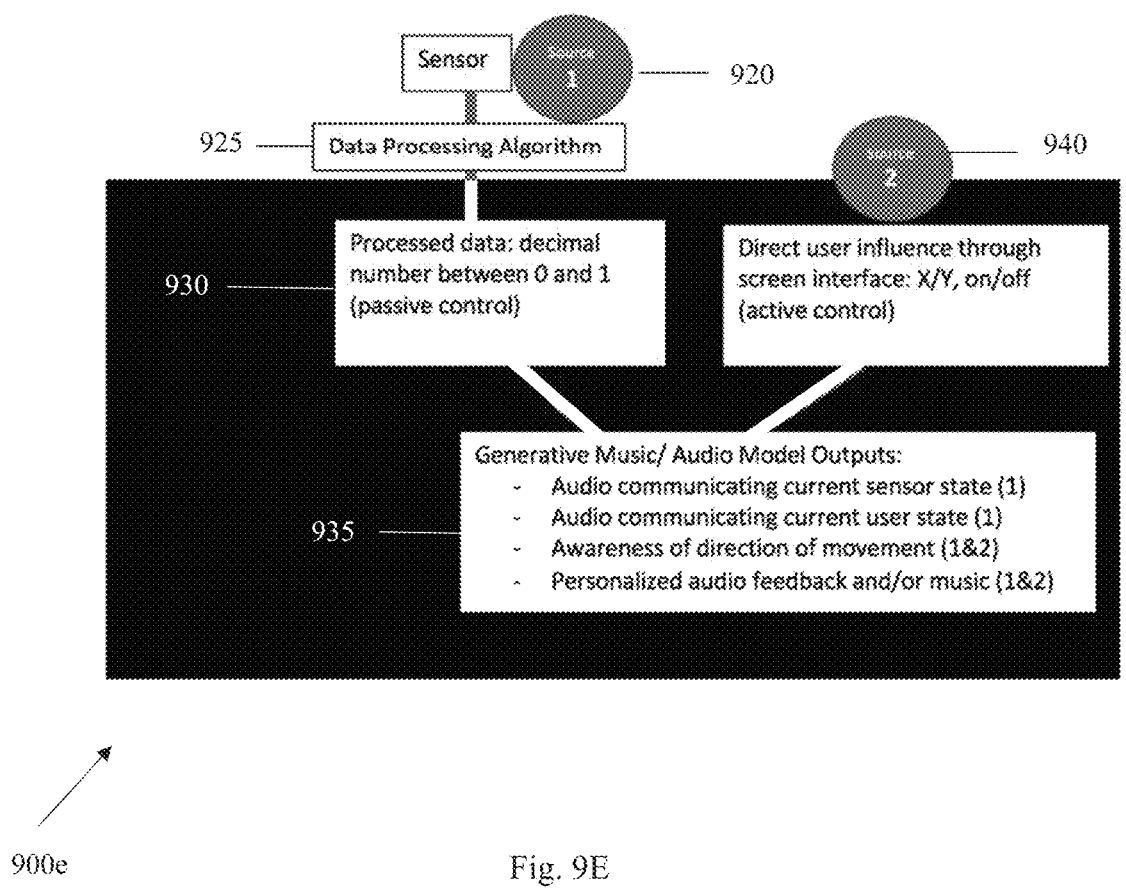
Figure 10:
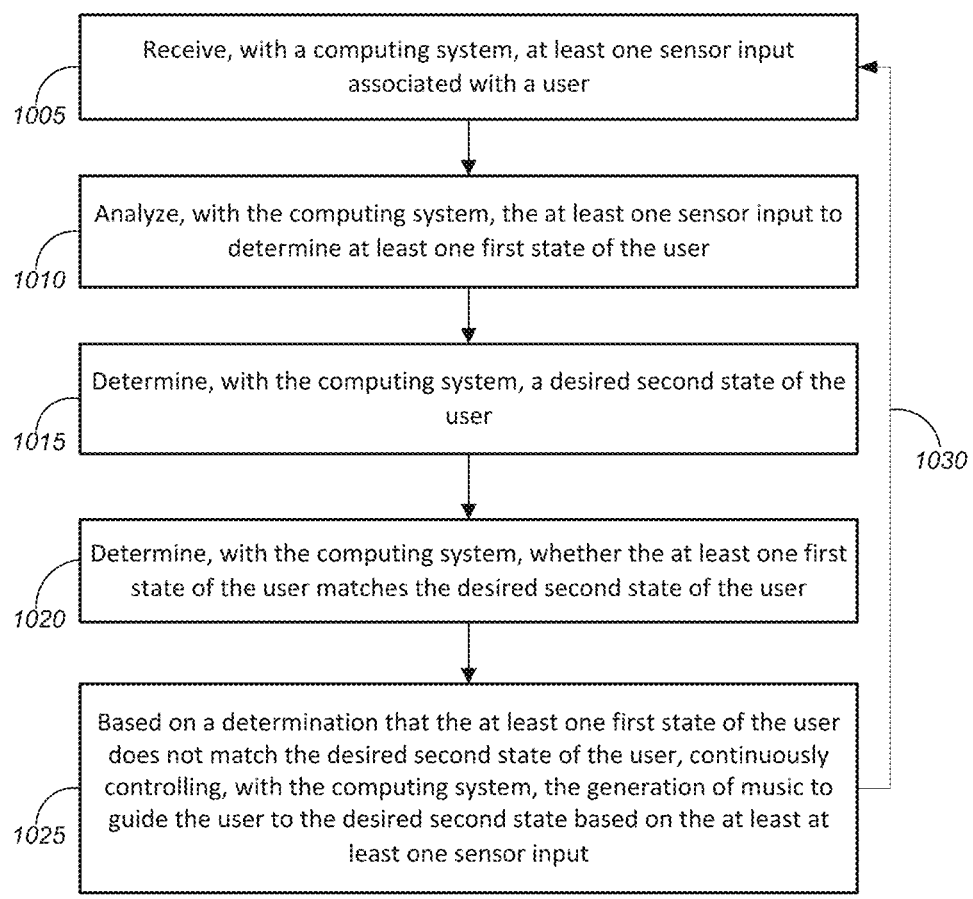
FIG. 10 is a flow diagram illustrating a method for continuously controlling the generation of the music to guide a user toward a goal, in accordance with various embodiments.

FIGS. 9 and 10 represent methods, systems, and apparatuses for exercising continuous control over music generation to guide a user toward a desired state or goal. Each of the methods, systems, and apparatuses described with respect to FIGS. 9 and 10 may be incorporated into the different embodiments described with respect to FIGS. 1-8. Additionally, each of the different embodiments described with respect to FIGS. 1-8 may be incorporated into the different embodiments described with respect to FIGS. 9 and 10. In a non-limiting example, user interface 200 may be used to implement different embodiments described in FIGS. 9 and 10. Additionally, graphical interface 900d may be used in place of user interface 200 and function in a similar manner as user interface 200. Other patterns/shapes may be used as an interface (e.g., a three-dimensional graph, a triangle, a square, an oval, etc.).

FIGS. 9A-9E are schematic diagrams illustrating systems 900 for continuously controlling the generation of music/audio/sound to guide a user toward a desired state, in accordance with various embodiments. FIGS. 9A and 9B are directed towards guiding a user from a first location or first position to a second location or position. FIG. 9A represents a system 900a using one parameter (distance to goal) 905 to continuously control the one or more parameters of music/audio/sound. FIG. 9B represents a system 900b using two parameters (distance to goal and movement direction) 905 and 910 to continuously control one or more parameters of music/audio/sound. FIG. 9C represents a system 900c using three parameters to continuously control the generation of music/audio/sound. FIG. 9D represents a XY coordinate system 900d for mapping different states to music/audio/sound and for transitioning between music/audio/sound associated with different states.

FIGS. 9A and 9B include systems 900a and 900b for mapping music/audio/sound to different parameters to guide a user toward a desired goal. The different parameters may correspond to a state of a user and may include, but are not limited to, at least one of a distance to goal, a direction of movement, an amount of movement, a breathing pattern, a heart rate, a state in a video game, a step rate, an exercise rate or pattern, an amount of perspiration, a brainwave pattern, and/or the like. FIG. 9A has one mapping parameter 905—distance to goal. FIG. 9B has two mapping parameters 905 and 910 which (for this model) represent distance to goal and movement direction with respect to goal and previous point, respectively. Although only two mapping parameters are shown in FIG. 9B, more than two parameters may be used to map music to different states and control the generation of music as shown in FIG. 9C. Additionally, one mapping parameter may control one or more musical/audio/sound elements.

Mapping parameters 905 and 910 may correspond or map to one or more musical/audio/sound characteristics 915a-915n. The different musical characteristics might correspond to a note pattern, a harmony, a tone, pitch, a density, vocal-like qualities, elements of surprise, randomization, consistency, an orchestration, a speed, a rhythm, a volume, note envelope, control signal envelope, rate, amplitude on part of signal, and/or the like designed to guide a user toward a desired state.

Each value that is given to a particular state may be used to generate and continuously control music to guide a user toward a desired state (e.g., from a first location to a second location). The music may be continuously controlled based on one or more sensor inputs. For example, one or more sensors may be used to detect user movement/motion. As a user moves, the sensors may detect whether the user is moving closer to a desired second location or away from a desired second location. Based on the input from the sensors, the computing system may then generate music indicating that the user is moving closer to or away from the desired second location. The computing system may continuously control and/or change the generated music based on input from the one or more sensors to guide the user toward the desired location.

Additionally and/or alternatively, in a two-parameter model, one or more sensors may be used to detect a user's position relative to a desired location and a user's direction of movement. As a user moves, the sensors may detect (1) whether the user is moving closer to a desired second location or away from a desired second location and (2) the direction (angle relative to the desired location) the user is moving. Based on the input from the sensors, the computing system may then generate music indicating (1) that the user is moving closer to or away from the desired second location and/or (2) the direction the user is moving relative to the object. In a non-limiting example, the rhythm of the music/audio/sound may increase as the user gets closer to the desired location while the music/audio/sound becomes more random if the user is heading in the wrong direction. The computing system may continuously control and/or change the generated music/audio/sound based on input from the one or more sensors to guide the user toward the desired location.

Music attributes 915a-915n may further vary based on the type of application/communication (e.g., voice, text, speech, fitness tracker, EEG device, smart watch, AR/VR device, facial recognition device, camera, user input, and/or the like), the demographics (e.g., age, sex, and/or the like) of the user, the user's preferences, input from a user, and/or the like.

FIG. 9C represents a system 900c having three musical/sound/audio characteristics: (1) amplitude (volume of music/audio/sound), (2) attack rate (rhythm, arpeggiation), and (3) note probabilities (how likely a particular note will be played). State 1 (current state) has three corresponding values for amplitude, attack rate, and note probabilities and state 2 (goal state) has three different corresponding values for amplitude, attack rate, and note probabilities. One or more sensors may be used to measure where a user is i.e. state 1, state 2, or between states 1 and 2. Based on the measured state of the user, music/audio/sound may be continuously generated and controlled to lead a user from state 1 to state 2. In a non-limiting example, movement direction may control attack rate and note probabilities while distance from goal may control amplitude.

FIG. 9D represents an XY coordinate system 900d for mapping different states to a region on an XY coordinate system. This XY coordinate system 900d may be used in place of or in addition to user interface 200 shown in FIG. 2 and function in a similar way as user interface 200 to control one or more musical parameters. The position on a two or more-dimensional graph can be used as coordinates to drive a multi-input music system where different axes control different musical attributes. The X-axis might correspond to one or more characteristics of music/audio/sound while the Y-axis might correspond to one or more different characteristics of music/audio/sound. In a non-limiting example, The X-axis might correspond to a valence of music/audio/sound, i.e. positive/minor notes, randomness/synchronicity of notes, and/or the like, while the Y-axis might correspond to intensity of music/audio/sound, i.e. loudness, number of beats per minute, and/or the like.

Each state may be mapped to a region on the XY coordinate system shown in FIG. 9D. The XY coordinate system is not limited to only being a XY plane. The XY plane could be any pattern/shape (e.g., an oval, circle, triangle, square, rectangle, grid, XYZ coordinate system, 2-D model, 3-D model, etc.). A person of ordinary skill in the art would understand that any pattern may act in a similar manner as the XY plane described below.

The XY plane 900d may be displayed to a user on a computing system and/or communication device. Additionally and/or alternatively, the computing system and/or communication device may use the XY plane to determine one or more musical parameters corresponding to a user's determined state.

A user may interact with XY plane 900d via tactile input and/or mouse input. Additionally and/or alternatively, the XY plane 900d may be used by a computing system and/or user device to determine what music to play based on a state contained within a communication (e.g., at least one of a sensor communication, an IoT communication, a biometric/health communication, a voice communication, a textual communication, a photographic communication, a video communication, and/or the like). A computing system may determine where a particular state is mapped on XY plane 900d and access and play the algorithm associated with the particular state based on where the state is positioned on the XY plane 900d.

Based on the user interaction with the XY plane 900d and/or based on a determined state from a communication, the computing system may determine the distance from an x-axis on the XY plane 900d associated with the determined at least one particular state and/or a distance from a y-axis on the XY plane 900d. Based on the determination of the position (distance from x-axis and/or y-axis) associated with the determined at least one state, the computing system and/or user device may generate music having the valence and the intensity associated with the determined at least one state of the communication.

Additionally and/or alternatively, the XY plane 900d may facilitate transitioning between music associated with a first particular state to music associated with a second particular state. In FIG. 9D, states located in different regions of XY plane 900d. A user may first indicate a first state (state 1) via touch input, mouse input, and/or by indicating a state in a communication.

If the selection is made via touch or a mouse and after a first user indication is made, then a computing system and/or communication device may track a user's interaction with the XY plane 900d. A user may continue to drag his or her finger or other device (e.g., mouse, stylus, and/or the like) along a path on the XY plane 900d indicating that the music that is generated should transition between music associated with at least two states. The music that is generated may transition in real time or near real time based on the user's interaction with the XY plane 900d. For example, if the user stops for a period of time on a particular region associated with a state, then the music associated with that particular state may play for that period of time until the user stops selecting the region and/or moves on to a different region associated with a different state. Additionally and/or alternatively, each state that the user selects by dragging his or her finger or other device (e.g., mouse, stylus, and/or the like) along a XY plane 900d may play music associated with that particular state for a predetermined amount of time (e.g., until a note is finished playing, until a sequence is complete, and/or the like) before transitioning on to the music associated with the next selected state/region. In some cases, the predetermined amount of time may be selected by a user of XY plane 900d.

The computing system and/or user device may also introduce some lag so that music that is generated by user interaction is not generated in real time. For example, if the user drags his or her finger or device over XY plane 900d quickly, the computing system may not be able to transition between music associated with different states smoothly. By introducing lag, the computing system may smoothly transition between music associated with different emotions.

Additionally and/or alternatively, if a user picks up his finger and/or device, a computer may determine that a user would like to pause between transitioning between a first selected state and an additional selected state. The music may turn off or continue to play in static position. If the user rests on a particular state, the music can still be continuously generated.

If a selection of more than one state is made via a communication (e.g., at least one of a sensor communication, an IoT communication, a biometric/health communication, a voice communication, a textual communication, a photographic communication, a video communication, and/or the like) and the communication contains at least two states, then a computing device may determine a path on XY plane 900d between a first selected state and at least one additional state. Using the states between the first selected state and at least one additional state, the computing system may smoothly transition between playing music associated with each of the at least two states contained within the communication by playing music associated with the determined additional states between music associated with the at least two particular states indicated in the communication.

Additionally and/or alternatively, the generated music may transition between music associated with the at least two states indicated in the communication by pausing music associated with a first indicated state before playing music associated with a second indicated state.

In a non-limiting example, a computing system may determine that the user's goal state is state 2. In order to determine a user's goal state, a user may select an option for a desired state (e.g., work-out option, navigation option, etc.) on a user interface (e.g., user interface 200, interface 900d, or other interface. etc.). Additionally and/or alternatively, a computing system may receive feedback from one or more sensors (e.g., an indication of a high stress state, etc.) and determine a user's goal state (e.g., calm, relaxed, etc.) based on the feedback from the one or more sensors. In some cases, a user may also select a length of time or a distance (e.g., a mile, a kilometer, etc.) to run the music generation application.

Based on one or more sensor inputs, the computing system may determine that the user is currently at state 1, between state 1 and 2, how close a user is to state 2, and/or the like. The computing system might continuously control synthesized music/audio/sound to guide the user to state 2 based on the one or more sensor inputs and/or indicate to a user how far away or close the user is to state 2. As the user gets closer to state 2, the music will adapt to incorporate more elements of state 2. As the user gets further from state 2 the music will adapt to incorporate more elements of state 1. Thus, a user may receive continuous feedback about how close he or she is to state 1 or state 2.

FIG. 9E represents a schematic diagram 900e for receiving multiple inputs from different sources to generate music associated with one or more states, in accordance with various embodiments. The music that is generated may be influenced by a passive control (e.g., sensor/communication input) and/or an active control (e.g., a user interface). Additionally and/or alternatively, the music that is generated may be based on input from two passive controls (e.g., two sensors, etc.) and/or two active controls (e.g., two user interfaces, two inputs via a user interface, etc.) and the music/sound that is generated from the two passive controls and/or two active controls may be generated based on a similar method described below.

In various embodiments, a first source 920 might be received from one or more passive source(s) (e.g., one or more sensors and/or communications (e.g., an IoT communication, a biometric/health communication, a voice communication, a textual communication, a picture communication, a video communication, a haptic communication, etc.)). Data received from the passive source 920 may be continuously received, received periodically (e.g., every second, every minute, every hour, and/or the like), and/or received once. Data received from the passive source 920 may be processed through a data processing algorithm 925 to determine a state of a user and/or an environment. The determined state of the user and/or environment may be mapped to a location as shown in FIG. 9D and/or FIG. 2, given a binary value, and/or given a number between 0 and 1 (930). The location, binary value, and/or number may control one or more musical parameters and cause a computing system to generate music based on the one or more audio feature parameter values (935). The music that is generated may be continuously updated/controlled by the continuous one or more active or passive inputs, regularly updated/controlled based on inputs received periodically, updated only when a discrete message is received, and/or the like.

In some cases, a second source 940 may be added to control the generation of music. The second source 940 may be an active source which receives direct user input via a user interface (e.g., user interface 200, user interface 900*d*), a touch screen, one or more actuated buttons, and/or the like. A user may control one or more of turning the music off and on, a genre of music created, one or more musical instruments being played, transitioning between different types of music, selecting different states, selecting a goal state, and/or the like.

The music generated from the inputs (e.g., first source 920 and second source 940) may be harmonized, layered, cross-faded, and/or the like. For example, the music may start out generating a user's current state based on sensor input and based on a selection from a user via a user interface of a goal state, the music that is generated may then transition/change to guide a user from a first state to a second state. Additionally and/or alternatively, in another non-limiting example, the music that is generated based on sensor input may have one or more musical attributes and a user selection of age, genre, etc. may cause the music to adapt or change based on the selections. Additionally and/or alternatively, the music generated based on one or more sensors may adapt or change as a user drags his or her finger over a user interface (e.g., user interface 200 and/or 900*d*).

In another non-limiting example, sensor input may be received from two passive sources e.g., two biometric inputs, a biometric input and a camera, etc. The sensor input may be associated with two different users and/or participants in a race or competitive activity. The music that is generated may be used to reflect a user's position in the race or competitive activity. The music may speed up or slow down to reflect if the user is ahead or behind other participants in the race or competitive activity.

These are only some examples of the different ways music may be generated using two different input sources.

Although FIGS. 9A-9E are directed toward guiding a user from a first state to a second state, similar methods may be used to exercise continuous control over music generation to guide a user toward other particular desired states or goals. Additionally and/or alternatively, similar methods may be used to transition between environmental states (e.g., transitioning from sunny to rainy weather, transitioning from one temperature to another temperature, and/or the like). Additionally and/or alternatively, the user interface described with respect to FIGS. 2-4 may be used to exercise continuous control music generation to guide a user from a first state to a second desired state.

For example, systems similar to those described in FIGS. 2-4 and 9 may be used to continuously control the generation of music to guide a user from a stressful/aroused state to a relaxed/calm state, from a non-meditative state to a meditative state, from an unfocused state to a focused state, from a negative state to a positive state, from a state of inactivity to a state of activity, from a slow breathing pattern to a fast breathing pattern, from a fast breathing pattern to a slow breathing pattern, from a slow heartbeat to a fast heartbeat, from a slow heartbeat to a fast heartbeat, from bad posture to good posture, from less movement to more movement and vice versa, from a bad body position to a good body position, and/or the like. Additionally and/or alternatively, systems similar to those described in FIGS. 2-4 and 9 may be used to continuously control the generation of music to guide a user through a workout (warm-up, exercise, cool-down, etc.).

Additionally and/or alternatively, systems similar to those described in FIGS. 2-4 and 9 may be used to continuously control the generation of music to sync to at least one of a running speed of the user, a heartbeat of the user, a breathing pattern of the user, a brainwave pattern of the user, and/or the like. In this manner, a user may receive instant feedback about his or her current state.

In various embodiments, these systems and methods may be used to continuously generate music that reflects a user's current state and may be constantly adapted/changed in real-time as the user's state changes.

FIG. 10 is a flow diagram illustrating a method for continuously controlling the generation of the music to guide a user toward a goal, in accordance with various embodiments.

While the techniques and procedures are depicted and/or described in a certain order for purposes of illustration, it should be appreciated that certain procedures may be reordered and/or omitted within the scope of various embodiments. Moreover, while the method illustrated by FIG. 10 can be implemented by or with (and, in some cases, are described below with respect to) the system 100 of FIG. 1 (or components thereof) the user interface 200 of FIG. 2 (or components thereof), the system 300 of FIG. 3 (or components thereof), the mapping system 400 of FIG. 4 (or components thereof), and/or the mapping system of FIG. 9 (or components thereof), such methods may also be implemented using any suitable hardware (or software) implementation. Similarly, while each of the system 100 of FIG. 1 (or components thereof) user interface 200 of FIG. 2 (or components thereof), the system 300 of FIG. 3 (or components thereof), the mapping system 400 of FIG. 4 (or components thereof), and/or the mapping system of FIG. 9 (or components thereof), can operate according to the method illustrated by FIG. 10 (e.g., by executing instructions embodied on a computer readable medium), the system 100 of FIG. 1 user interface 200 of FIG. 2, the system 300 of FIG. 3, the mapping system 400 of FIG. 4, and/or the mapping system of FIG. 9 can each also operate according to other modes of operation and/or perform other suitable procedures.

In the non-limiting embodiment of FIG. 10, the method, at block 1005, might comprise receiving, with a computing system, at least one sensor input associated with a user and/or an environment.

The computing system may be at least one of a desktop computer, a laptop computer, a tablet, a smart phone, an e-reader, and/or the like. Additionally and/or alternatively, in some embodiments, the computing system might include, without limitation, one of a processor of a set-top box, a processor of a digital video recording ("DVR") device, a processor of a user device running a software application ("app"), a processor of an audio playback device, a processor on an input device (e.g., fitness tracker, EEG device, or the like) running an app, a processor of a media player, a processor of a gaming console, a processor in audio equipment, and/or the like.

The sensor input may contain feedback from one or more sensors including, but not limited to, one or more GPS sensors, one or more distance sensors, one or more motion sensors, one or more movement sensors, one or more speed or velocity sensors, one or more accelerometer sensors, one or more eye tracking sensors, one or more biometric/health sensors, one or more facial recognition sensors, one or more camera sensors, and/or the like.

The biometric/health sensor input may be received from at least one of a fitness tracker, a smart watch, a smart phone, an electroencephalography ("EEG") device, a virtual reality ("VR") device, an augmented reality ("AR") device, and/or the like. The feedback from the one or more biometric/health sensors might include, but is not limited to, at least one of a heart rate, a blood pressure, a stress level, a measure of electrical activity within a brain, pupil dilation, skin conductivity, a level of activity, number of steps, and/or the like.

The method of FIG. 10, at block 1010, may further comprise analyzing, with the computing system, the at least one sensor input to determine at least one first state of the user. The state of the user may correspond to at least one of an emotion of a user, a feeling of a user, a location of the user, a physical position (e.g., a posture of a user, a body position of a user, etc.) of a user, a level of activity of a user, a direction of an action of a user, an action (e.g., walking, running, biking, etc.) of a user, and/or the like.

In various embodiments, the method of FIG. 10, at block 1015, may additionally include determining, with the computing system, a desired second state of the user. The desired second state of a user may correspond to at least one of an emotion of a user, a feeling of a user, a location of the user, a physical position (e.g., a posture of a user, a body position of a user, etc.) of a user, a level of activity of a user, an action (e.g., walking, running, biking, etc.) of a user, and/or the like.

A user may manually enter a desired second state. Additionally and/or alternatively, the computing system may determine a desired second state. In a non-limiting example, the computing system, using the one or more sensors, may detect that a user is feeling stressed or anxious. Based on the determination that a user is stressed or anxious, the computing system may determine that the desired second state is calm or relaxed.

At block 1020, the method of FIG. 10 may determine whether the at least one first state of the user matches the desired second state of the user. Based on a determination that the at least one first state of the user does not match the desired second state of the user, the method, at block 1025 may continuously control, with the computing system, the generation of music having one or more characteristics to guide the user to the desired second state based on the at least at least one sensor input. This process may continue as indicated by arrow 1030 until the computing system determines that the user has achieved the desired second state.

The computing system may be configured to autonomously determine and continuously generate one or more characteristics of music to guide a user toward a desired second state based on the sensor feedback. The generated music may be designed to gradually lead a user in a step-by-step process toward the desired second state. In other words, the generated music may continuously adapt and/or evolve based on feedback received from the one or more sensors to lead a user toward a desired second state.

In order to guide the user toward a desired second state, the computing system may control, adapt, and/or evolve one or more characteristics of music based on input from the one or more sensors. The one or more characteristics of music might, include, but are not limited to, a note pattern, a harmony, a tone, vocal-like qualities, elements of surprise, randomization, consistency, crescendo, decrescendo an orchestration, a speed, a rhythm, a beat, or a volume. The one or more characteristics of music might be associated with guiding a user toward a desired state. In a non-limiting example, a beat or rhythm might be designed to help a user control his or her breathing. The one or more first characteristics of a plurality of characteristics of music may further be associated with the at least one of the age, the sex or other demographic of a user.

The following examples represent ways the generated music may be used to guide a user from a first state to a desired second. These are examples only and they are not intended to limit the scope of the invention.

In a first non-limiting example, the generated music may be designed to guide the user from a first stressful state to a second more relaxed state based on the at least one sensor input. The computing system may determine that a user is stressed based on input from the sensor and generate music to soothe and relax the user. The music that is generated may be designed to gradually lead the user to a more relaxed state. Initially, the music may start out louder and faster and as the computing system determines that the user is calming down (based on sensor input) the music may become softer and slower until the desired second state is reached. Once the desired second state is reached the computing system may generate music that is consistent with the desired second state.

In a second non-limiting example, the generated music may be designed to guide the user from a first non-meditative state or stressed to a second meditative or relaxed state based on the at least one sensor input. The music that is generated may be designed to gradually lead the user to a meditative or relaxed state. Initially, the music may start out louder and brighter in timbre and as the computing system determines that the user is entering a meditative or relaxed state (based on the sensor input) the music may become darker in timbre and slower until the desired second state is reached. Once the desired second state is reached the computing system may generate music that is consistent with the meditative or relaxed state.

In a third non-limiting example, the generated music might be designed to guide the user from a first unfocused state to a second focused state based on the at least one sensor input.

In a fourth non-limiting example, the generated music might be designed to guide the user from a first negative emotion to a second positive emotion.

In a fifth non-limiting example, the generated music might be designed to guide the user through a periodic activity (e.g., a desired number of steps per minute, a desired number of repetitions per minute, and/or the like) based on input from the one or more sensors. The music that is generated may be designed to gradually lead the user through the periodic activity (e.g., toward a desired number of steps per minute, toward a desired number of repetitions per minute, and/or the like). Initially, the music may start out with a slower beat. Once the computing system determines that the user's periodic activity matches the slower beat (based on input from the sensor), the computing system might increase the beat until the user is at the desired periodic activity. Once the desired periodic activity is reached the computing system may generate music that is consistent with maintaining the desired periodic activity.

In a sixth non-limiting example, the generated music might be designed to sync to at least one of a running speed of the user, a heartbeat of the user, a breathing pattern of the user, a brainwave pattern of the user, and/or the like based on input from the one or more sensors.

In a seventh non-limiting example, the generated music might be designed to guide the user to at least one of a slower breathing pattern, a slower heartbeat, a faster breathing pattern, a faster heartrate, and/or the like based on input from the one or more sensors.

In an eighth non-limiting example, the generated music may be designed to lead a user through a workout routine. The music may start out slow and gradually speed up (based on input from the one or more sensors) to lead a user through a warm up routine. The computing system may determine, based on biometric/health feedback from the user, when the user is ready to move on to the next stage of a workout routine and provide cues to the user that it is time to move on through the generated music. Additionally and/or alternatively, a user may indicate that he or she would like to exercise for an hour. The computing system may then lead a user through an hour exercise routine (warm up, cool down, etc.) using the generated music and the input from the one or more sensors.

In a ninth non-limiting example, the generated music may be designed to guide the user from a first location to a second desired location. This feature may be used by a user who is visually impaired to guide to a desired second location. For example, a user may indicate that he or she would like to go to the kitchen. Using sensor input, the computing system may generate music to guide the user towards the kitchen. The music may become faster as the user gets closer to the kitchen or the music may become slower as the user moves away from the kitchen. The sensor input may be used to continuously update and control the generated music.

In a tenth non-limiting example, the generated music may be designed to guide the user to at least one of a better posture, a better body position, and/or through a physical therapy routine. Sensor input may be used to provide information about a user's posture or body information and different musical characteristics may be designed to guide the user to better posture, body position, or toward a correct position for physical therapy.

In an eleventh non-limiting example, the generated music may be designed to alleviate pain and/or reflect a user's current state of pain. Sensor input may be used to detect a user's current level of pain and different musical attributes may be used to guide a user to a less painful state, distract a user from a painful state, and/or provide a doctor with feedback about a patient's current state of pain.

In a twelfth non-limiting example, the generated music might be designed to help a user win a race or determine where a user is within a race. Sensor input may be received from one or more passive sources e.g., two biometric inputs, a biometric input and a camera, etc. The sensor input may be associated with two different users and/or participants in a race. The music that is generated may be used to reflect a user's position in a race. The music may speed up or slow down to reflect if the user is ahead or behind other participants in a race.

The examples above of guiding a user toward a desired second state are intended to be non-limiting. Generating music using sensors may be used to guide users towards many other states than those listed above.

Exemplary System and Hardware Implementation

Figure 11:
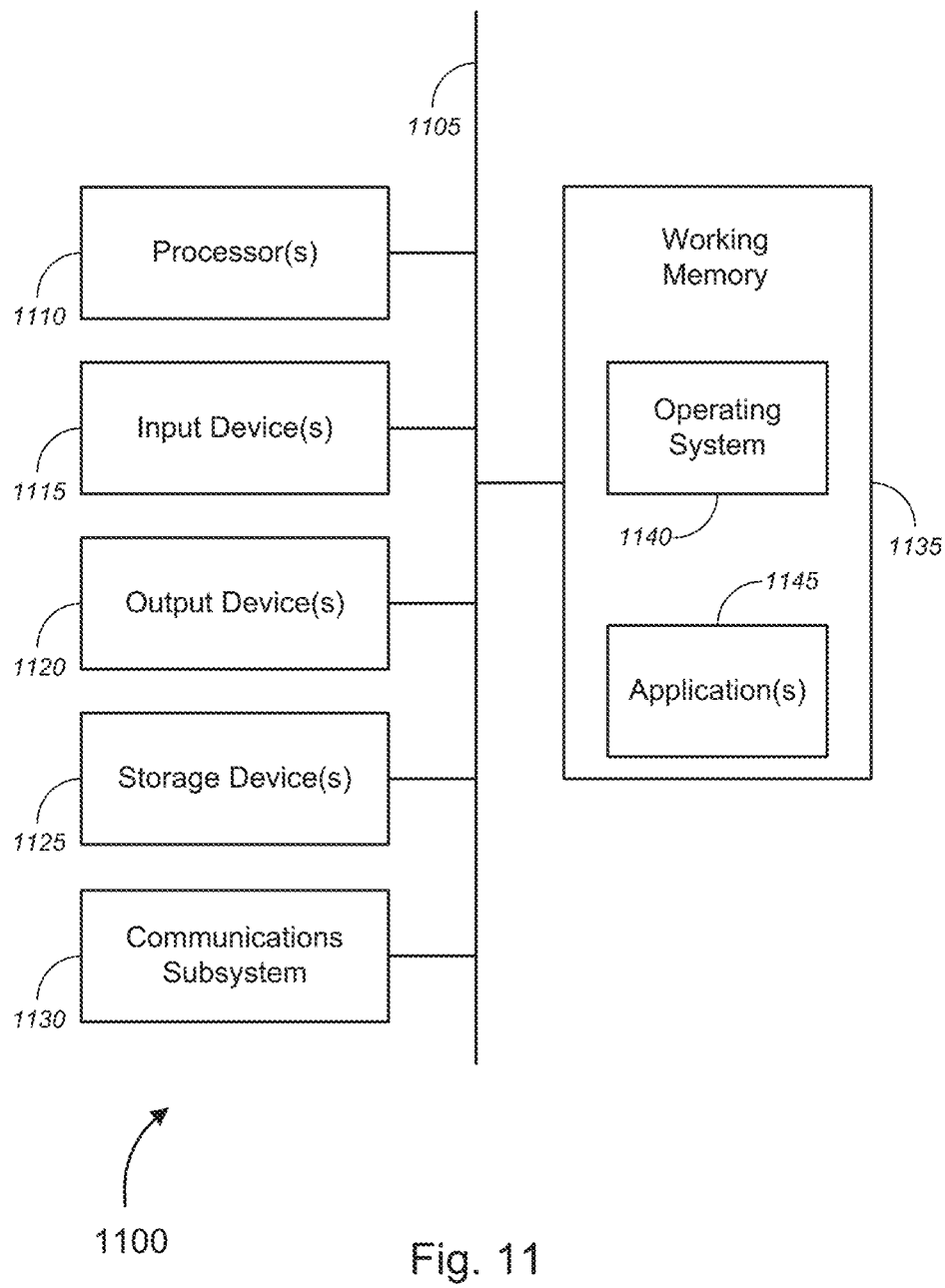
FIG. 11 is a block diagram illustrating an exemplary computer or system hardware architecture, in accordance with various embodiments.

FIG. 11 is a block diagram illustrating an exemplary computer or system hardware architecture, in accordance with various embodiments. FIG. 11 provides a schematic illustration of one embodiment of a computer system 1100 of the service provider system hardware that can perform the methods provided by various other embodiments, as described herein, and/or can perform the functions of computer or hardware system (i.e., computing systems/user device 105, input devices 115, audio playback devices 120a-120n, music sources (or servers) 125, user interface 200, computing system 305, input devices 310, XY interface 900d, etc.), as described above. It should be noted that FIG. 11 is meant only to provide a generalized illustration of various components, of which one or more (or none) of each may be utilized as appropriate. FIG. 11, therefore, broadly illustrates how individual system elements may be implemented in a relatively separated or relatively more integrated manner.

The computer or hardware system 1100—which might represent an embodiment of the computer or hardware system (i.e., computing systems/user devices 105, input devices 115, audio playback devices 120a-120n, music sources (or servers) 125, user interface 200, computing system 305, input devices 310, XY interface 900d, etc.), described above with respect to FIGS. 1-10—is shown comprising hardware elements that can be electrically coupled via a bus 1105 (or may otherwise be in communication, as appropriate). The hardware elements may include one or more processors 1110, including, without limitation, one or more general-purpose processors and/or one or more special-purpose processors (such as microprocessors, digital signal processing chips, graphics acceleration processors, and/or the like); one or more input devices 1115 (i.e., input devices 115, input devices 310, etc.), which can include, without limitation, a mouse, a keyboard, fitness trackers, smart watches, EEG devices, and/or the like; and one or more output devices 1120, which can include, without limitation, a display device, a printer, and/or the like.

The computer or hardware system 1100 may further include (and/or be in communication with) one or more storage devices 1125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, musical algorithms associated with different emotions, and/or the like.

The computer or hardware system 1100 might also include a communications subsystem 1130, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1130 may permit data to be exchanged with a network (such as the network described below, to name one example), with other computer or hardware systems, and/or with any other devices described herein. In many embodiments, the computer or hardware system 1100 will further comprise a working memory 1135, which can include a RAM or ROM device, as described above.

The computer or hardware system 1100 also may comprise software elements, shown as being currently located within the working memory 1135, including an operating system 1140, device drivers, executable libraries, and/or other code, such as one or more application programs 1145, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1125 described above. In some cases, the storage medium might be incorporated within a computer system, such as the system 1100. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 1100 and/or might take the form of source and/or installable code, which, upon compilation and/or installation on the computer or hardware system 1100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1100) to perform methods in accordance with various embodiments of the invention. According to a set of embodiments, some or all of the procedures of such methods are performed by the computer or hardware system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer readable medium, such as one or more of the storage device(s) 1125. Merely by way of example, execution of the sequences of instructions contained in the working memory 1135 might cause the processor(s) 1110 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1100, various computer readable media might be involved in providing instructions/code to processor(s) 1110 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1125. Volatile media includes, without limitation, dynamic memory, such as the working memory 1135. In some alternative embodiments, a computer readable medium may take the form of transmission media, which includes, without limitation, coaxial cables, copper wire and fiber optics, including the wires that comprise the bus 1105, as well as the various components of the communication subsystem 1130 (and/or the media by which the communications subsystem 1130 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1100. These signals, which might be in the form of electromagnetic signals, acoustic signals, optical signals, and/or the like, are all examples of carrier waves on which instructions can be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a storage device 1125 either before or after execution by the processor(s) 1110.

Additionally and/or alternatively, system 1100 may utilize neural networks (e.g., convolutional, recurrent, spiking, or other statistical learning mode) to classify an emotional state, determine emotion state from incoming sensor data, control position in the user interface, etc.

Figure 12:
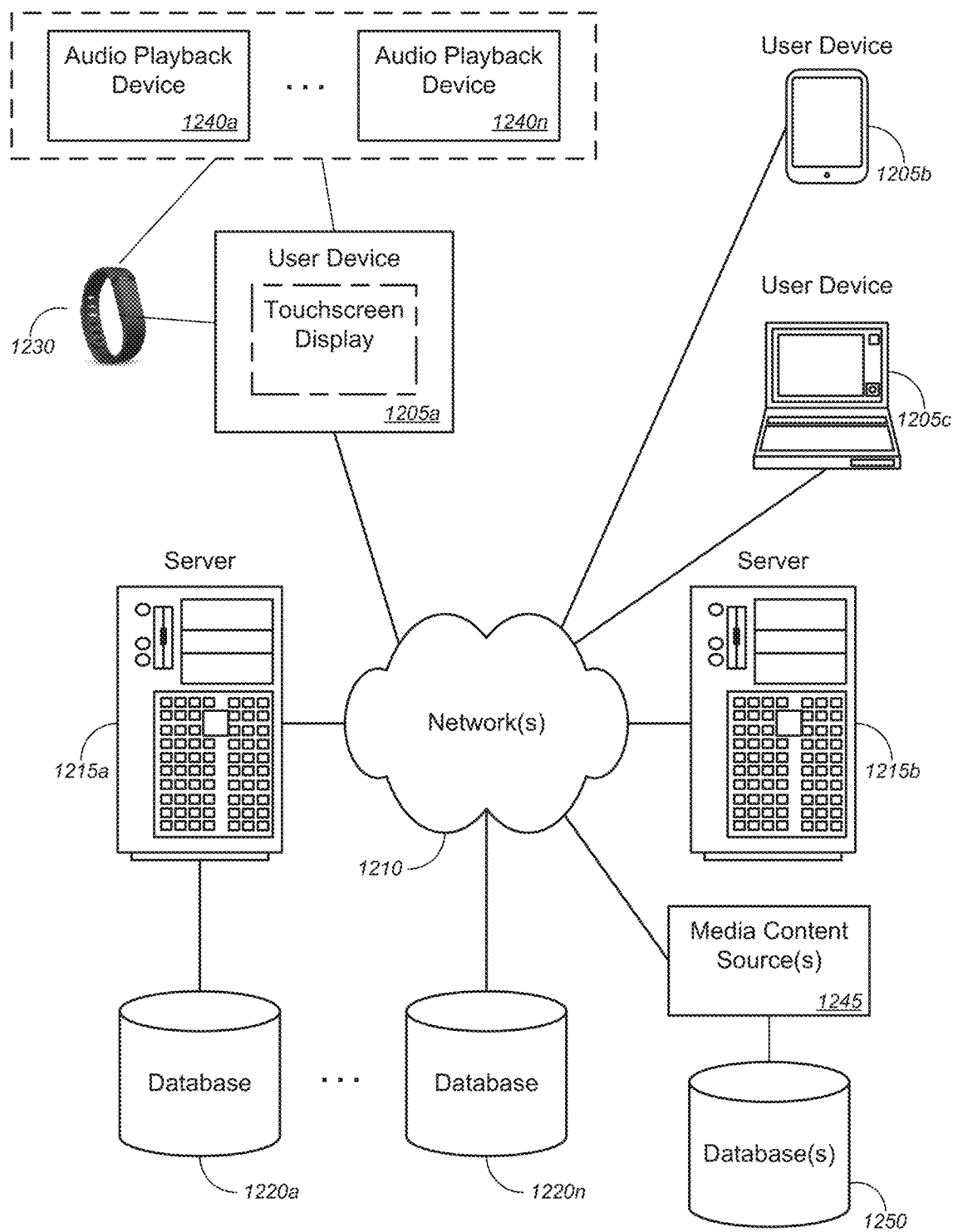
FIG. 12 is a block diagram illustrating a networked system of computers, computing systems, or system hardware architecture, which can be used in accordance with various embodiments.

As noted above, a set of embodiments comprises methods, systems, and apparatuses for generating music, and, more particularly, to methods, systems, and apparatuses for generating music associated with a state or an emotion contained within a communication, for a user interface for generating music associated with a state or an emotion, and for generating music to guide a user toward a desired state or goal. FIG. 12 illustrates a schematic diagram of a system 1200 that can be used in accordance with one set of embodiments. The system 1200 can include one or more user computers, user devices, or customer devices 1205 (similar to computing systems/user devices 105, input devices 115, etc.). A user computer, user device, or customer device 1205 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1205 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1205 can be any other electronic device, such as a thin-client computer, Internet-enabled mobile telephone, and/or personal digital assistant, capable of communicating via a network (e.g., the network(s) 1210 described below) and/or of displaying and navigating web pages or other types of electronic documents. Although the exemplary system 1200 is shown with three user computers, user devices, or customer devices 1205, any number of user computers, user devices, or customer devices can be supported.

Certain embodiments operate in a networked environment, which can include a network(s) 1210. The network(s) 1210 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1210 (similar to network(s) 140 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 702.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1215. Each of the server computers 1215 may be configured with an operating system, including, without limitation, any of those discussed above, as well as any commercially (or freely) available server operating systems. Each of the servers 1215 may also be running one or more applications, which can be configured to provide services to one or more clients 1205 and/or other servers 1215.

Merely by way of example, one of the servers 1215 might be a data server, a web server, a cloud computing device(s), or the like, as described above. The data server might include (or be in communication with) a web server, which can be used, merely by way of example, to process requests for web pages or other electronic documents from user computers 1205. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1205 to perform methods of the invention. A user interface (similar to user interface 200) may be featured on a webpage hosted by one of the servers 1215.

The server computers 1215, in some embodiments, might include one or more application servers, which can be configured with one or more applications accessible by a client running on one or more of the user computers 1205 and/or other servers 1215. In a non-limiting example, a user interface (similar to user interface 200) may be run as an application by a client running on one or more of the user computers 1205 and/or other servers 1215. Merely by way of example, the server(s) 1215 can be one or more general purpose computers capable of executing programs or scripts in response to the user computers 1205 and/or other servers 1215, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1205 and/or another server 1215. In some embodiments, an application server can perform one or more of the processes for generating music, and, more particularly, for generating music associated with a state or an emotion contained within a communication and for a user interface for generating music associated with a state or an emotion. Data provided by an application server may be formatted as one or more web pages (comprising HTML, JavaScript, etc., for example) and/or may be forwarded to a user computer 1205 via a web server (as described above, for example). Similarly, a web server might receive web page requests and/or input data from a user computer 1205 and/or forward the web page requests and/or input data to an application server. In some cases, a web server may be integrated with an application server.

Additionally and/or alternatively, user computer 1205 may utilize neural networks (e.g., convolutional, recurrent, spiking, or other statistical learning mode) to classify a state or an emotional state, determine a state or an emotional state from incoming sensor data, control position in the user interface, etc.

In accordance with further embodiments, one or more servers 1215 can function as a file server and/or can include one or more of the files (e.g., application code, data files, etc.) necessary to implement various disclosed methods, incorporated by an application running on a user computer 1205 and/or another server 1215. Alternatively, as those skilled in the art will appreciate, a file server can include all necessary files, allowing such an application to be invoked remotely by a user computer, user device, or customer device 1205 and/or server 1215.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1220a-1220n (collectively, "databases 1220"). The location of each of the databases 1220 is discretionary: merely by way of example, a database 1220a might reside on a storage medium local to (and/or resident in) a server 1215a (and/or a user computer, user device, or customer device 1205). Alternatively, a database 1220n can be remote from any or all of the computers 1205, 1215, so long as it can be in communication (e.g., via the network 1210) with one or more of these. In a particular set of embodiments, a database 1220 can reside in a storage-area network ("SAN") familiar to those skilled in the art. (Likewise, any necessary files for performing the functions attributed to the computers 1205, 1215 can be stored locally on the respective computer and/or remotely, as appropriate.) In one set of embodiments, the database 1220 can be a relational database, such as an Oracle database, that is adapted to store, update, and retrieve data in response to SQL-formatted commands. The database might be controlled and/or maintained by a database server, as described above, for example.

According to some embodiments, system 1200 might further comprise one or more input devices 1230 (similar to input devices 115 of FIG. 1, or the like), one or more audio playback devices 1240a-1240n (similar to audio playback devices 120a-120n of FIG. 1, or the like), one or more music (e.g., video) content sources 1245 (similar to music sources (or servers) 125, or the like) and corresponding database(s) 1250 (similar databases 130 of FIG. 1, or the like), and/or the like. In some embodiments, the computing system 1200 might be communicatively coupled to one or more input device, one or more a playback device(s), or the like (i.e., one or more of input devices 115 or 1230 and/or audio playback device(s) 120a-120n or 1240a-1240n, or the like). In some cases, the input device might comprise one of a fitness tracker, EEG device, smart watch, and/or the like.

These and other functions of the system 1200 (and its components) are described in greater detail above with respect to FIGS. 1-11.

In one aspect, a method for creating generative music might be characterized by the following numbered paragraphs:

1. A method, comprising: analyzing, with a computing system, a communication to determine at least one state contained within the communication; autonomously determining, with the computing system, one or more first characteristics of a plurality of characteristics of music associated with the determined at least one state contained within the communication; and based on the determination of the one or more first characteristics of a plurality of characteristics of music associated with the at least one state contained within the communication, autonomously generating, with the computing system, music having the one or more first characteristics of the plurality of characteristics associated with the at least one determined state contained within the communication.

2. The method of paragraph 1, wherein the computing system comprises at least one of a desktop computer, a laptop computer, a tablet, an embedded processing unit, or a smart phone.

3. The method of paragraph 1, wherein the one or more first characteristics of the plurality of characteristics of music include at least one of a pitch, note pattern, note envelope or shape, a control signal, a harmony, a grouping, vocal-like filtering and inflections, elements of surprise, randomization, consistency, crescendo, decrescendo an orchestration, a rate, a tempo, a rhythm, a timbre or an amplitude associated with the first state indicated by the communication.

4. The method of paragraph 1, wherein the music that is generated is generated in real-time based on feedback from the communication.

5. The method of paragraph 1, wherein the at least one state includes at least one of a first state associated with a person, a second state associated with an environment, a third state associated with a user interface involving at least one of an interactive touch screen, phone, tablet, digital book, a video game, or a virtual reality or augmented reality system.

6. The method of paragraph 5, wherein the first state associated with the person includes at least one of a physical state of a person, a mental state of a person, an emotion, a feeling, a bio-metric, a location, an activity, a rate of activity, a level of activity or an action of a user, wherein the second state associated with the environment includes at least one of a weather situation, a temperature, an amount of humidity, an amount of light, a time of day, or a time of year, wherein the third state associated with the state determined by a text, image, video, video or audio game, or virtual, augmented or mixed reality technology includes at least one of a sixth state associated with the state of one or more characters, scenes, or quantifiable attribute.

7. The method of paragraph 1, wherein the communication comprises at least one of a sensor communication, an Internet of Things ("IoT") communication, a biometric communication, a voice communication, a textual communication, a photographic communication, or a video communication.

8. The method of paragraph 7, wherein the senor communication is received from one or more sensors including at least one of one or more GPS sensors, one or more distance sensors, one or more motion sensors, one or more movement sensors, one or more speed or velocity sensors, one or more accelerometer sensors, one or more gyroscope sensors, one or more biometric/health sensors, one or more facial recognition sensors, one or more cameras, one or more weather sensors, one or more temperature sensors, one or more ambient light sensors, one or more humidity sensors, one or more touch sensors, one or more movement sensors, one or more rotation sensors, or one or more microphones or audio sensors, and wherein the at least one state is determined based on feedback from the one or more sensors.

9. The method of paragraph 7, wherein the IoT communication is received from one or more devices comprising at least one of a smart home device, one or more thermometers in one or more rooms, one or more infrared ("IR") thermometers aimed at one or more positions in the one or more rooms, one or more air flow sensors in the one or more rooms, one or more air flow sensors in air ducts directed toward the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms or outside the customer premises, one or more humidity sensors in the one or more rooms, one or more smoke detectors detecting smoke in the one or more rooms, one or more gas detection sensors detecting gas in the one or more rooms, one or more biometric sensors identifying at least one person, or one or more health sensors detecting health information for at least one person, and wherein the at least one state is determined based on feedback from the one or more devices.

10. The method of paragraph 7, wherein the biometric communication is received from at least one of a fitness tracker or an electroencephalography ("EEG") device and wherein the computing system determines the at least one state based on feedback from the at least one of the fitness tracker or the EEG device.

11. The method of paragraph 7, wherein the computing system determines the at least one state by at least one of parsing the voice communication of at least one person or determining a tone of voice of the voice communication of the at least one person.

12. The method of paragraph 7, wherein the computing system determines the at least one state by parsing the textual communication or detecting at least one emoji used in the textual communication.

13. The method of paragraph 7, wherein the computing system determines the at least one state by determining a displayed state of at least one person in the photographic communication.

14. The method of paragraph 7, wherein the computing system determines the at least one state by at least one of determining a displayed state of at least one person in the video communication, analyzing body language of the at least one person in the video communication, parsing dialogue of the at least one person in the video, or determining a tone of voice of the at least one person in the video.

15. The method of paragraph 1, wherein the communication is further indicative of at least one of an age, a sex or location of a person, wherein the one or more first characteristics of a plurality of characteristics of music are further associated with the at least one of the age or the sex or the location indicated by the communication, and wherein the music that is generated further has the one or more first characteristics of the plurality of characteristics associated with the at least one of the age or the sex indicated by the communication.

16. The method of paragraph 1, wherein the music that is generated contains human-like embellishments.

17. The method of paragraph 16, wherein the human-like embellishments are created from at least one of timing jitter, frequency jitter, or timbral jitter.

18. The method of paragraph 1, further comprising: mapping, with the computing system, a plurality of states to a circular pattern, wherein at least one of a position of a state of the plurality of states on a circumference of the circular pattern or an angle of the state on the circular pattern corresponds to a first subset of characteristics of music associated with the state, and wherein a distance of the state from a center of the circular pattern corresponds to a second subset of characteristics of music associated with the state; determining, with the computing system, the position on the circumference of the circular pattern of at least one state contained within the communication or the angle of the at least one state contained within the communication and the distance of state contained within the communication from the center of the circular pattern; and based on the determination of the position or angle and the distance of the at least one state contained within the communication, autonomously generating, with the computing system, music having the first subset of particular characteristics and the second subset of particular characteristics associated with the determined at least one state contained within the communication.

19. The method of paragraph 1, further comprising: mapping, with the computing system, a plurality of states to a plurality of positions on a two-dimensional graph, wherein at least one of a first distance of a position from a first axis corresponds to an input mapped to a first subset of characteristics of music, and wherein a second distance of the position from a second axis corresponds to an input controlling a second subset of characteristics of music; determining, with the computing system, a state position associated with the determined at least one state contained within the communication and having a first particular distance from the first axis and a second particular distance from the second axis; based on the determination of the state position having the first particular distance from the first axis and a second particular distance from the second axis, autonomously generating, with the computing system, music having the first subset of characteristics and the second subset of characteristics corresponding to the state position associated with the at least one state contained within the communication.

In another aspect, a method for generating music might be characterized by the following sample numbered paragraphs:

20. A method for generating music, said method comprising: generating, with a computing system, a circular pattern having a plurality of different states mapped to different regions on the circular pattern, wherein at least one of a position of a region on a circumference of the circular pattern or an angle of the region on the circular pattern corresponds to a first subset of characteristics of a plurality of characteristics of music, and wherein a distance of the region from a center of the circular pattern corresponds to a second subset of characteristics of the plurality of characteristics of music; analyzing, with a computing system, a communication to determine at least one state contained within the communication; autonomously determining, with the computing system, the position of at least one particular region corresponding to the at least one particular state on the circumference of the circular pattern or the angle of the region on the circular pattern corresponding to the at least one particular state and the distance of the at least one particular region corresponding to the at least one particular emotion from the center of the circular pattern; based on the determination of the position of the determined at least one particular region on the circumference of the circular pattern or the angle of the determined at least one particular region and the distance of the determined at least one particular region from the center of the circular pattern, autonomously generating, with the computing system, music having the first subset of characteristics and the second subset of characteristics associated with the at least one state contained within the communication.

21. The method of paragraph 20, wherein the computing system comprises at least one of a desktop computer, a laptop computer, a tablet, embedded processing unit or a cellular phone.

22. The method of paragraph 20, wherein the different regions are represented by icons, and wherein the icons are at least one of a textual icon representing the at least one emotion or an emoji representing the at least one of the emotion.

23. The method of paragraph 20, wherein the first subset of characteristics includes at least one of a pitch, a note envelope, a note pattern, a filter, a harmony, a tone, a density, vocal-like quality, a grouping, an orchestration, a timbre, a rate, a tempo, or an amplitude associated with the first state indicated by the user communication.

24. The method of paragraph 20, wherein the second subset of characteristics includes at least one of a pitch, a note pattern, a filter, a harmony, a tone, a density, vocal-like quality, an orchestration, a speed, a timbre, or an amplitude associated with the first state indicated by the user communication.

25. The method of paragraph 20, further comprising: autonomously determining, with the computing system, whether at least two states are contained within the communication; based on a determination that at least two states are contained within the communication, simultaneously generating, playing, and harmonizing music having the particular first subset of characteristics and the particular second set of characteristics associated with each of the at least two states contained within the communication.

26. The method of paragraph 20, further comprising: autonomously determining, with the computing system, whether at least two states are contained within the communication; based on a determination that more than one states is contained within the communication, determining an order to generate and play music associated with each of the at least two states; transitioning, with the computing system, between generating and playing music associated with each of the at least two states.

27. The method of paragraph 26, wherein transitioning between playing music associated with each of the at least two states contained within the communication further comprises: autonomously determining, with the computing system, the position or angle of the at least two particular regions corresponding to the at least two particular states on the circumference of the circular pattern and the distance of two particular regions corresponding to the particular states from the center of the circular pattern; autonomously determining, with the computing system, regions corresponding to additional states between the at least two particular regions corresponding to the at least two particular states; transitioning, with the computing system, between playing music associated with each of the at least two states contained within the communication by playing music associated with the determined additional states between music associated with the at least two particular regions corresponding to the at least two particular states.

28. The method of paragraph 20, wherein the user communication comprises at least one of a tactile communication, a sensor communication, an Internet of Things "IoT" communication, a biometric communication, a voice communication, a textual communication, a picture communication, or a video communication.

29. The method of paragraph 28, further comprising: displaying the circular pattern having the plurality of different states represented by regions to a user on a user interface, wherein the tactile communication is received from the user selecting at least one regions associated with at least one particular state on the circular pattern displayed on the user interface.

30. The method of paragraph 28, further comprising: displaying the circular pattern having the plurality of different states represented by regions to a user on a user interface, wherein the tactile communication includes the user selecting at least two regions.

31. The method of paragraph 30, further comprising: tracking, with the computing system, the tactile communication of a user; determining, with the computing system, whether at least one region has been selected; based on a determination that at least two regions have been selected, determining, with the computing system, whether the tactile input, when selecting the at least two regions, was continuous input; based on a determination that the tactile input was not continuous, pausing, with the computing system, the generated music between each user selection of a region; based on a determination that the tactile input was continuous, smoothly transitioning between playing music associated with each of the at least two states selected by the tactile input.

32. The method of paragraph 31, wherein smoothly transitioning between playing music, further comprises: creating, with the computing system, a time lag between the selection of each region and the generation of music associated with each region. 33. The method of paragraph 32, wherein in the time lag further comprises playing the generated music for each selected region for a predetermined amount of time before transitioning to a subsequent selected region.

34. The method of paragraph 28, wherein the biometric communication is received from at least one of a fitness tracker or an electroencephalography ("EEG") device and wherein the computing system determines the first state of the user based on feedback from the at least one of the fitness tracker or the EEG device.

35. The method of paragraph 28, wherein the computing system determines the first state of the user by at least one of parsing the voice communication of the user or determining a tone of the voice communication of the user.

36. The method of paragraph 28, wherein the computing system determines the first state of the user by parsing the textual communication of the user.

37. The method of paragraph 28, wherein the computing system determines the first state of the user by determining a displayed state of a person in the picture communication.

38. The method of paragraph 28, wherein the computing system determines the first state of the user by at least one of determining a displayed state of a person in the video communication, parsing dialogue of the person in the video, or determining a tone of voice of the person in the video.

39. The method of paragraph 20, wherein the user communication is further indicative of at least one of a demographic such as age, sex or location of a user, wherein the intensity or character of the music is further associated with the at least one of the demographics indicated by the user communication, and wherein the music that is generated further has the intensity associated with the at least one of the demographics indicated by the user.

40. The method of paragraph 20, wherein the music that is generated contains variation and human-like embellishments.

41. The method of paragraph 20, wherein the human-like embellishments are created from at least one of timing jitter, frequency jitter, or timbre jitter, wherein a random signal may influence parameter values.

42. The method of paragraph 20, further comprising: receiving, with the computing system, at least one additional user communication from a user, the at least one additional user communication being indicative of at least one additional state; determining, with the computing system, a number of user communications over a specified period of time; determining, with the computing system, whether the number of user communications exceeds a predetermined threshold; based on a determination that the number of user communications does not exceed the predetermined threshold, autonomously determining, with the computing system, one or more first characteristics of a plurality of characteristics of music associated with the second state indicated by the second user communication, and autonomously transitioning from generating music having the one or more first characteristics of the plurality of characteristics associated with the first state indicated by the user to generating music having the one or more first characteristics of the plurality of characteristics associated with the second state indicated by the user; and based on a determination that the number of user communications does exceed the predetermined threshold, pausing, with the computing system, the music being generated.

In yet another aspect, a method for generating music might be characterized by the following sample numbered paragraphs:

43. A method for generating music, said method comprising: generating, with a computing system, a two-dimensional graph having a plurality of different states mapped to different regions on the two-dimensional graph, wherein at least one of a first distance of a region from a first axis on the two-dimensional graph corresponds to an input mapped to a first subset of characteristics of a plurality of characteristics of music, and wherein a second distance of the region from a second of the two-dimensional graph corresponds to an input mapped to second subset of characteristics of the plurality of characteristics of music; analyzing, with a computing system, a communication to determine at least one state contained within the communication; autonomously determining, with the computing system, a position of at least one particular region corresponding to the at least one state contained within the communication and having a first particular distance from the first axis and a second particular distance from the second axis; based on the determination of the position of the determined at least one particular region corresponding to the at least one state contained within the communication, autonomously generating, with the computing system, music having the first subset of characteristics and the second subset of characteristics associated with the position of the at least one state contained within the communication.

In a further aspect, a method for generating music might be characterized by the following sample numbered paragraphs:

44. A method for generating new music, the method comprising: defining, with a computing system, a predetermined set of notes; defining, with the computing system, at least one of a frequency, note pattern, a note envelope, a note range, a melody, a harmony, a probability of a note event, a tone, an orchestration, a timbre, a rate, a tempo, a rhythmic structure, a density, a grouping of audio components, a filter, a musical gesture, or an amplitude associated with a particular state; generating, with the computing system, music associated with the at least one of a note pattern, a note range, a harmony, a tone, a orchestration, a timbre, a speed, a rhythmic structure, a grouping, a gesture or the amplitude associated with the particular state; and adding, with the computing system, human-like embellishments to the generated music.

In another aspect, an apparatus for generating music might be characterized by the following sample numbered paragraphs:

45. An apparatus, comprising: at least one processor; and a non-transitory computer readable medium communicatively coupled to the at least one processor, the non-transitory computer readable medium having stored thereon computer software comprising a set of instructions that, when executed by the at least one processor, causes the apparatus to: analyze a communication to determine at least one emotion or state contained within the communication; autonomously determine one or more first characteristics of a plurality of characteristics of music associated with the determined at least one emotion or state contained within the communication; and based on the determination of the one or more first characteristics of a plurality of characteristics of music associated with the at least one emotion or state contained within the communication, autonomously generate music having the one or more first characteristics of the plurality of characteristics associated with the at least one determined emotion or state contained within the communication.

In an additional aspect, a system for generating music might be characterized by the following sample numbered paragraphs:

46. A system, comprising: a computing system, comprising: at least one first processor; and a first non-transitory computer readable medium communicatively coupled to the at least one first processor, the first non-transitory computer readable medium having stored thereon computer software comprising a first set of instructions that, when executed by the at least one first processor causes the computing system to: analyze a communication to determine at least one emotion or state contained within the communication; autonomously determine one or more first characteristics of a plurality of characteristics of music associated with the determined at least one emotion or state contained within the communication; and based on the determination of the one or more first characteristics of a plurality of characteristics of music associated with the at least one emotion or state contained within the communication, autonomously generate music having the one or more first characteristics of the plurality of characteristics associated with the at least one determined emotion or state contained within the communication.

In another aspect, an apparatus for generating music might be characterized by the following sample numbered paragraphs:

47. An apparatus, comprising: at least one processor; and a non-transitory computer readable medium communicatively coupled to the at least one processor, the non-transitory computer readable medium having stored thereon computer software comprising a set of instructions that, when executed by the at least one processor, causes the apparatus to: generate a circular pattern having a plurality of different emotions or states represented by icons, wherein at least one of a position on a circumference of the circular pattern or an angle of the circular pattern corresponds to a first subset of characteristics of a plurality of characteristics of music associated with a particular emotion or states represented by a particular icon, and wherein a distance from a center of the circular pattern corresponds to a second subset of characteristics of the plurality of characteristics of music associated with a particular emotion or states represented by a particular icon; analyze a communication to determine at least one emotion or state contained within the communication; autonomously determine the position of at least one particular icon corresponding to the at least one particular emotion or state on the circumference of the circular pattern and the distance of the at least one particular icon corresponding to the at least one particular emotion or state from the center of the circular pattern; and based on the determination of the position of the determined at least one particular icon on the circumference of the circular pattern or the angle of the determined at least one particular icon and the distance of the determined at least one particular icon from the center of the circular pattern, autonomously generate music having the first subset of characteristics and the second subset of characteristics associated with the at least one emotion or state contained within the communication.

In an additional aspect, a system for generating music might be characterized by the following sample numbered paragraphs:

48. A system, comprising: a computing system, comprising: at least one first processor; and a first non-transitory computer readable medium communicatively coupled to the at least one first processor, the first non-transitory computer readable medium having stored thereon computer software comprising a first set of instructions that, when executed by the at least one first processor causes the computing system to: generate a circular pattern having a plurality of different emotions or states represented by icons, wherein at least one of a position on a circumference of the circular pattern or an angle of the circular pattern corresponds to a first subset of characteristics of a plurality of characteristics of music associated with a particular emotion or states represented by a particular icon, and wherein a distance from a center of the circular pattern corresponds to a second subset of characteristics of the plurality of characteristics of music associated with a particular emotion or states represented by a particular icon; analyze a communication to determine at least one emotion or state contained within the communication; autonomously determine the position of at least one particular icon corresponding to the at least one particular emotion or state on the circumference of the circular pattern and the distance of the at least one particular icon corresponding to the at least one particular emotion or state from the center of the circular pattern; and based on the determination of the position of the determined at least one particular icon on the circumference of the circular pattern or the angle of the determined at least one particular icon and the distance of the determined at least one particular icon from the center of the circular pattern, autonomously generate music having the first subset of characteristics and the second subset of characteristics associated with the at least one emotion or state contained within the communication.

In another aspect, an apparatus for generating music might be characterized by the following sample numbered paragraphs:

49. An apparatus, comprising: at least one processor; and a non-transitory computer readable medium communicatively coupled to the at least one processor, the non-transitory computer readable medium having stored thereon computer software comprising a set of instructions that, when executed by the at least one processor, causes the apparatus to: define a predetermined set of notes; define at least one of a note pattern, a note range, a harmony, a tone, a pitch, an envelope, a probability of a note event, an orchestration, a speed, a rate, a timbre, a density, a filter, a contour, a gesture, a density, a grouping of audio components, a group, or an amplitude of an audio feature associated with a particular emotion or state; generate music associated with the at least one of the note pattern, the note range, the harmony, the tone, the orchestration, the speed, a rate, a timbre, a contour, a gesture or an amplitude associated with the particular emotion or state; and add human-like variations to the generated music.

In an additional aspect, a system for generating music might be characterized by the following sample numbered paragraphs:

50. A system, comprising: a computing system, comprising: at least one first processor; and a first non-transitory computer readable medium communicatively coupled to the at least one first processor, the first non-transitory computer readable medium having stored thereon computer software comprising a first set of instructions that, when executed by the at least one first processor causes the computing system to: define a predetermined set of notes; define at least one of a note pattern, a note range, a harmony, a tone, a pitch, an envelope, a probability of a note event, an orchestration, a speed, a rate, a timbre, a density, a filter, a contour, a gesture, a density, a grouping of audio components, a group, or an amplitude of an audio feature associated with a particular emotion or state; generate music associated with the at least one of the note pattern, the note range, the harmony, the tone, the orchestration, the speed, a rate, a timbre, a contour, a gesture or an amplitude associated with the particular emotion or state; and add human-like variations to the generated music.

In a further aspect, a method might be characterized by the following sample numbered paragraphs:

51. A method for generating music, said method comprising: generating, with a computing system, a circular pattern having a plurality of different emotions or states represented by icons, wherein at least one of a position of a particular icon on the circular pattern corresponds to a set of characteristics of a plurality of characteristics of music associated with a particular emotion or state represented by the particular icon or position; analyzing, with the computing system, a communication to determine at least one emotion or state contained within the communication; autonomously determining, with the computing system, the position of at least one icon or position corresponding to the determined at least one emotion or state contained within the communication on the circular pattern; based on the determination of the position of the determined at least one particular icon on the circular pattern, autonomously generating, with the computing system, music having the set characteristics associated with the determined at least one emotion or state contained within the communication.

52. The method of paragraph 51, further comprising: autonomously determining, with the computing system, whether at least two emotions or states are contained within the communication; based on a determination that at least two emotions are contained within the communication, simultaneously generating, playing, and harmonizing music having the set of characteristics associated with each of the at least two emotions or states contained within the communication.

53. The method of paragraph 51, further comprising: autonomously determining, with the computing system, whether at least two emotions or states are contained within the communication; based on a determination that more than one emotion or state is contained within the communication, determining an order to generate and play music associated with each of the at least two emotions or states; transitioning, with the computing system, between generating and playing music associated with each of the at least two emotions or states.

54. The method of paragraph 53, wherein transitioning between playing music associated with each of the at least two emotions or states are contained within the communication further comprises: autonomously determining, with the computing system, the position of the at least two particular icons or positions corresponding to the at least two particular emotions or states on the circular pattern; autonomously determining, with the computing system, icons corresponding to additional emotions or states between the at least two particular icons corresponding to the at least two particular emotions or states; transitioning, with the computing system, between playing music associated with each of the at least two emotions or states contained within the communication by playing music associated with the determined additional emotions or states between music associated with the at least two particular icons corresponding to the at least two particular emotions or states.

In an aspect, a method might be characterized by the following sample numbered paragraphs:

55. A method for generating music, said method comprising: generating, with a computing system, a pattern having a plurality of different concepts represented by icons, wherein at least one of a position of a particular icon on the pattern corresponds to a set of characteristics of a plurality of characteristics of music associated with a particular concept represented by the particular icon; analyzing, with the computing system, a communication to determine at least one concept contained within the communication; autonomously determining, with the computing system, the position of at least one icon corresponding to the determined at least one concept contained within the communication on the pattern; based on the determination of the position of the determined at least one particular icon on the pattern, autonomously generating, with the computing system, music having the set characteristics associated with the determined at least one concept contained within the communication.

56. The method of paragraph 55, wherein the at least on concept corresponds to at least one of an emotion, a state of a person, an action of a person, an attribute of a physical or virtual environment, or interaction in a physical or virtual environment.

57. The method of paragraph 55, wherein the pattern is at least one of a circular pattern, a triangular patter, a rectangular pattern, a pentagonal pattern, a hexagonal pattern, an octagonal pattern, a two-dimensional grid, or a three-dimensional grid.

In an additional aspect, a method for generating music might be characterized by the following sample numbered paragraphs:

58. A method, comprising: analyzing, with a computing system, a communication to determine at least one concept contained within the communication; autonomously determining, with the computing system, one or more first characteristics of a plurality of characteristics of music associated with the determined at least one concept contained within the communication; and based on the determination of the one or more first characteristics of a plurality of characteristics of music associated with the at least one concept contained within the communication, autonomously generating, with the computing system, music having the one or more first characteristics of the plurality of characteristics associated with the at least one determined concept contained within the communication.

59. The method of paragraph 58, wherein the at least one concept corresponds to at least one of an emotion of a person, a state of a person, an action of a person, an attribute or interaction in a virtual or physical environment.

60. The method of paragraph 58, wherein the concept corresponds to an emotion of a person or a state of a person, and wherein the one or more first characteristics of a plurality of characteristics of music associated with the determined at least one concept are designed to guide a user from a negative emotion or negative state to a more positive emotion or positive state.

61. The method of paragraph 58, wherein the music that is generated may be used as an assistive aid for musical therapy or assistive technology.

In yet another aspect, a method for generating music might be characterized by the following sample numbered paragraphs:

62. A method, comprising: receiving, with a computing system, at least one sensor input associated with a user; analyzing, with the computing system, the at least one sensor input to determine at least one first state of the user; determining, with the computing system, a desired second state of the user; determining, with the computing system, whether the at least one first state of the user matches the desired second state of the user; based on a determination that the at least one first state of the user does not match the desired second state of the user, continuously controlling, with the computing system, the generation of music to guide the user to the desired second state based on the at least one sensor input.

63. The method of paragraph 62, further comprising: based on a determination that the at least one first state of the user does matches the desired second state of the user, continuously controlling, with the computing system, the generation of music to have one or more characteristics associated with the desired second state.

64. The method of paragraph 62, wherein continuously controlling the generation of music further comprises both fixed evolving aspects and variable changes driven by at least at least one sensor input.

65. The method of paragraph 62, wherein the at least one sensor comprises at least one of a biometric sensor, an electrode, a GPS sensor, a distance sensor, a motion sensor, a movement sensor, a speed or velocity sensor, an accelerometer, a gyroscope, a facial recognition sensor, or a video or still image.

66. The method of paragraph 62, wherein the desired second state of the user corresponds to a desired stress level or amount of arousal of the user, and wherein continuously controlling the generation of the music causes the generated music to guide the user from a first stressful state to a second more relaxed state based on the at least one sensor input.

67. The method of paragraph 62, wherein the desired second state corresponds to state of meditation, and wherein continuously controlling the generation of the music causes the generated music to guide the user from a first non-meditative state to a second meditative state based on the at least one sensor input.

68. The method of paragraph 62, wherein the desired second state corresponds to state of focus, and wherein continuously controlling the generation of the music causes the generated music to guide the user from a first unfocused state to a second focused state based on the at least one sensor input.

69. The method of paragraph 62, wherein the desired second state corresponds to an emotion, and wherein continuously controlling the generation of the music causes the generated music to guide the user from a first negative emotion to a second positive emotion.

70. The method of paragraph 62, wherein the desired second state corresponds to a desired number of steps to take per minute, and wherein continuously controlling the generation of the music causes the generated music to guide the user to take the desired number of steps per minute.

71. The method of paragraph 62, wherein continuously controlling the generation of the music causes the generated music to sync to at least one of a running speed of the user, a heartbeat of the user, a breathing pattern of the user, or a brainwave pattern of the user.

72. The method of paragraph 62, wherein the desired second state corresponds to at least one of a slower breathing pattern, a slower heartbeat, a faster breathing pattern, or a faster heartrate, and wherein continuously controlling the generation of the music causes the generated music to guide the user to at least one of a slower breathing pattern, a slower heartbeat, a faster breathing pattern, or a faster heartrate.

73. The method of paragraph 62, wherein the desired second state corresponds to at least one of a decreasing intensity of a workout or an increasing intensity of a workout, and wherein continuously controlling the generation of the music causes the generated music to guide the user through at least one of the decreasing intensity of a workout or the increasing intensity of a workout.

74. The method of paragraph 62, wherein the desired second state corresponds to at least one of a location or a position of the user, and wherein continuously controlling the generation of the music causes the generated music to guide the user from a first location to a second desired location.

75. The method of paragraph 62, wherein the desired second state corresponds to at least one goal-oriented state, and wherein continuously controlled music allows the sound generated to guide the user to towards the desired goal state.

76. The method of paragraph 75, wherein the desired goal to be maintained corresponds to at least one of maintaining a heart rate, maintaining a breathing pattern, maintaining a running pace, maintaining a step pace, maintaining a rate of periodic activity, or maintaining a velocity or amount of an activity.

77. The method of paragraph 62, wherein the desired second state corresponds to at least one of a posture of the user or a body position of the user, and wherein continuously controlling the generation of the music causes the generated music to guide the user to at least one of an improved posture or improved body position or improved gesture movement.

78. The method of paragraph 62, wherein the at least one sensor input is at least one biometric input, and wherein the at least one biometric input is received from at least one of a biometric input reader comprising at least one of a blood pressure monitor, a heart rate monitor, EKG sensor, PPG sensor, a fitness tracker, CO2 monitor, pulse oximeter, muscle sensor, temperature sensor, respiration sensor, camera, accelerometer, gyroscope or an electroencephalography ("EEG") device and wherein the computing system determines the at least one state of a person based on feedback from the at least one of the biometric input.

79. The method of paragraph 62, wherein the one or more characteristics of music include at least one of a frequency, a note pattern, a note envelope, a filter, a harmony, a tone, vocal-like quality, surprise element, randomization, consistency, crescendo, decrescendo an orchestration, a speed, a rate, a rhythm, or an amplitude associated with the at least first biometric input.

In yet a further aspect, an apparatus for generating music might be characterized by the following sample numbered paragraphs:

80. An apparatus comprising: at least one processor; and a non-transitory computer readable medium communicatively coupled to the at least one processor, the non-transitory computer readable medium having stored thereon computer software comprising a set of instructions that, when executed by the at least one processor, causes the apparatus to: receive at least one sensor input associated with a user; analyze the at least one sensor input to determine at least one first state of the user; determine a desired second state of the user; determine whether the at least one first state of the user matches the desired second state of the user; based on a determination that the at least one first state of the user does not match the desired second state of the user, continuously control the generation of music to guide the user to the desired second state based on the at least at least one sensor input.

In an additional aspect, a system for generating music might be characterized by the following sample numbered paragraphs:

81. A system, comprising: a computing system, comprising: at least one first processor; and a first non-transitory computer readable medium communicatively coupled to the at least one first processor, the first non-transitory computer readable medium having stored thereon computer software comprising a first set of instructions that, when executed by the at least one first processor causes the computing system to: receive at least one sensor input associated with a user; analyze the at least one sensor input to determine at least one first state of the user; determine a desired second state of the user; determine whether the at least one first state of the user matches the desired second state of the user; based on a determination that the at least one first state of the user does not match the desired second state of the user, continuously control the generation of music to guide the user to the desired second state based on the at least at least one sensor input.

In another aspect, a method for generating music might be characterized by the following sample numbered paragraphs:

82. A method, comprising: receiving, with a computing system, a first biometric input associated with a user; analyzing, with the computing system, the first biometric input to determine a first state of the user; autonomously determining, with the computing system, one or more first characteristics of music associated with the determined first state of the user; based on the determination of the one or more first characteristics of music associated with the determined first state of the user, autonomously generating, with the computing system, music having the one or more first characteristics associated with the first state of the user; receiving, with the computing system, at least one second biometric input associated with the user; analyzing, with the computing system, the at least one second biometric input to determine at least one second state of the user; determining, with the computing system, whether the second state of the user is different from the first state of the user; based on a determination that the second state of the user is different from the first state of the user, autonomously determining, with the computing system, one or more second characteristics of music associated with the determined at least one second state of the user; based on a determination of the one or more second characteristics of music associated with the second state of the user, autonomously transitioning between generating music having the one or more first characteristics of music associated with the first state of the user to generating music having the one or more second characteristics of the plurality of characteristics associated with the second state of the user.

In an additional aspect, a method for generating music might be characterized by the following sample numbered paragraphs:

83. A method, comprising: continuously receiving, with a computing system, one or more biometric inputs associated with a user; analyzing, with the computing system, the one or more biometric inputs to determine at least one first state of the user; determining, with the computing system, a desired second state of the user; determining, with the computing system, whether the at least one first state of the user matches the desired second state of the user; based on a determination that the at least one first state of the user does not match the desired second state of the user, continuously generating music having one or more evolving characteristics of music associated with the at least one biometric input, wherein the one or more evolving characteristics of music guide the user to the desired second state based on the at least at least one biometric input.

In an aspect, a method for generating music might be characterized by the following sample numbered paragraphs:

84. A method, comprising: analyzing, with a computing system, a sensor input or a communication to determine at least one state; autonomously determining, with the computing system, one or more first characteristics of a plurality of characteristics of music associated with the determined at least one state; and based on the determination of the one or more first characteristics of a plurality of characteristics of music associated with the at least one state, autonomously generating, with the computing system, music having the one or more first characteristics of the plurality of characteristics associated with the at least one determined state.

85. The method of paragraph 84, wherein the music that is generated is generated in real-time based on feedback from the sensor input or the communication.

86. The method of paragraph 84, wherein the one or more first characteristics of the plurality of characteristics of music reflect an intensity of the determined at least one state.

87. The method of paragraph 84, wherein the one or more first characteristics of the plurality of characteristics of music reflect a valence of the determined at least one state.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    analyzing, with a computing system, a sensor input or a communication to determine at least one state contained within the sensor input or the communication;
    based on a determined at least one state, autonomously determining, with the computing system, one or more first characteristics of a plurality of characteristics of sound associated with the determined at least one state; and
    based on the determination of the one or more first characteristics of the plurality of characteristics of sound associated with the determined at least one state, autonomously generating, with the computing system, first music having the one or more first characteristics of the plurality of characteristics of sound associated with the at least one determined state;
    wherein the determined at least one state is a current state, and wherein the method further comprises:
    determining, with the computing system, a desired state;
    autonomously determining, with the computing system, one or more second characteristics of the plurality of characteristics of sound associated with the desired state; and
    based on the determination of the one or more second characteristics of the plurality of characteristics of sound associated with the desired state, autonomously generating, with the computing system, second music having the one or more second characteristics of the plurality of characteristics of sound associated with the desired state.

2. The method of claim 1, wherein the computing system comprises at least one of a desktop computer, a laptop computer, a tablet, an embedded processing unit, or a cellular phone.

3. The method of claim 1, wherein the communication comprises at least one of an Internet of Things ("IoT") communication, a biometric communication, a voice communication, a textual communication, a photographic communication, or a video communication.

4. The method of claim 1, wherein the sensor input is received from one or more sensors, wherein the one or more sensors comprise one or more GPS sensors, one or more distance sensors, one or more motion sensors, one or more movement sensors, one or more speed sensors, one or more velocity sensors, one or more accelerometer sensors, one or more gyroscope sensors, one or more biometric sensors, one or more health sensors, one or more facial recognition sensors, one or more cameras, one or more weather sensors, one or more temperature sensors, one or more ambient light sensors, one or more humidity sensors, one or more touch sensors, one or more movement sensors, one or more rotation sensors, one or more microphones, or one or more audio sensors.

5. The method of claim 1, wherein the first music that is generated comprises human-like embellishments, and wherein the human-like embellishments are created from at least one of timing jitter, frequency jitter, or timbre jitter.

6. The method of claim 1, wherein the sensor input or the communication is further indicative of at least one of an age of a user, a sex of the user, or a location of the user, wherein the one or more first characteristics of the plurality of characteristics of sound are further associated with at least one of the age of the user, the sex of the user, or the location of the user, and wherein the first music that is generated has the one or more first characteristics of the plurality of characteristics of sound associated with the at least one of the age of the user, the sex of the user, or the location of the user.

7. A method, comprising:
analyzing, with a computing system, a sensor input or a communication to determine at least one state contained within the sensor input or the communication;
based on a determined at least one state, autonomously determining, with the computing system, one or more first characteristics of a plurality of characteristics of sound associated with the determined at least one state;
based on the determination of the one or more first characteristics of the plurality of characteristics of sound associated with the determined at least one state, autonomously generating, with the computing system, first music having the one or more first characteristics of the plurality of characteristics of sound associated with the at least one determined state;
receiving, with the computing system, a user selection of at least one of one or more desired states, one or more genres of music, or one or more musical instruments;
determining one or more second characteristics of the plurality of characteristics of sound based on the user selection of at least one of the one or more desired states, the one or more genres of music, or the one or more musical instruments; and
generating, with the computing system, the first music having the one or more first characteristics of the plurality of characteristics of sound associated with the at least one determined state and having the one or more second characteristics of the plurality of characteristics of sound associated with the user selection of at least one of the one or more desired states, the one or more genres of music, or the one or more musical instruments.

8. The method of claim 1, further comprising:
simultaneously playing, with the computing system, the first music having the one or more first characteristics of the plurality of characteristics of sound associated with the at least one determined state and the second music having the one or more second characteristics of the plurality of characteristics of sound associated with the desired state.

9. The method of claim 1, further comprising:
determining, with the computing system, whether the current state matches the desired state; and
based on a determination that the current state does not match the desired state, continuously controlling, with the computing system, the generation of at least one of the first music and the second music to guide a user from the current state to the desired state.

10. The method of claim 9, wherein the desired state is at least one of a slower breathing pattern, a slower heartbeat, a faster breathing pattern, or a faster heartrate, and wherein continuously controlling the generation of at least one of the first music and the second music causes at least one of the first music and the second music to guide the user to at least one of the slower breathing pattern, the slower heartbeat, the faster breathing pattern, or the faster heartrate.

11. The method of claim 9, wherein the desired state is at least one goal-oriented state, and wherein continuously controlling the generation of at least one of the first music and the second music causes at least one of the first music and the second music to guide the user towards the goal-oriented state.

12. The method of claim 11, wherein the goal-oriented state is at least one of maintaining a heart rate, maintaining a breathing pattern, maintaining a running pace, maintaining a step pace, maintaining a rate of periodic activity, maintaining a velocity of activity, or maintaining an amount of activity, and wherein continuously controlling the generation of at least one of the first music and the second music causes at least one of the first music and the second music to guide the user to maintain the heart rate, maintain the breathing pattern, maintain the running pace, maintain the step pace, maintain the rate of periodic activity, maintain the velocity of activity, or maintain the amount of activity.

13. The method of claim 9, wherein continuously controlling the generation of at least one of the first music and the second music causes at least one of the first music and the second music to sync to at least one of a running speed of the user, a heartbeat of the user, a breathing pattern of the user, or a brainwave pattern of the user.

14. The method of claim 9, wherein the desired state is a meditative state, and wherein continuously controlling the generation of at least one of the first music and the second music causes at least one of the first music and the second music to guide the user from a non-meditative state to the meditative state.

15. The method of claim 9, wherein the desired second state is at least one of a decreasing intensity of a workout or an increasing intensity of a workout, and wherein continuously controlling the generation of at least one of the first music and the second music causes at least one of the first music and the second music to guide the user through at least one of the decreasing intensity of the workout or the increasing intensity of the workout.

16. The method of claim 1, further comprising:
mapping, with the computing system, a plurality of states to a plurality of positions on a graph, wherein a first subset of characteristics of sound of the plurality of characteristics of sound varies based on a particular position of a particular state of the plurality of states relative to the first axis of the graph, and wherein a second subset of characteristics of sound of the plurality of characteristics of sound varies based on the particular position of the particular state of the plurality of states relative to a second axis of the graph;
determining, with the computing system, a first position of the determined at least one state relative to the first axis and the second axis;
based on a determination of the first position of the determined at least one state relative to the first axis and relative to the second axis, autonomously generating, with the computing system, the first music having the first subset of characteristics and the second subset of characteristics associated with the first position of the determined at least one state.

17. A method, comprising:
analyzing, with a computing system, a sensor input or a communication to determine at least one state contained within the sensor input or the communication;

based on a determined at least one state, autonomously determining, with the computing system, one or more first characteristics of a plurality of characteristics of sound associated with the determined at least one state;

based on the determination of the one or more first characteristics of the plurality of characteristics of sound associated with the determined at least one state, autonomously generating, with the computing system, first music having the one or more first characteristics of the plurality of characteristics of sound associated with the at least one determined state;

mapping, with the computing system, a plurality of states to a plurality of positions on a graph, wherein a first subset of characteristics of sound of the plurality of characteristics of sound varies based on a particular position of a particular state of the plurality of states relative to the first axis of the graph, and wherein a second subset of characteristics of sound of the plurality of characteristics of sound varies based on the particular position of the particular state of the plurality of states relative to a second axis of the graph;

determining, with the computing system, a first position of the determined at least one state relative to the first axis and the second axis; and based on a determination of the first position of the determined at least one state relative to the first axis and relative to the second axis, autonomously generating, with the computing system, the first music having the first subset of characteristics and the second subset of characteristics associated with the first position of the determined at least one state;

wherein the first subset of characteristics of sound correspond to a valence of sound, wherein the valence of sound comprises at least one of timbre of notes, minor notes, randomness of notes, or synchronicity of notes, wherein the second subset of characteristics of sound correspond to an intensity of sound, wherein the intensity of sound comprise loudness of sound or number of beats per minute.

18. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
analyze a sensor input or a communication to determine at least one state contained within the sensor input or the communication;
based on a determined at least one state, autonomously determine one or more first characteristics of a plurality of characteristics of sound associated with the determined at least one state; and
based on the determination of the one or more first characteristics of the plurality of characteristics of sound associated with the determined at least one state, autonomously generate first music having the one or more first characteristics of the plurality of characteristics of sound associated with the at least one determined state;
wherein the determined at least one state is a current state, and wherein the set of instructions, when executed by the at least one processor, further causes the apparatus to:
determine a desired state;
autonomously determine one or more second characteristics of the plurality of characteristics of sound associated with the desired state; and
based on the determination of the one or more second characteristics of the plurality of characteristics of sound associated with the desired state, autonomously generate second music having the one or more second characteristics of the plurality of characteristics of sound associated with the desired state.

19. A system, comprising:
at least one of a sensor or a user device, at least of the sensor or the user device, comprising:
at least one first processor; and
a first non-transitory computer readable medium communicatively coupled to the at least one first processor, the first non-transitory computer readable medium having stored thereon computer software comprising a first set of instructions that, when executed by the at least one first processor causes at least of the sensor or the user device to:
send a sensor input or a communication to a computing system;
the computing system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor causes the computing system to:
receive the sensor input or the communication from at least of the sensor or the user device;
analyze the sensor input or the communication to determine at least one state contained within the sensor input or the communication;
based on a determined at least one state, autonomously determine one or more first characteristics of a plurality of characteristics of sound associated with the determined at least one state; and
based on the determination of the one or more first characteristics of the plurality of characteristics of sound associated with the determined at least one state, autonomously generate first music having the one or more first characteristics of the plurality of characteristics of sound associated with the at least one determined state;
wherein the determined at least one state is a current state, and wherein the second set of instructions, when executed by the at least one second processor, further causes the computing system to:
determine a desired state;
autonomously determine one or more second characteristics of the plurality of characteristics of sound associated with the desired state; and
based on the determination of the one or more second characteristics of the plurality of characteristics of sound associated with the desired state, autonomously generate second music having the one or more second characteristics of the plurality of characteristics of sound associated with the desired state.

20. The system of claim 19 wherein the second set of instructions, when executed by the at least one second processor, further causes the computing system to simultaneously play the first music having the one or more first characteristics of the plurality of characteristics of sound associated with the at least one determined state and the second music having the one or more second characteristics of the plurality of characteristics of sound associated with the desired state.

\* \* \* \* \*